US008029893B2

(12) United States Patent
Siegel et al.

(10) Patent No.: US 8,029,893 B2
(45) Date of Patent: Oct. 4, 2011

(54) MYOGLOBIN BLOOMING AGENT, FILMS, PACKAGES AND METHODS FOR PACKAGING

(75) Inventors: Dan G. Siegel, Belleville, IL (US); Otacilio Teixeira Berbert, Oshkosh, WI (US); Kevin Philip Nelson, Appleton, WI (US); Gregory Robert Pockat, Ripon, WI (US)

(73) Assignee: Curwood, Inc., Oshkosh, WI (US)

( * ) Notice: Subject to any disclaimer, the term of this patent is extended or adjusted under 35 U.S.C. 154(b) by 868 days.

(21) Appl. No.: 11/451,968

(22) Filed: Jun. 12, 2006

(65) Prior Publication Data

US 2006/0286323 A1    Dec. 21, 2006

Related U.S. Application Data

(63) Continuation-in-part of application No. 11/413,504, filed on Apr. 28, 2006, now Pat. No. 7,867,531, and a continuation-in-part of application No. PCT/US2005/011387, filed on Apr. 4, 2005.

(60) Provisional application No. 60/559,350, filed on Apr. 2, 2004.

(51) Int. Cl.
*B32B 1/02* (2006.01)
*B32B 1/08* (2006.01)

(52) U.S. Cl. ..... 428/341; 428/34.1; 428/34.2; 428/35.7; 428/35.9; 428/36.9

(58) Field of Classification Search ............... 428/34.1, 428/34.2, 35.7, 35.9, 36.9, 341
See application file for complete search history.

(56) References Cited

U.S. PATENT DOCUMENTS

| 2,101,547 | A | 12/1937 | Kistler | 99/159 |
| 2,147,261 | A | 2/1939 | Lewis | 99/107 |
| 2,417,889 | A | 3/1947 | Stammelman | |
| 2,528,204 | A | 10/1950 | Zwosta | |
| 2,621,129 | A | 12/1952 | Ramsbottom et al. | |
| 2,788,278 | A | 4/1957 | Zimont et al. | |
| 2,863,777 | A | 12/1958 | Dekker | |
| 2,895,270 | A | 7/1959 | Blaess | 53/21 |
| 2,902,369 | A | 9/1959 | Komarik | 99/159 |
| 2,923,632 | A | 2/1960 | Castberg | |
| 2,925,346 | A | 2/1960 | Harper et al. | |
| 2,979,410 | A | 4/1961 | Parlour | 99/171 |
| 3,003,883 | A | 10/1961 | Levy | 99/159 |
| 3,042,532 | A | 7/1962 | Daline | |
| 3,047,403 | A | 7/1962 | McConnell | |
| 3,134,678 | A | 5/1964 | Wierbicki et al. | |
| 3,154,423 | A | 10/1964 | Voegeli et al. | 99/222 |

(Continued)

FOREIGN PATENT DOCUMENTS

CA    857827    12/1970
(Continued)

OTHER PUBLICATIONS

Sacharow, S.; Griffin, R.C.; *Food Packaging*; AVI Publishing: Westport, CT, 1970; "Red Meats," pp. 95-119.

(Continued)

*Primary Examiner* — Marc Patterson
(74) *Attorney, Agent, or Firm* — Tom J. Hall

(57) ABSTRACT

Non-shrink, forming and nonforming thermoplastic webs comprising a myoglobin blooming agent on a food contact surface are useful for packaging fresh meat and other products to fix a desirable color on the surface of the product.

24 Claims, 3 Drawing Sheets

U.S. PATENT DOCUMENTS

| | | | |
|---|---|---|---|
| 3,215,540 A | 11/1965 | Wierbicki et al. | |
| 3,361,577 A * | 1/1968 | Selwyn et al. | 426/265 |
| 3,384,993 A | 5/1968 | Kane | 47/58 |
| 3,526,521 A | 9/1970 | Komarik | |
| 3,537,864 A | 11/1970 | Magiera | |
| 3,590,528 A | 7/1971 | Shepherd | |
| 3,645,757 A | 2/1972 | Gordon et al. | |
| 3,666,488 A | 5/1972 | Nakao et al. | 99/107 |
| 3,713,849 A | 1/1973 | Grindrod et al. | |
| 3,740,236 A | 6/1973 | Baxley | |
| 3,814,821 A | 6/1974 | Oliver et al. | |
| 3,911,146 A | 10/1975 | Hara et al. | 426/265 |
| 3,936,560 A | 2/1976 | Santurri et al. | 428/219 |
| 3,966,974 A | 6/1976 | Bharucha et al. | |
| 4,001,445 A | 1/1977 | Horrocks et al. | |
| 4,001,446 A | 1/1977 | Hood | |
| 4,013,797 A | 3/1977 | Gryczka | |
| 4,053,650 A | 10/1977 | Chino et al. | |
| 4,055,672 A | 10/1977 | Hirsch et al. | |
| 4,089,983 A | 5/1978 | Hood | |
| 4,161,545 A | 7/1979 | Green et al. | |
| 4,196,220 A | 4/1980 | Chiu et al. | |
| 4,308,289 A | 12/1981 | Huisman et al. | |
| 4,407,897 A | 10/1983 | Farrell et al. | |
| 4,416,909 A | 11/1983 | Aversano | 426/265 |
| 4,420,530 A | 12/1983 | Toyoda et al. | |
| 4,425,410 A | 1/1984 | Farrell et al. | |
| 4,457,960 A | 7/1984 | Newsome | |
| 4,476,112 A * | 10/1984 | Aversano | 426/268 |
| 4,499,225 A | 2/1985 | Kubo et al. | |
| 4,501,758 A | 2/1985 | Morris | |
| 4,522,835 A | 6/1985 | Woodruff et al. | |
| 4,610,914 A | 9/1986 | Newsome | |
| 4,642,239 A | 2/1987 | Ferrar et al. | 426/396 |
| 4,683,139 A | 7/1987 | Cheng | |
| 4,728,518 A | 3/1988 | Gonzalez et al. | |
| 4,753,809 A | 6/1988 | Webb | |
| 4,755,403 A | 7/1988 | Ferguson | |
| 4,755,419 A | 7/1988 | Shah | |
| 4,756,914 A | 7/1988 | Jon et al. | |
| 4,770,944 A | 9/1988 | Farrell et al. | |
| 4,781,934 A * | 11/1988 | Shimp et al. | 426/264 |
| 4,792,484 A | 12/1988 | Moritani | |
| 4,801,486 A | 1/1989 | Quacquarella et al. | |
| 4,818,548 A | 4/1989 | Cheng | |
| 4,929,482 A | 5/1990 | Moritani et al. | |
| 4,954,526 A | 9/1990 | Keefer | |
| 4,960,639 A | 10/1990 | Oda et al. | |
| 4,962,728 A | 10/1990 | Highfill | 119/3 |
| 4,981,707 A | 1/1991 | Morris | |
| 4,990,184 A | 2/1991 | Dotson et al. | |
| 5,039,705 A | 8/1991 | Keefer et al. | |
| 5,108,804 A | 4/1992 | Oxley et al. | |
| 5,139,700 A | 8/1992 | Miksic et al. | |
| 5,153,038 A | 10/1992 | Koyama et al. | |
| 5,155,137 A | 10/1992 | Keefer et al. | |
| 5,209,869 A | 5/1993 | Miksic et al. | |
| 5,223,311 A | 6/1993 | Tsutsumi et al. | |
| 5,230,915 A | 7/1993 | Shahidi et al. | 426/240 |
| 5,281,471 A | 1/1994 | Diete et al. | |
| 5,317,052 A | 5/1994 | Ohba et al. | |
| 5,352,467 A | 10/1994 | Mitchell et al. | |
| 5,382,470 A | 1/1995 | Vicik | |
| 5,384,149 A | 1/1995 | Lin | |
| 5,393,457 A | 2/1995 | Miksic et al. | |
| 5,405,857 A | 4/1995 | Karup et al. | |
| 5,416,131 A | 5/1995 | Wolff et al. | |
| 5,425,956 A | 6/1995 | Shahidi et al. | 426/92 |
| 5,443,852 A | 8/1995 | Shahidi et al. | 426/92 |
| 5,472,722 A | 12/1995 | Burger | 426/264 |
| 5,481,852 A | 1/1996 | Mitchell | 53/432 |
| RE35,285 E | 6/1996 | Quacquarella et al. | |
| 5,525,357 A | 6/1996 | Keefer et al. | |
| 5,573,797 A | 11/1996 | Wilhoit | |
| 5,573,800 A | 11/1996 | Wilhoit | |
| 5,573,801 A | 11/1996 | Wilhoit | |
| 5,591,468 A | 1/1997 | Stockley, III et al. | |
| 5,593,747 A | 1/1997 | Georgelos | |
| 5,597,599 A | 1/1997 | Smith et al. | |
| 5,667,827 A | 9/1997 | Breen et al. | 426/129 |
| 5,711,978 A | 1/1998 | Breen et al. | 426/129 |
| 5,715,945 A | 2/1998 | Chandler | |
| 5,759,650 A | 6/1998 | Raines et al. | |
| 5,770,645 A | 6/1998 | Stamler et al. | |
| 5,800,412 A | 9/1998 | Zhang et al. | |
| 5,834,077 A | 11/1998 | Babrowicz | |
| 5,834,098 A | 11/1998 | Kitamura et al. | |
| 5,840,381 A | 11/1998 | Ohtsuka | |
| 5,855,975 A | 1/1999 | Miksic et al. | |
| 5,866,184 A | 2/1999 | Gorlich et al. | |
| 5,888,528 A | 3/1999 | Wellinghoff et al. | |
| 5,894,040 A | 4/1999 | Foley et al. | |
| 5,928,770 A | 7/1999 | Quinones | |
| 5,937,618 A | 8/1999 | Chandler | |
| 5,958,805 A | 9/1999 | Quinones | |
| 5,965,264 A | 10/1999 | Barenberg et al. | |
| 5,989,610 A | 11/1999 | Ruzek | 426/281 |
| 5,989,613 A | 11/1999 | Buchko | |
| 5,994,444 A | 11/1999 | Trescony et al. | |
| 6,020,012 A | 2/2000 | Kauffman et al. | |
| 6,028,160 A | 2/2000 | Chandler et al. | |
| 6,033,599 A | 3/2000 | Lozano et al. | |
| 6,033,705 A | 3/2000 | Isaacs | |
| 6,042,859 A | 3/2000 | Shaklai | |
| 6,046,243 A | 4/2000 | Wellinghoff et al. | |
| 6,074,715 A | 6/2000 | Lind et al. | |
| 6,087,479 A | 7/2000 | Stamler et al. | |
| 6,099,881 A | 8/2000 | Hanson | 426/263 |
| 6,113,962 A | 9/2000 | Spencer | 426/316 |
| 6,143,344 A | 11/2000 | Jon et al. | |
| 6,204,223 B1 | 3/2001 | Holmes et al. | |
| 6,210,725 B1 | 4/2001 | Colombo | |
| 6,221,470 B1 | 4/2001 | Ciocca et al. | |
| 6,232,434 B1 | 5/2001 | Stamler et al. | |
| 6,242,371 B1 | 6/2001 | Quinones | |
| 6,270,829 B1 | 8/2001 | Shahlai | |
| 6,287,613 B1 | 9/2001 | Childress et al. | |
| 6,299,984 B1 | 10/2001 | Forloni | |
| 6,403,759 B2 | 6/2002 | Stamler et al. | |
| 6,420,470 B1 | 7/2002 | Miksic et al. | |
| 6,447,826 B1 | 9/2002 | Matthews | 426/126 |
| 6,465,109 B2 | 10/2002 | Ohtsuka | |
| 6,500,473 B1 | 12/2002 | Koehler et al. | |
| 6,511,568 B1 | 1/2003 | Eckstein et al. | |
| 6,514,583 B1 | 2/2003 | Ahlgren et al. | |
| 6,521,275 B1 | 2/2003 | Mercogliano et al. | |
| 6,533,962 B1 | 3/2003 | Tulka et al. | |
| 6,565,985 B2 | 5/2003 | Ueyama et al. | |
| 6,592,919 B1 | 7/2003 | Matthews et al. | |
| 6,602,466 B2 | 8/2003 | Hamilton et al. | |
| 6,610,392 B1 | 8/2003 | Ramesh et al. | |
| 6,623,773 B2 * | 9/2003 | Meier et al. | 426/132 |
| 6,632,785 B2 | 10/2003 | Pfeiffer et al. | |
| 6,673,891 B2 | 1/2004 | Stamler et al. | |
| 6,689,402 B1 | 2/2004 | Gehring et al. | |
| 6,706,274 B2 | 3/2004 | Herrmann et al. | |
| 6,716,464 B1 | 4/2004 | Schlegel et al. | 426/312 |
| 6,749,910 B1 | 6/2004 | Georgelos et al. | |
| 6,753,054 B1 | 6/2004 | Lind et al. | |
| 6,815,023 B1 | 11/2004 | Tatarka et al. | |
| 6,858,275 B2 | 2/2005 | Ferri et al. | |
| 6,875,840 B2 | 4/2005 | Stamler et al. | |
| 6,881,430 B2 | 4/2005 | Køhler et al. | |
| 6,887,994 B2 | 5/2005 | Stamler et al. | |
| 6,939,569 B1 | 9/2005 | Green et al. | |
| 6,942,909 B2 | 9/2005 | Shirrell et al. | |
| 6,945,402 B1 | 11/2005 | Gueret | |
| 7,037,543 B2 | 5/2006 | Sandusky et al. | 426/129 |
| 2002/0051754 A1 | 5/2002 | Schroeder et al. | |
| 2002/0119220 A1 | 8/2002 | Costello | |
| 2002/0172834 A1 * | 11/2002 | Rivett et al. | 428/515 |
| 2003/0017194 A1 | 1/2003 | Joerger et al. | |
| 2003/0039724 A1 | 2/2003 | DuCharme et al. | 426/135 |
| 2003/0044492 A1 | 3/2003 | Knigge et al. | |
| 2003/0203081 A1 | 10/2003 | Saari et al. | |
| 2003/0235664 A1 | 12/2003 | Merical et al. | |
| 2004/0009273 A1 | 1/2004 | Shaklai | |

| | | | |
|---|---|---|---|
| 2004/0076845 A1 | 4/2004 | Albright | |
| 2004/0131805 A1 | 7/2004 | Merical et al. | |
| 2004/0137202 A1 | 7/2004 | Hamilton et al. | |
| 2005/0019537 A1 | 1/2005 | Nakaishi et al. | |
| 2005/0059655 A1 | 3/2005 | Garvey et al. | |
| 2005/0089607 A1 | 4/2005 | Numata et al. | |
| 2005/0106380 A1 | 5/2005 | Gray et al. | |
| 2005/0129969 A1 | 6/2005 | Schell et al. | |
| 2005/0249848 A1 | 11/2005 | Charest et al. | |
| 2006/0233985 A1 | 10/2006 | Pockat et al. | |
| 2006/0246242 A1 | 11/2006 | Siegel et al. | |
| 2007/0014947 A1 | 1/2007 | Mengel et al. | |
| 2007/0014953 A1 | 1/2007 | Siegel et al. | |
| 2007/0104901 A1 | 5/2007 | Siegel et al. | |
| 2007/0246867 A1 | 10/2007 | Nelson et al. | |

FOREIGN PATENT DOCUMENTS

| | | | |
|---|---|---|---|
| CA | 878423 | 8/1971 | |
| CA | 905744 | 7/1972 | 99/97 |
| CA | 1053497 | 5/1979 | 99/19 |
| CA | 1329890 | 5/1994 | 99/18 |
| CA | 2007522 | 3/2000 | |
| CA | 2100074 | 8/2003 | |
| DE | 2 363 258 A1 | 7/1974 | |
| DE | 2 415 659 A1 | 10/1974 | |
| DE | 24 51 337 A1 | 8/1975 | |
| EP | 0 013 556 A1 | 7/1980 | |
| EP | 0 172 432 A2 | 2/1986 | |
| EP | 0 202 771 A2 | 11/1986 | |
| EP | 0 224 990 A1 | 6/1987 | |
| EP | 0 364 624 A1 | 4/1990 | |
| EP | 0 491 164 A2 | 6/1992 | |
| EP | 0 473 091 B1 | 12/1995 | |
| EP | 0 662 527 B1 | 5/1997 | |
| EP | 1 138 478 A2 | 4/2001 | |
| EP | 0 788 319 B1 | 4/2002 | |
| FR | 2 634 976 | 2/1990 | |
| GB | 1 048 770 | 11/1966 | |
| GB | 1 253 449 A | 11/1971 | |
| GB | 1 475 994 A | 6/1977 | |
| GB | 2 187 081 A | 9/1987 | |
| JP | 57-170175 A2 | 10/1982 | |
| JP | 57-170176 A2 | 10/1982 | |
| JP | 58-101670 | 6/1983 | |
| JP | 59-085278 A | 5/1984 | |
| JP | 64-071437 | 3/1989 | |
| JP | 01210340 A | 8/1989 | |
| JP | 04-318033 | 11/1992 | |
| JP | 05-140344 | 6/1993 | |
| JP | 06-049247 A | 2/1994 | |
| JP | 06049247 A | 2/1994 | |
| JP | 07-258467 | 10/1995 | |
| JP | 2000015737 A | 1/2000 | |
| JP | 2000141535 A | 5/2000 | |
| JP | 2003191420 A | 7/2003 | |
| WO | WO 92/15454 A1 | 9/1992 | |
| WO | WO 96/14760 A1 | 5/1996 | |
| WO | WO 99/23143 A1 | 5/1999 | |
| WO | WO 00/69775 A1 | 11/2000 | |
| WO | WO 02/056904 A1 | 7/2002 | |
| WO | WO 04/000541 A1 | 12/2003 | |
| WO | 2004039683 A1 | 5/2004 | |
| WO | 2005097486 A1 | 10/2005 | |

OTHER PUBLICATIONS

McGee, H.; *On Food and Cooking: The Science and Lore of the Kitchen*, Scribner: New York, 1984, Chapter 3, "Meat" pp. 118-178.

Grayson, M.; *Kirk-Othmer Encyclopedia of Chemical Technology*, 3rd ed.; John Wiley & Sons: New York, 1981, vol. 15, "Meat Products", pp. 62-74.

Grayson, M.; *Kirk-Othmer Encyclopedia of Chemical Technology*, 3rd ed.; John Wiley & Sons: New York, 1981, vol. 11, "Food Additives", pp. 146-163.

Grayson, M.; *Kirk-Othmer Encyclopedia of Chemical Technology*, 3rd ed.; John Wiley & Sons: New York, 1981, vol. 11, "Food Processing", pp. 164-183.

Kroschwitz, J. I.; *Encyclopedia of Polymer Science and Technology*, Wiley Interscience: New Jersey, 2003, vol. 3, "Packaging, Flexible," pp. 353-363.

Kroschwitz, J. I.; *Encyclopedia of Polymer Science and Technology*, Wiley Interscience: New Jersey, 2003, vol. 2, Coextrusion pp. 1-25.

Brody, A. L.; Marsh, K. S.; *The Wiley Encyclopedia of Packaging Technology*, 2nd ed.; John Wiley & Sons: 1997, Active Packaging, pp. 2-13.

Brody, A. L.; Marsh, K. S.; *The Wiley Encyclopedia of Packaging Technology*, 2nd ed.; John Wiley & Sons: 1997, Coextrusions for Flexible Packaging, pp. 237-240.

Brody, A. L.; Marsh, K. S.; *The Wiley Encyclopedia of Packaging Technology*, 2nd ed.; John Wiley & Sons: 1997, Form/Fill/Seal, Horizontal & Form/Fill/Seal, Vertical, pp. 465-470.

Brody, A. L.; Marsh, K. S.; *The Wiley Encyclopedia of Packaging Technology*, 2nd ed.; John Wiley & Sons: 1997, Packaging of Food, pp. 699-704.

Brody, A. L.; Marsh, K. S.; *The Wiley Encyclopedia of Packaging Technology*, 2nd ed.; John Wiley & Sons: 1997, Thermoform/Fill/Seal, pp. 910-921.

Brody, A. L.; Marsh, K. S.; *The Wiley Encyclopedia of Packaging Technology*, 2nd ed.; John Wiley & Sons: 1997, Trays, Barrier-Foam, pp. 931-937.

Brody, A. L.; Marsh, K. S.; *The Wiley Encyclopedia of Packaging Technology*, 2nd ed.; John Wiley & Sons: 1997, Vacuum Packaging, pp. 949-955.

Wang, P. G.; Cai, T. B.; Taniguchi, N.; *Nitric Oxide Donors*; Wiley-VCH: 2005, Chapter 1, "NO and NO Donors", pp. 3-31.

Han, J. H.; "Antimicrobial Food Packaging", in *Food Technology*, Mar. 2000, vol. 54, No. 3, pp. 56-65.

Hampe, D.; Piringer, O., "Studies on the permeation of inorganic salts through plastic films", in *Food Additives and Contaminants*, 1998, vol. 15, No. 2, pp. 209-216.

Vartianinen, J., Skytta, Enqvist, J., Ahvenainen, R., "Properties of Antimicrobial Plastics Containing Traditional Food Preservatives", in *Packaging Technology and Science*, 16, pp. 223-229.

Gasco, A.; Fruttero, R.; Sorba, G.; Di Stilo, A.; and Calvino, R., "NO donors: Focus on Furoxans Derivatives", in *Pure Appl. Chem.*, 2004, vol. 76, No. 5, pp. 973-981.

Wang, P. G.; Xian, M.; Tang, X.; Wu, X.; Wen, Z.; Cai, T.; and Janczuk, A. J., "Nitric Oxide Donors: Chemical Activities and Biological Applications", *Chem. Rev.*, 2002, 102, pp. 1091-1134.

Tovar, L.; Salafranca, J.; Sanchez, C.; and Nerin, C., "Migration Studies to Assess the Safety in Use of a New Antioxidant Active Packaging", *J. Agric. Food Chem.*, 2005, 53, pp. 5270-5275.

"Migration of Toxicants, Flavors, and Odor-Active Substances from Flexible Packaging Materials to Food", *Food Technology*, Jul. 1988, pp. 95-102.

"Nitrate, Nitrite, and Nitroso Compounds in Foods", *Food Technology*, Apr. 1987, pp. 127-136.

Heaton, K.M., Corformth, D.P., Moiseev, I.V., Egbert, W.R., Carpenter, C.E. "Minimum Sodium Nitrite Levels for pinking of various cooked meats as related to use of direct or indirect-dried soy isolates in poultry rolls", *Meat Science*, 2000, 55, pp. 321-329.

Bureau, G.; Multon, J.L.; *Food Packaging Technology*, vol. 2, 1996, "Influence of the Absence of Oxygen on the Color of the Meat", pp. 239-242.

Kramlich, W.E.; Pearson, A.M.; Tauber, F.W., *Processed Meats*, The AVI Publishing Company, Inc., 1973, Chapter 1, "Introduction to Meat Processing", pp. 1-12.

Kramlich, W.E.; Pearson, A.M.; Tauber, F.W., *Processed Meats*, The AVI Publishing Company, Inc., 1973, Chapter 3, "Curing", pp. 40-60.

Meat & Deli Retailer, Mar. 2005, pp. 1-19.

Meat & Deli Retailer, Mar. 2005, pp. 22-46.

Gregerson, J.; *Meat Marketing & Technology*, Dec. 2005, "Seeing Red", p. 4.

Hisey, P.;*Meat Marketing & Technology*, Mar. 2005, "Open and shut case?", pp. 20-30.

Salvage, B.; *The National Provisioner*, Jun. 2005, "Case-ready penetration", pp. 96-105.

Schwarz, S. J.; Claus, J.R.; Wang, H.; Marriott, N. G..; Graham, P.P; Fernandes, C.F., "Inhibition of Pink Color Development in Cooked, Uncured Turkey Breast Through Ingredient Incorporation" in *Poultry Science* 1999, vol. 78, pp. 255-266.

Dymicky, M.; Fox, J.B.; Wasserm, A. E., Color Formation in Cooked Model and Meat Systems With Organic and Inorganic Compounds, in *J. Food Science* 1975, vol. 4, pp. 306-309.

Pegg, R. B.; Nitrite Curing of Meat: The N-Nitrosamine Problem and Nitrite Alternatives; in *Food & Nutrition*, Chapter 9, "Possible Substitutes for Nitrite", pp. 209-223.

USDA, 1995. Processing Inspector's Calculations Handbook (FSIS Directive 7620.3), http://fsis.usda.gov/OPPDE/rdad?FSISDirectives/7620-3.pdf. Accessed Sep. 1, 2009.

Sebranek, J. and J. Bacus, Natural and Organic Meat Products: Regulatory, Manufacturing, Marketing, Quality and Safety Issues. American Meat Science Assoc. White Paper, 2007.

\* cited by examiner

MYOGLOBIN BLOOMING AGENT, FILMS, PACKAGES AND METHODS FOR PACKAGING

RELATED APPLICATIONS

This application is a continuation-in-part of International Patent Application No. PCT/US2005/011387, filed Apr. 4, 2005, which claims the benefit of U.S. Provisional Application No. 60/559,350, filed Apr. 2, 2004, both of which are incorporated herein by reference in their entirety. This application is also a continuation-in-part of U.S. patent application Ser. No. 11/413,504, filed Apr. 28, 2006, entitled "Myoglobin Blooming Agent Containing Shrink Films, Packages and Methods for Packaging," to Gregory Pockat et al., which is incorporated herein by reference in its entirety.

TECHNICAL FIELD

Thermoformable food packaging films, mating substrates and packages comprising the same, for maintaining desirable food color are provided herein, as well as related methods of food packaging.

BACKGROUND OF THE INVENTION

Meat color is an important quality characteristic of packaged meat products that affects their merchantability. Consumers often use color as an indicator of meat quality and freshness. The color of meat is related to the amount and chemical state of myoglobin in the meat. Myoglobin is present in the muscle tissue of all animals and functions to store and deliver oxygen by reversibly binding molecular oxygen, thereby creating an intracellular source of oxygen for the mitochondria. Pork and poultry typically contain lower amounts of myoglobin than beef and thus are lighter in color than beef.

Myoglobin includes an open binding site called heme that can bind certain small molecules, such as molecular oxygen ($O_2$ or "oxygen"), or water. Myoglobin without a molecule bound to the heme site is a purple colored molecule called deoxymyoglobin. The presence and type of ligand bound at the myoglobin binding site can alter the color of the myoglobin. The color of the meat product will change based on the amount of myoglobin present and the amount and type(s) of ligand molecule(s) bound to the heme binding site. Molecular oxygen, $O_2$ ("oxygen") readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. When a water molecule binds to the heme group, the myoglobin molecule turns brown and is referred to as metmyoglobin. The binding of cyanide or fluorine to the heme site can cause a brown color, while the binding of carbon monoxide (CO) can cause a red color similar to that produced by oxygen binding. Nitric oxide (NO) has been described as forming a stable pink color in cured meat.

Historically, fresh meat products available to consumers have been substantially prepared and packaged for end-use at the site of final sale. Product packaging that preserves a desirable color of fresh meat can promote the merchantability and appeal of the meat product for consumers. Existing meat packaging technology can inadequately preserve favorable meat color for various reasons. The conventional packaging format used by the retail grocer for fresh meat is to stretch a thin plastic film around a foam tray that supports the product. The film is permeable to oxygen so that the color of the meat quickly blooms to a bright red. However, the shelf life for the bright red color is only about three days. Thus, this packaging format is undesirable because the color often becomes unacceptable before it is sold even though the meat remains nutritious and healthy for consumption. As a result, a packaging format that maintains the fresh meat color for a longer period of time has long been sought for centralized packaging operations. Alternatively, meat has been packaged in oxygen barrier, vacuum bags, which are vacuum sealed and prevent oxygen contact with the meat until the package is opened. Vacuum sealed red meat products are nutritious, healthy and have a long shelf life, however they may result in an undesirable purple meat color in the package that does not bloom to a desirable red color until the meat is exposed to air. Consumer acceptance of meat having a purple color is less than that of meat having a red color. To provide meat with the consumer preferred red color, meat has also been packaged in a modified atmosphere package ("MAP"), wherein the meat is maintained in a sealed pocket containing an atmosphere that is different than ambient air. For example, one such commercially acceptable MAP contains an atmosphere enriched with oxygen (up to 80% by volume) to better maintain a preferred red color. One case ready MAP maintains meat in carbon dioxide, with a very low oxygen content until just before display when the meat is exposed to oxygen to cause blooming to the desired red color. Alternatively, the meat can be contacted with a MAP having an atmosphere containing a small concentration of carbon monoxide (CO) (e.g., 0.4% by volume) to maintain a preferred red meat color. However, while CO-containing MAP may maintain a shelf life comparable to vacuum packaged meat, the red color induced by the presence of CO can be perceived as "unnaturally" bright red. In addition, the red color developed by CO tends to extend through a significant portion of the meat product, causing a permanent "pinking" of the interior of the meat which may remain even after the meat has been fully cooked. The bright red CO-myoglobin complex is referred to as carboxymyoglobin. The presence of carbon monoxide can also disfavorably impact sales of CO-containing MAP packages among consumers.

MAP also requires a headspace for contact of the modified atmosphere with the meat surface to effect the desired color over time. This requirement for a headspace leads to increased package volume, increased transportation costs and storage requirements and also limits the display appearance by making the product less visible due to the high side walls of the container and the gap between the film and the meat surface.

What is needed are packaging materials that maintain a favorable meat color, while providing an adequate or improved shelf life and meat freshness.

Nitrite or nitrate salts, such as sodium nitrite, are often used in curing meat, and can also affect meat color. Nitrate and nitrite additives are generally recognized as safe for use in foods, and are commonly known preservatives used in the curing process for products such as hams, lunchmeat, bologna and hot dogs. Nitrite and nitrates are used to cure and disinfect meats in the meat industry often producing a stable pink to red color in the process. For example, GB 2187081A discloses immersion of meat in an aqueous solution of sodium chloride, polyphosphate ions and nitrite ions to preserve meat. See also McGee, "Meat", *On Food and Cooking, Rev. Ed.*, 2004, Chapter 3, pp. 118-178 (Scribner, New York, N.Y.) which is hereby incorporated by reference. The presence of oxygen can oxidize available nitric oxide to nitrite thus reducing its availability to associate with the myoglobin molecule. Packaging films have been described that comprise nitrite or nitrate compounds as a desiccant, a food preservative or as a volatile corrosion inhibitor for packaging of metal products. Anti-fungal agents including food preservatives such as sodium nitrite may be applied on various types of packaging to preserve biodegradable packaging against premature deleterious attack by fungi, as disclosed in JP7-258467A. Oxygen barrier films for packaging food products can contain a nitrate salt as a moisture-absorbing agent within an EVOH barrier material or other layer of a multilayer film, as disclosed in JP5-140344A, and U.S. Pat. No. 4,407,897 (Farrell et al.), U.S. Pat. No. 4,425,410 (Farrell et al.), U.S. Pat. No. 4,792,484 (Moritani), U.S. Pat. No. 4,929,482 (Moritani et al.), U.S. Pat. No. 4,960,639 (Oda et al.), and U.S. Pat. No. 5,153,038 (Koyama et al.). Nitrate or nitrite products have also been described as being included in packaging films to absorb moisture, e.g., to inhibit corrosion of metal products, as disclosed in U.S. Pat. No. 2,895,270 (Blaess), U.S. Pat. No. 5,715,945 (Chandler), U.S. Pat. No. 5,894,040 (Foley et al.), U.S. Pat. No. 5,937,618 (Chandler), U.S. Pat. No. 6,465,109 (Ohtsuka), and U.S. Pat. No. 6,942,909 (Shirrell et al.), U.S. Published Patent Application No. 2005/0019537 (Nakaishi et al.), GB Patent No. 1,048,770 (Canadian Technical Tape, Ltd.), and EP Patent Nos. EP 0 202 771 B1 (Aicello Chemical Co. Ltd.), and EP 0 662 527 B1 (Cortec Corp.) and EP 1 138 478 A2 (Aicello Chemical Co. Ltd.). None of these barrier films teach a meat-contact portion comprising a nitrite or nitrate material adapted to maintain desirable coloration of a meat product.

In many packaging applications, such as thermoform fill seal packaging, food packaging forming films are desirable. Formed containers can be made from heat sealable films. A typical formed food packaging container can include a formed pocket drawn to a depth of several inch covered with a lidding film that is heat sealed by the meat packaging agent under vacuum conditions after the food product is inserted into the pocket.

Formed film packages and vacuum skin packages have been used to package fresh, frozen and processed meats for wholesale or retail sale and as processing films for cook-in applications and post-cooking pasteurization processes. Meats cured with nitrites and/or nitrates have been packaged in forming films.

What is needed are packaging products, such as forming and non-forming webs, e.g., films and sheets, and thermoformed packaging articles each of which have a food-contact portion comprising a material adapted to preserve or promote the desirable coloration of a fresh food product.

BRIEF SUMMARY OF THE INVENTION

In a first embodiment, non-shrink oxygen barrier packaging articles are provided that comprise a myoglobin blooming agent to maintain or promote desirable coloration of a meat product. The myoglobin blooming agent can comprise a molecule that interacts with the myoglobin present on the surface of the meat product to produce a color change and/or to maintain a favorable color in the meat product. Preferably, the myoglobin blooming agent is a compound that provides a nitric oxide ligand for binding to myoglobin, to promote or maintain a favorable red color on the meat surface. Preferably, the myoglobin blooming agent is selected from the group consisting of: nitrogen heterocycles, Fremy's salt, nitrate salts having the formula ($MNO_3$), nitrite salts having the formula ($MNO_2$), and combinations thereof, wherein the counter ion (M+) is selected from the group consisting of: alkali metals, alkaline earth metals, transition metals, protonated primary, secondary or tertiary amines, quaternary amines, and ammonium. Nitrate or nitrite salts are particularly preferred myoglobin blooming agents. It is also contemplated that the myoglobin blooming agent is a nitrogen heterocycle selected from the group consisting of: nicotinic acid, nicotinamide, salts and esters thereof, and combinations thereof. The food contact portion of the packaging articles preferably includes a suitable concentration of the myoglobin blooming agent to induce or preserve a desirable color on the surface layer of a fresh meat product. The packaging articles can have any suitable packaging web structure, but it is essential that the myoglobin blooming agent be on, or in, or able to migrate to, a food contact portion. The packaging web may be a monolayer or a multilayer film, a monolayer or a multilayer sheet, or combinations thereof, and have a free shrink as measured before thermoforming at 90° C. of at less than 10% in the machine direction and less than 10% in the transverse direction. Preferably, the packaging webs have a free shrink as measured before thermoforming at 90° C. of less than 5% in each of those directions. Preferably, the monolayer and multilayer film has a thickness of less than 10 mil, and the monolayer and multilayer sheet has a thickness of at least 10 mil, more preferably, between 10 mil and 50 mil, most preferably, between 10 mil and 30 mil. In one aspect, the packaging webs comprise a sealant layer comprising a myoglobin blooming agent. The monolayer and multilayer packaging webs can further comprise an oxygen barrier. The oxygen barrier may be incorporated into the web as one or more film or sheet layers. An oxygen barrier layer can comprise any suitable material, such as EVOH, PVDC, PVOH, polyamide, nanocomposite, aluminum, polyester, polyacrylonitrile or a combination thereof, and is preferably positioned between the first and second layers. Advantageously, at least a portion of the web is transparent to permit viewing (after packaging) of at least a portion of a myoglobin containing food product. Preferably, the inventive packaging web has good optical properties such as low haze, high gloss and good transparency. Beneficially, the film may also bear graphics, indicia, printing, or other information.

In another embodiment, packaged food products are provided. The food products are preferably provided in a case-ready configuration. The packaged food product may include a myoglobin-containing food product having a water content of at least 5 wt. % and less than 1 wt. % sodium chloride; and a container comprising an oxygen barrier and having a food contact layer containing myoglobin blooming agent, wherein the container encloses the food product in a reduced oxygen environment and at least a portion of the food contact layer is in contact with at least a portion of a surface of the myoglobin-containing food product. The webs may be provided in the form of a monolayer or multilayer film, a monolayer or multilayer sheet, or combinations thereof.

It is desirable that the food contact portion layer has a suitable concentration of a myoglobin blooming agent to provide a desired coloration of the surface portion of the food product in contact with the food contact portion. The food product is preferably a meat product with a measurable water content, such as fresh or cured meat, and most preferably fresh, uncured, raw meat. Preferably, the packaged food product includes a meat product having at least about 5% by weight moisture content. Typically, fresh meat may include about 60-80% by weight water, while cured processed meats may include about 40-80% by weight water. Typically fresh meat may have less than 1.0% by weight sodium chloride. Cured processed meat may have 2.0% by weight to 3.5% by weight or higher amounts of sodium chloride. Preferably, the packaged food product includes a meat product having a myoglobin concentration of at least about 0.1 mg per gram of meat or higher concentrations up to about 25 mg/g. Examples of suitable fresh meat products include beef, veal, pork, mutton, lamb, poultry, chicken, turkey, duck, goose, game, fish, and seafood, and preferably include poultry, fish, beef and pork. The package may have any suitable configuration, including vacuum packaging, vacuum skin packaging or trays enclosed in a film of the first embodiment.

Beneficially, a food product comprising myoglobin, preferably having a moisture content of at least 5% by weight and less than 1% by weight sodium chloride, may be provided for packaging less than 20 days post-mortem, preferably less than 12 days post-mortem, and more preferably 6 days, 3 days, 2 days, 24 hours or less post-mortem. Preferably, a meat product is contacted by a packaging material comprising a food contact surface having a myoglobin blooming agent, which may preferably be present in an amount of between about 0.001 mg/in$^2$ and about 0.900 mg/in$^2$ or which may be present on the surface in an amount of up to 10 µmoles/inch$^2$ or higher, preferably from about 0.01 to 10 µmoles/inch$^2$. Use of amounts on the surface greater than 10 µmoles/inch$^2$ may provide an undesirable depth of penetration and use of amounts less than 0.01 µmoles/inch$^2$ may be insufficient to convert enough myoglobin to cause a visibly perceptible color change, but this will be dependent upon such parameters as choice of the particular type of myoglobin containing food such as poultry versus pork versus beef and also upon variations within a particular type such as dark cutting meat versus light cutting meat. Other parameters such as the amount of available myoglobin also affect the amount of myoglobin blooming agent needed to achieve the desired effect. It will be appreciated that greater or lesser amounts may be used depending upon process and other parameters chosen as long as the desired color effect is produced and the actual amount for a particular application and parameters may be determined without undue experimentation. It is expected that the amount most often used will typically fall within the above range. Also preferably, the packaging maintains the food product in a reduced oxygen package environment, i.e., having a reduced gaseous oxygen partial pressure. The reduced oxygen package may comprise an oxygen barrier layer having an oxygen transmission rate of less than about 310 cm$^3$/m$^2$/24 hours measured at 0% relative humidity and 23° C. Advantageously, the package is hermetically sealed and minimizes or eliminates oxygen transfer across the film and/or tray thickness.

The compositions, films, packages and methods provided herein are useful to provide packaged fresh, frozen, hard chilled, thawed, processed and/or cured meat products having a desirable surface color, such as red for fresh ground beef.

DETAILED DESCRIPTION OF THE INVENTION

Definitions

Figure 1:
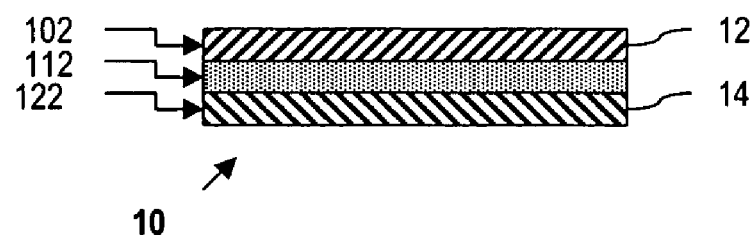
FIG. 1 shows a cross sectional schematic of a first exemplary multilayer film.

In discussing plastic web packaging, various polymer acronyms are used herein and they are listed below. Also, in referring to blends of polymers, a colon (:) will be used to indicate that the components to the left and right of the colon are blended. In referring to film structures, a slash "1" will be used to indicate that components to the left and right of the slash are in different layers and the relative position of components in layers may be so indicated by use of the slash to indicate film layer boundaries. Acronyms commonly employed herein include:

EAA—Copolymer of ethylene with acrylic acid
EAO—Copolymers of ethylene with at least one α-olefin
EBA—Copolymer of ethylene with butyl acrylate
EEA—Copolymer of ethylene with ethyl acrylate
EMA—Copolymer of ethylene with methyl acrylate
EMAA—Copolymer of ethylene with methacrylic acid
EVA—Copolymer of ethylene with vinyl acetate
EVOH—A saponified or hydrolyzed copolymer of ethylene and vinyl acetate
PB—Polybutylene (a butylene homopolymer and/or copolymer of a major portion of butylene with one or more α-olefins; also known as butane-1)
PE—Polyethylene (an ethylene homopolymer and/or copolymer of a major portion of ethylene with one or more α-olefins)
PP—Polypropylene homopolymer or copolymer
PET—Poly(ethylene terephthalate)
PETG—glycol-modified polyethylene terephthalate
PVDC—Polyvinylidene chloride (also includes copolymers of vinylidene chloride, especially with vinyl chloride and/or methyl acrylate (MA)), also referred to as saran.

A "core layer," as used herein, refers to a layer positioned between and in contact with at least two other layers.

An "outer layer," as used herein, is a relative term and needs not be a surface layer.

The term "exterior layer" refers to a layer comprising the outermost surface of a film or product.

The term "interior layer" refers to a layer comprising the innermost surface of a film or product. For example, an interior layer forms the interior surface of an enclosed package. The interior layer can be the food-contact layer and/or the sealant layer.

As used herein, the term "barrier," and the phrase "barrier layer," as applied to films and/or film layers, is used with reference to the ability of a film or film layer to serve as a barrier to one or more gases or moisture.

The term "nanocomposite" shall mean a mixture that includes a polymer, or copolymer having dispersed therein a plurality of individual platelets obtained from exfoliated modified clay and having oxygen barrier properties.

The term "adhesive layer," or "tie layer," refers to a layer or material placed on one or more layers to promote the adhesion of that layer to another surface. Preferably, adhesive layers are positioned between two layers of a multilayer film to maintain the two layers in position relative to each other and prevent undesirable delamination. In some embodiments, a peelable tie layer may be used which is designed to have either cohesive failure or delamination from one or both adjacent layers upon application of a suitable manual force to provide an opening feature for a package made from the film. Unless otherwise indicated, an adhesive layer can have any suitable composition that provides a desired level of adhesion with the one or more surfaces in contact with the adhesive layer material. Optionally, an adhesive layer placed between a first layer and a second layer in a multilayer film may comprise components of both the first layer and the second layer to promote simultaneous adhesion of the adhesive layer to both the first layer and the second layer to opposite sides of the adhesive layer. Tie or adhesive layers may be incorporated into the article structure by any of the well known processes for making multilayer structures such as coextrusion, adhesive lamination and the like.

As used herein, the phrases "seal layer," "sealing layer," "heat seal layer," and "sealant layer," refer to a film layer, or layers, involved in the sealing of the film: to itself; to another film layer of the same film or another film; and/or to another article which is not a film, e.g., a tray. In general, the sealant layer is a surface layer, i.e., an exterior or an interior layer of any suitable thickness, that provides for the sealing of the film to itself or another layer. With respect to packages having only fin-type seals, as opposed to lap-type seals, the phrase "sealant layer" generally refers to the interior surface film layer of a package. The inside layer frequently can also serve as a food contact layer in the packaging of foods.

As used herein, the term "lamination", and the phrase "laminated film", refer to the process, and resulting product, made by bonding together two or more films or other materials. Lamination can be accomplished by joining films together with adhesives, joining with heat and pressure, and even spread coating and extrusion coating. The term laminate is also inclusive of coextruded multilayer films comprising one or more tie layers.

"Polyolefin" is used herein broadly to include polymers such as polyethylene, ethylene-alpha olefin copolymers (EAO), polypropylene, polybutene, and ethylene copolymers having a majority amount by weight of ethylene polymerized with a lesser amount of a comonomer such as vinyl acetate, and other polymeric resins falling in the "olefin" family classification. Polyolefins may be made by a variety of processes well known in the art including batch and continuous processes using single, staged or sequential reactors, slurry, solution and fluidized bed processes and one or more catalysts including for example, heterogeneous and homogeneous systems and Ziegler, Phillips, metallocene, single site and constrained geometry catalysts to produce polymers having different combinations of properties. Such polymers may be highly branched or substantially linear and the branching, dispersity and average molecular weight and may vary depending upon the parameters and processes chosen for their manufacture in accordance with the teachings of the polymer arts.

"Polyethylene" is the name for a polymer whose basic structure is characterized by the chain $-(CH_2-CH_2-)_n$. Polyethylene homopolymer is generally described as being a solid which has a partially amorphous phase and partially crystalline phase with a density of between 0.915 to 0.970 g/cm$^3$. The relative crystallinity of polyethylene is known to affect its physical properties. The amorphous phase imparts flexibility and high impact strength while the crystalline phase imparts a high softening temperature and rigidity.

Unsubstituted polyethylene is generally referred to as high density homopolymer and has a crystallinity of 70 to 90 percent with a density between about 0.96 to 0.97 g/cm$^3$. Most commercially utilized polyethylenes are not unsubstituted homopolymer but instead have $C_2$-$C_8$ alkyl groups attached to the basic chain. These substituted polyethylenes are also known as branched chain polyethylenes. Also, commercially available polyethylenes frequently include other substituent groups produced by copolymerization. Branching with alkyl groups generally reduces crystallinity, density and melting point. The density of polyethylene is recognized as being closely connected to the crystallinity. The physical properties of commercially available polyethylenes are also affected by average molecular weight and molecular weight distribution, branching length and type of substituents.

People skilled in the art generally refer to several broad categories of polymers and copolymers as "polyethylene." Placement of a particular polymer into one of these categories of "polyethylene" is frequently based upon the density of the "polyethylene" and often by additional reference to the process by which it was made since the process often determines the degree of branching, crystallinity and density. In general, the nomenclature used is nonspecific to a compound but refers instead to a range of compositions. This range often includes both homopolymers and copolymers.

For example, "high density" polyethylene (HDPE) is ordinarily used in the art to refer to both (a) homopolymers of densities between about 0.960 to 0.970 g/cm$^3$ and (b) copolymers of ethylene and an alpha-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes." In contrast to HDPE, whose polymer chain has some branching, are "ultra high molecular weight polyethylenes" which are essentially unbranched specialty polymers having a much higher molecular weight than the high molecular weight HDPE.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

Another broad grouping of polyethylene is "high pressure, low density polyethylene" (LDPE). LDPE is used to denominate branched homopolymers having densities between 0.915 and 0.930 g/cm$^3$. LDPEs typically contain long branches off the main chain (often termed "backbone") with alkyl substituents of 2 to 8 carbon atoms.

Linear Low Density Polyethylenes (LLDPEs) are copolymers of ethylene with alpha-olefins having densities from 0.915 to 0.940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range, and metallocene and other types of catalysts are also employed to produce other well known variations of LLDPEs).

Ethylene α-olefin copolymers are copolymers having an ethylene as a major component copolymerized with one or more alpha olefins such as octene-1, hexene-1, or butene-1 as a minor component. EAOs include polymers known as LLDPE, VLDPE, ULDPE, and plastomers and may be made using a variety of processes and catalysts including metallocene, single-site and constrained geometry catalysts as well as Ziegler-Natta and Phillips catalysts.

Very Low Density Polyethylenes (VLDPEs) which are also called "Ultra Low Density Polyethylenes" (ULDPEs) comprise copolymers of ethylene with alpha-olefins, usually 1-butene, 1-hexene or 1-octene and are recognized by those skilled in the art as having a high degree of linearity of structure with short branching rather than the long side branches characteristic of LDPE. However, VLDPEs have lower densities than LLDPEs. The densities of VLDPEs are recognized by those skilled in the art to range between 0.860 and 0.915 g/cm³. A process for making VLDPEs is described in European Patent Document publication number 120,503 whose text and drawing are hereby incorporated by reference into the present document. Sometimes VLDPEs having a density less than 0.900 g/cm³ are referred to as "plastomers".

Polyethylenes may be used alone, in blends and/or with copolymers in both monolayer and multilayer films for packaging applications for such food products as poultry, fresh red meat and processed meat.

As used herein, the term "modified" refers to a chemical derivative, e.g., one having any form of anhydride functionality, such as anhydride of maleic acid, crotonic acid, citraconic acid, itaconic acid, fumaric acid, etc., whether grafted onto a polymer, copolymerized with a polymer, or otherwise functionally associated with one or more polymers, and is also inclusive of derivatives of such functionalities, such as acids, esters, and metal salts derived therefrom. Another example of a common modification is acrylate modified polyolefin.

As used herein, terms identifying polymers, such as, e.g., "polyamide" or "polypropylene," are inclusive of not only polymers comprising repeating units derived from monomers known to polymerize to form a polymer of the named type, but are also inclusive of comonomers, as well as both unmodified and modified polymers made by, e.g., derivitization of a polymer after its polymerization to add functional groups or moieties along the polymeric chain. Furthermore, terms identifying polymers are also inclusive of "blends" of such polymers. Thus, the terms "polyamide polymer" and "nylon polymer" may refer to a polyamide-containing homopolymer, a polyamide-containing copolymer or mixtures thereof.

The term "polyamide" means a high molecular weight polymer having amide linkages (—CONH—)$_n$ which occur along the molecular chain, and includes "nylon" resins which are well known polymers having a multitude of uses including utility as packaging films, bags, and casings. See, e.g., *Modern Plastics Encyclopedia*, 88 Vol. 64, No. 10A, pp 34-37 and 554-555 (McGraw-Hill, Inc., 1987) which is hereby incorporated by reference. Polyamides are preferably selected from nylon compounds approved for use in producing articles intended for use in processing, handling, and packaging food.

The term "nylon" as used herein refers more specifically to synthetic polyamides, either aliphatic or aromatic, either in crystalline, semi-crystalline, or amorphous form characterized by the presence of the amide group —CONH. It is intended to refer to both polyamides and co-polyamides.

Thus the terms "polyamide" or "nylon" encompass both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Preferably, polymers are selected from compositions approved as safe for producing articles intended for use in processing, handling and packaging of food, such as nylon resins approved by the U.S. Food and Drug Administration provided at 21 CFR §177.1500 ("Nylon resins"), which is incorporated herein by reference. Examples of these nylon polymeric resins for use in food packaging and processing include: nylon 66, nylon 610, nylon 66/610, nylon 6/66, nylon 11, nylon 6, nylon 66T, nylon 612, nylon 12, nylon 6/12, nylon 6/69, nylon 46, nylon 6-3-T, nylon MXD-6, nylon MXDI, nylon 12T and nylon 6I/6T disclosed at 21 CFR §177.1500. Examples of such polyamides include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polylauryllactam) and copolymers or mixtures thereof.

In use of the term "amorphous nylon copolymer," the term "amorphous" as used herein denotes an absence of a regular three-dimensional arrangement of molecules or subunits of molecules extending over distances which are large relative to atomic dimensions. However, regularity of structure may exist on a local scale. See, "Amorphous Polymers," Encyclopedia of Polymer Science and Engineering, 2nd Ed., pp. 789-842 (J. Wiley & Sons, Inc. 1985). In particular, the term "amorphous nylon copolymer" refers to a material recognized by one skilled in the art of differential scanning calorimetry (DSC) as having no measurable melting point or no heat of fusion (less than 0.5 cal/g) as measured by DSC using ASTM 3417-83. The amorphous nylon copolymer may be manufactured by the condensation of hexamethylenediamine, terephthalic acid, and isophthalic acid according to known processes. Amorphous nylons also include those amorphous nylons prepared from condensation polymerization reactions of diamines with dicarboxylic acids. For example, an aliphatic diamine is combined with an aromatic dicarboxylic acid, or an aromatic diamine is combined with an aliphatic dicarboxylic acid to give suitable amorphous nylons.

As used herein, "EVOH" refers to ethylene vinyl alcohol copolymer. EVOH is otherwise known as saponified or hydrolyzed ethylene vinyl acetate copolymer, and refers to a vinyl alcohol copolymer having an ethylene comonomer. EVOH is prepared by the hydrolysis (or saponification) of an ethylene-vinyl acetate copolymer. The degree of hydrolysis is preferably from about 50 to 100 mole percent, more preferably, from about 85 to 100 mole percent, and most preferably at least 97%. It is well known that to be a highly effective oxygen barrier, the hydrolysis-saponification must be nearly complete, i.e., to the extent of at least 97%. EVOH is commercially available in resin form with various percentages of ethylene and there is a direct relationship between ethylene content and melting point. For example, EVOH having a melting point of about 175° C. or lower is characteristic of EVOH materials having an ethylene content of about 38 mole % or higher. EVOH having an ethylene content of 38 mole % has a melting point of about 175° C. With increasing ethylene content the melting point is lowered. A melting point of about 158° C. corresponds to an ethylene content of 48 mole %. EVOH copolymers having lower or higher ethylene contents may also be employed. It is expected that processability and orientation would be facilitated at higher contents; however, gas permeabilities, particularly with respect to oxygen, may become undesirably high for certain packaging applications which are sensitive to microbial growth in the presence of oxygen. Conversely lower contents may have lower gas permeabilities, but processability and orientation may be more difficult.

As used herein, the term "polyester" refers to synthetic homopolymers and copolymers having ester linkages between monomer units which may be formed by condensation polymerization methods. Polymers of this type are preferably aromatic polyesters and more preferably, homopolymers and copolymers of poly(ethylene terephthalate), poly (ethylene isophthalate), poly (butylene terephthalate), poly (ethylene naphthalate) and blends thereof. Suitable aromatic polyesters may have an intrinsic viscosity between 0.60 to 1.0, preferably between 0.60 to 0.80.

As used herein, the term "ionomer" refers to an ionic copolymer formed from an olefin and an ethylenically unsaturated monocarboxylic acid having the carboxylic acid moieties partially neutralized by a metal ion. Suitable metal ions may include, but are not limited to, sodium, potassium, lithium cesium, nickel, and preferably zinc. Suitable carboxylic acid comonomers may include, but are not limited to, ethylene/methacrylic acid, methylene succinic acid, maleic anhydride, vinyl acetate/methacrylic acid, methyl/methacrylate/methacrylic acid, styrene/methacrylic acid and combinations thereof. Useful ionomer resins may include an olefinic content of at least 50% (mol.) based upon the copolymer and a carboxylic acid content of between 5-25% (mol.) based upon the copolymer. Useful ionomers are also described in U.S. Pat. No. 3,355,319 to Rees, which is incorporated herein by reference in its entirety.

"Reduced oxygen atmosphere" when referring to a packaged meat product refers to a reduction in the partial pressure of oxygen in contact with the packaged meat product, in comparison with the partial pressure of oxygen in the Earth's atmosphere at standard temperature and pressure at sea level. Reduced oxygen atmosphere packages may include modified atmosphere packages where the oxygen partial pressure is less than that of the Earth's atmosphere at standard temperature and pressure at sea level, or vacuum packages, containing minimal gas pressure in contact with the packaged meat.

As used herein, the phrase "easy open feature" refers to any means for accessing the contents of a container which obviates the need to cut and/or pierce the container with a knife, scissors or any other sharp implement. An easy open feature may be in at least one portion of the web used to form the container and include one or more cuts, notches or surface-roughened areas, lines of structural weakness or combinations thereof. Examples of these types of easy open features are described in co-pending U.S. Patent Application Publication Nos. 2005/0084636 to Papenfuss et al. entitled "Tear Initiation and Directional Tear Films and Packages Made Therefrom" and 2005/0254731 to Berbert et al. entitled "Easy-Open Handle Bag for Medium to Heavy Duty Applications," which are hereby incorporated by reference herein. Alternatively, the easy open feature may include one or more frangible or peelable layers adapted to manually separate or delaminate at least a portion of the web used to form the container and are described in U.S. Reissued Pat. No. RE37, 171 to Busche et al., which is hereby incorporated by reference. It will be appreciated that peelable webs may further comprise one or more reclosable peelable layers, examples of which are described in, but not limited to, co-pending U.S. patent application Ser. Nos. 11/048,425 to Haedt et al. and 11/247,923 to Cruz et al., which are hereby incorporated by reference herein. Examples of still other alternative easy open features include reclosable interlocking fasteners attached to at least a portion of the web used to form the container. Reclosable fasteners, in general, are known and are taught, for example, in U.S. Pat. Nos. 5,063,644; 5,301,394; 5,442,837; 5,964,532; 6,409,384; 6,439,770; 6,524,002; 6,527,444; 6,609,827; 6,616,333; 6,632,021; 6,663,283; 6,666,580; 6,679,027; and U.S. Patent Application Nos. 2002/0097923; and 2002/0196987, each of which is incorporated by reference herein.

"Meat" or "meat product" refers to any myoglobin or hemoglobin containing tissue from livestock such as beef, pork, veal, lamb, mutton, chicken or turkey; game such as venison, quail, and duck; and fish, fishery or seafood products. The meat can be in a variety of forms including primal cuts, subprimal cuts, and retail cuts as well as ground, comminuted or mixed. The meat or meat product is preferably fresh, raw, uncooked meat, but may also be frozen, hard chilled or thawed. It is further believed that meat may be subjected to other irradiative, biological, chemical or physical treatments. The suitability of any particular such treatment may be determined without undue experimentation in view of the present disclosure. As long as the myoglobin blooming agent containing film is effective to promote, develop, enhance or maintain a desirable color it may be advantageously employed to such end. Preferably the meat is less than 20 days post mortem. More preferably the meat is less than 12 days or even 6 days or less post mortem.

Primal cuts of meat are also termed wholesale cuts and both terms refer to large sections of a carcass that are usually sold and/or shipped to butchers who further subdivide the primal into subprimals and individual retail cuts for sale to consumers. Examples of primal cuts of beef are: round; rump; loin end; flank; short loin; plate; rib; brisket; shank; and chuck. Examples of pork primals include: loin; leg; shoulder; and belly.

Subprimals are intermediate in size and may be divided further into retail cuts or are sometimes sold as retail cuts. Beef subprimals include: arm; blade; ribs; beef plate; top round; bottom round; ribs; top butt; bottom butt; tenderloin; and top loin. Pork subprimals include: butt shoulder; picnic shoulder; center cut; sirloin; butt end; shank end; side pork and side rib.

Retail cuts of meat are consumer cuts made by dividing wholesale cuts into smaller pieces. Examples of retail cuts of beef include: steaks such as round, top round, cubed, sirloin, t-bone, porterhouse, filet mignon, rib eye, rib, skirt, flank, and tip; roasts such as blade, pot, and chuck; corned brisket; fresh brisket; stew beef; short ribs; kabobs; eye of round; rolled rump; shank cross cuts; steak rolls; ground beef; and beef patties. Examples of retail cuts of pork include: arm roasts and steaks; spareribs; bacon; salt pork; ham; ham steaks; ham slices; pork tenderloin; chops; cutlets; fat back; sausage; links; and ground pork.

"Fresh meat" means meat that is uncooked, uncured, unsmoked and unmarinated. "Fresh meat" includes post mortem meat that has been physically divided, for example, by cutting, grinding or mixing. There is no added salt in fresh meat that has not been enhanced. Naturally occurring sodium typically is less than 50 mg/100 g of meat and accounts for a salt content of less than about 0.15 wt. %, preferably less than 0.128 wt. %. Values of sodium are in a database for nutritional composition of meat called the "National Nutrient Data Bank", and the data are published in Agriculture Handbook No. 8, "Composition of Foods—Raw, Processed, Prepared" referred to in the industry as "Handbook 8," both of which are hereby incorporated by reference.

"Enhanced meat" means meat that has added water mixed with other ingredients such as sodium chloride, phosphates, antioxidants, and flavoring, e.g., to make meat moist, more tender and to help enhance shelf-life. Fresh beef, pork or poultry after being "enhanced" would typically contain 0.3-0.6 wt. % salt (sodium chloride).

"Processed meat" means meat that has been changed by heat and chemical processes, e.g., by cooking or curing. Cooked ham, hot dogs, and lunch meat are examples of cured processed meat.

"Uncured processed meats" are processed meats that do not contain nitrites or nitrates. Uncured processed meats would typically contain greater than 1.0% by weight, typically 1.2-2.0 wt. %, sodium chloride (salt). Cooked roast beef and bratwurst are examples of uncured processed meat.

"Cured meat" means meat that is preserved through direct addition of nitrite (or nitrate which is converted to nitrite), e.g., having at least 50 ppm sodium nitrite and at least 1% by wt. added salt, i.e., sodium chloride, for the purpose of preservation by retarding bacterial growth. Nitrites, nitrates or blend thereof are commonly present with sodium chloride in curing compositions. "Uncured meat" does not contain added nitrite or nitrate. Wet cured meats are soaked in salt brine. Dry cured meats have salt applied to the surface. Injection cured meats have the curing salts (cure) applied by needle injection into the meat.

Cured processed meats often have 2-3.5 wt. % salt. A brine content of 3.5-4.0 wt. % (2.6-3.0% on a weight basis in treated meat) as the level of sodium chloride salt (potassium chloride may be substituted for some or all of the NaCl) is needed in processed meat to adequately slow down bacterial growth to permit 60-90 day shelf life, although other means of preservation may also be employed to maintain shelf life at reduced salt levels. According to Pegg, R. B. and F. Shahidi, 2000. Nitrite Curing of Meat. Food & Nutrition Press, Inc. Trumbull, Conn. 06611, cured meats may have typical salt levels of 1.2-1.8 wt. % in bacon, 2-3 wt. % in hams, 1-2 wt. % in sausages and 2-4 wt. % in jerkies. It is believed that fresh meat such as beef, pork and poultry has no nitrite or nitrate naturally occurring or added. The United States Department of Agriculture (USDA) permits ingoing nitrite and nitrate for cured and processed meat at a level up to a maximum of 625 ppm sodium nitrite or 2,187 ppm sodium nitrate in dry cured products. In other applications levels have different limits, e.g., in typical cooked whole muscle meat products the limit as sodium nitrite is 156 ppm and in comminuted meats, 200 ppm. The maximum nitrite usage level in hot dogs or bologna is typically 156 ppm, while that for bacon is 120 ppm. Sodium ascorbate (or similar compounds) may be present in these cures.

In Europe it is believed that the minimum level of salt and nitrite required by law for curing is 1.0 wt. % and 50 ppm respectively. The USDA has stated: "As a matter of policy, the Agency requires a minimum of 120 ppm of ingoing nitrite in all cured "Keep Refrigerated" products, unless the establishment can demonstrate that safety is assured by some other preservation process such as thermal processing, pH or moisture control. This 120 ppm policy for ingoing nitrite is based on safety data reviewed when the bacon standard was developed." (See, "Processing Inspectors' Calculations Handbook", Chapter 3, p. 12, revised 1995). The Handbook also states: "There is no regulatory minimum ingoing nitrite level however 40 ppm nitrite is useful in that it has some preservative effect. This amount has also been shown to be sufficient for color-fixing purposes and to achieve the expected cured meat or poultry appearance."

The meat product can be any meat suitable for human consumption that contains a myoglobin like molecule. References to total myoglobin in a meat product refer to the amount of the myoglobin like molecules that are physiologically present in the meat tissue prior to harvesting for human consumption. Specific meat products contain a level of myoglobin sufficient to provide its characteristic color. Examples of suitable fresh meat cuts include beef, veal, pork, poultry, mutton, and lamb. The concentration of myoglobin varies in these different types of meat products. For example, beef typically contains about 3-20 mg of myoglobin per gram of meat, pork contains about 1-5 mg myoglobin per gram of meat, chicken contains less than about 1 mg myoglobin per gram of meat. Thus, the concentration of total myoglobin compounds in the above described meat products is typically between about 0.5 mg and 25 mg of myoglobin compounds per gram of the meat product.

In fresh meat (postmortem muscle tissue), oxygen can continually associate and disassociate from the heme complex of the myoglobin molecule. It is the relative abundance of three forms of the muscle pigment that determines the visual color of fresh meat. They include purple deoxymyoglobin (reduced myoglobin), red oxymyoglobin (oxygenated myoglobin); and brown metmyoglobin (oxidized myoglobin). The deoxymyoglobin form typically predominates immediately after the animal is slaughtered. Thus, freshly cut meat can have a purple color. This purple color can persist for a long time if the pigment is not exposed to oxygen. Cutting or grinding exposes the pigment to oxygen in the atmosphere, and the purple color can quickly convert to either bright red (oxymyoglobin) or brown (metmyoglobin). Thus, although deoxymyoglobin is technically indicative of fresher meat, it is the red or "bloomed" meat color that consumers use as their primary criterion for perceiving freshness. It is believed, without wishing to be bound by the belief, that the preferred red color of fresh meat occurs when at least 50% of the deoxymyoglobin molecules are oxygenated to the oxymyoglobin state. Changes in the relative percentage of each of these forms can continue to occur as fresh meat is exposed to oxygen for longer periods of time. The immediate conversion of the purple color to the desirable bright red or undesirable brown can depend on the partial pressure of oxygen at the surface. The purple color is favored at the very low oxygen level, and can dominate at oxygen levels of 0-0.2% by volume. The brown color is favored when the oxygen level is only slightly higher (0.2% to 5.0%). Consumer discrimination typically begins when the relative amount of metmyoglobin is 20%. A distinctly brown color is evident at 40% metmyoglobin, which typically renders the meat unsaleable even though it remains nutritious and healthy for consumption.

Certain biochemical reactions that occur in muscle tissue after death can also affect fresh meat color, such as the presence of active glycolytic enzymes that convert oxygen to carbon dioxide. Reducing coenzymes called metmyoglobin reductases present in meat convert metmyoglobin back to deoxymyoglobin, and their activity is called "MRA" which is an abbreviation for metmyoglobin reducing activity. MRA can be described as the ability of muscle to reduce metmyoglobin back to its natural deoxymyoglobin state. MRA is lost when the oxidizable substrates are depleted or when heat or acid denatures the enzymes. When the enzymes lose their activity or are denatured, the iron of the heme pigment automatically oxidizes to the metmyoglobin form, and the brown color stabilizes and dominates. MRA persists for a period of time after death depending on the amount of exposure of the meat tissue to oxygen. During this time, oxygen is continually consumed by the meat tissue. The oxygen consumption rate is referred to as "OCR". When meat that has a high OCR is exposed to oxygen, the oxygen tension is reduced so rapidly that the metmyoglobin is favored below the viewing surface. If it is close to the viewing surface, the perceived color of the meat is affected. The MRA is important to minimize this layer of metmyoglobin that forms between the bloomed surface and purple interior. As the MRA wears out, the brown metmyoglobin layer thickens and migrates toward the surface, thus terminating display life. When the MRA is high, the metmyoglobin layer is thin and sometimes not visible to the naked eye.

MRA and OCR relate to determining the types of packaging best suited for retail sale in order to prolong the desirable appearance of meat as long as possible. Hermetically sealed packages with films that are a barrier to oxygen will cause a low oxygen tension on the meat surface. Thus, metmyoglobin formation occurs and the viewing surface changes to an undesirable brown color. However, if the OCR is high enough to keep ahead of the oxygen that migrates across the packaging film, and the MRA is good enough to reduce metmyoglobin that forms on the surface, then native deoxymyoglobin replaces metmyoglobin. After a period of time, the perceived color changes from brown to purple. Both of these colors are unacceptable to the consumer. For this reason, vacuum packaging by itself has historically been an unacceptable format for case ready fresh meat although it is used to ship subprimal and other large cuts of meat from the slaughterhouse to retail butchers for further processing and re-packaging. On the other hand, vacuum packaging is the format of choice for cooked and cured processed meats where the myoglobin pigment is denatured by heat. Heat from cooking causes the globin portion of the nitrosylated myoglobin molecule to denature and separate from the heme portion. It is the nitrosylated heme complex that gives cured and processed meats their characteristic color. When oxygen is eliminated from a cured processed meat package, the product's color and flavor can deteriorate slower than when oxygen is present. In the present invention, oxygen must be removed from the environment of the meat before the preferred color can develop. A certain amount of oxygen penetrates the meat after slaughter and fabrication. This oxygen is eliminated by the OCR/MRA activities. Similarly, those activities facilitate the dominance of the deoxymyoglobin form of the myoglobin molecule. It is believed, but not wishing to be bound by the belief, that the OCR/MRA activities also facilitate the reduction of nitrite to nitric oxide. The formation of deoxymyoglobin and nitric oxide allows for the bloomed color development. Oxygen itself is a blooming agent because it causes the formation of oxymyoglobin as described earlier herein. However, oxygen interferes with the reactions that form deoxymyoglobin and nitric oxide. Therefore, it interferes with the bloomed color development in the presence of nitrite. Thus, it is a preferred aspect of the present invention that an oxygen barrier layer is selected and configured to protect the meat surface from the ingress of atmospheric oxygen during the formation of the desired bloomed meat color.

Myoglobin Blooming Agents

A "myoglobin blooming agent" refers to any agent (or precursor thereof) that binds to or interacts with any myoglobin-containing structure (including but not limited to deoxymyoglobin, oxymyoglobin, metmyoglobin, carboxymyoglobin, and nitric oxide myoglobin) present in a fresh meat product to produce or preserve a desired color, such as a red color indicative of fresh meat. The myoglobin blooming agent may also interact or cause an interaction with hemoglobin present in a meat product so as to produce, maintain or enhance, i.e., "fix," a desired color. Thus, the myoglobin blooming agent is not a color additive, but it acts as a color fixative. In one preferred embodiment, the myoglobin blooming agent is a "nitric oxide donating compound" ("NO donor") that provides a nitric oxide (NO) molecule that binds to the myoglobin present in a meat product so as to maintain or promote a reddening or blooming or other favorable coloration of the meat product. A nitric oxide donating compound releases nitric oxide or is a precursor, e.g., nitrate which acts as an intermediate leading to the formation of nitric oxide which binds to a myoglobin molecule in a meat product. In a first aspect, the myoglobin blooming agent is a nitrate ($MNO_3$) or nitrite ($MNO_2$) salt, where suitable metal counter ion ($M^+$) can be selected from the group consisting of: alkali metals (e.g., sodium, potassium), alkaline earth metals (e.g., calcium), transition metal, ammonium and or protonated primary, secondary, or tertiary amines or quaternary amines. In a second aspect, the myoglobin blooming agent comprises a Fremy's salt [$NO(SO_3Na)_2$ and $NO(SO_3K)_2$]. Other suitable nitric oxide donating agents are disclosed in U.S. Pat. No. 6,706,274 to Herrmann et al. (filed Jan. 18, 2001), U.S. Pat. No. 5,994,444 to Trescony et al. (filed Oct. 16, 1997), and U.S. Pat. No. 6,939,569 to Green et al. (filed Jun. 18, 1999), as well as published U.S. Patent Application No. US2005/0106380 by Gray et al. (filed Nov. 13, 2003). The myoglobin blooming agent may be a salt, particularly a nitrite or nitrate salt. Sodium nitrate or sodium nitrite or blend thereof may typically be used. Potassium nitrate or potassium nitrite may also be used. Additionally suitable compounds may include a nitrogen containing agent that promotes the release or formation of NO such as nitrite reductase, nitrate reductase or nitrosothiol reductase catalytic agents, including the materials described in WIPO Publication No. WO 02/056904 by Meyerhoff et al. (filed Jan. 16, 2002), which is incorporated herein by reference. Other examples of nitrogen containing compounds suitable for use as a myoglobin blooming agent include, but are not limited to, nitrogen heterocyclic compounds, such as nicotinic acid, nicotinamide, and salts and esters thereof. It is expected that these agents and compounds would be suitable myoglobin blooming agents. Other suitable agents may include sulfur containing compounds that similarly bind or act as precursors or intermediates to agents that fix a desirable color by binding to myoglobin.

Myoglobin blooming agents, such as sodium nitrate, and solutions or dispersions thereof may be colorless or may have an intrinsic pale color (i.e., may not be totally colorless), but this color does not typically have sufficient intensity itself to act as a significant colorant or color additive. However, this does not preclude either the use of colored myoglobin blooming agents which impart an intrinsic color or the combination of a myoglobin blooming agent in combination with one or more natural and/or artificial colorants, pigments, dyes and/or flavorants such as annatto, bixin, norbixin, beet powder, caramel, carmine, cochineal, turmeric, paprika, liquid smoke, one or more FD&C colorants, etc.

The myoglobin blooming agent is believed to cause an interaction with myoglobin in meat products, thereby maintaining, promoting or enhancing a desirable meat color. Myoglobin includes a non-protein portion called heme and a protein portion called globin. The heme portion includes an iron atom in a planar ring. The globin portion can provide a three-dimensional structure that surrounds the heme group and stabilizes the molecule. The heme group provides an open binding site that can bind certain ligands having the proper shape and electron configuration to bond to the iron atom. When a ligand enters and binds to the heme pocket, the electron configuration of the ligand can change the shape of the globin portion of the molecule in a manner that affects light absorption characteristics of the heme group. Therefore, the presence or absence of a ligand such as oxygen in the heme pocket, and the ligand itself can result in visible color changes of myoglobin.

When there is no ligand in the heme pocket, myoglobin is called deoxymyoglobin, which has a purple color (which is sometimes characterized as a deep red, dark red, reddish blue or bluish red). Molecular oxygen, $O_2$ ("oxygen") readily acts as a ligand that binds to the heme group, permitting biological transport of oxygen from the blood stream to the mitochondria within cells. When oxygen binds to the heme pocket, purple deoxymyoglobin becomes oxymyoglobin, characterized by a red color. Upon dissociation of the oxygen ligand from oxymyoglobin, the iron atom is oxidized leaving the iron in the ferric state. As the chemical state of iron can change from ferrous ($Fe^{2+}$) to ferric ($Fe^{3+}$), the three-dimensional structure of the globin part can change in a manner that allows water molecules to bind to the heme pocket. Binding of a water molecule in the ferric iron containing heme pocket affects light absorption of the heme pocket. The oxidized form of myoglobin with a water molecule in the heme group is referred to as metmyoglobin and its color is brown. The oxidation of the iron atom is believed to result in a brown color. Heme ligands other than oxygen or water may also affect meat color. For example, the presence of cyanide or fluorine can cause an undesirable brown meat color, and the presence of carbon monoxide (CO) may cause a desirable bright red color similar to oxygen. Although it has been suggested that nitric oxide (NO) can cause a dull red color (or stable pink in the case of cured meat which also contains sodium chloride), it has been discovered that, in the absence of oxygen, NO may produce a desired bright red color similar to that caused by oxygen in uncooked meat, especially in fresh, raw, unprocessed or uncured meat. It has been discovered that the development of this desired bright red color may take many hours and typically may take from 1 to 5 days and that initially, the meat color in a vacuum package having an oxygen barrier, may turn to an undesirable brown until the unexpected transformation to the desired red takes place.

Other variables that affect the stability of the globin portion also affect the affinity of the heme group for oxygen and the tendency of the chemical state of the iron atom to become oxidized. Acidity and high temperature, such as that associated with cooking, can denature the globin part thus leading to instability of the heme group. In the absence of stabilizing ligands the oxidation of the heme iron is automatic when the globin is denatured.

Forming Articles

Thermoforming and other similar techniques are well known in the art for packaging food products. A description of typical thermoforming techniques appears in Modern Plastics Encyclopedia, 1984-1985, at pages 329-336; Brody, Aaron L. et al., The Wiley Encyclopedia of Packaging Technology, 2nd Edition, 1997, at pages 910-921; and Mark, Herman F. Encyclopedia of Polymer Science and Technology, 3rd edition, 2003 at pages 222-251. Suitable thermoforming methods include standard, deep-draw, or plug-assist vacuum forming. During standard vacuum forming, a thermoplastic web, e.g., a film or sheet, is heated and a vacuum is applied beneath the web allowing atmospheric pressure to force it into a preformed mold. When relatively deep molds are employed, the process is referred to as a "deep-draw" application. In a plug-assist vacuum forming method, after the thermoplastic film or sheet has been heated and sealed across a mold cavity, a plug shape similar to the mold shape impinges on the plastic substrate and, upon the application of vacuum, the film conforms to the mold surface.

After the thermoformed article, or thermoform, is in place, a product is placed on the thermoform and a second closing film or sheet is draped over the product. The package is evacuated and sealed with a device such as a heated jaw. The thermoform encloses a substantial portion, generally more than half, of the product to be packaged. The closing film or sheet remains mostly flat atop the product and may display product labeling consisting of colored type, pictures, etc.

The current application employs a thermoformable web that may be deep-drawn resulting in a thermoform. After being filled with a food product, the thermoform is bonded to a closing planar structure such as a lidding web, e.g., a film or sheet, preferably containing a suitable sealing component composition which may be the same as the thermoform.

Embodiments of the thermoformed films that exhibit measurable shrink rates up to 10% in both the machine direction and the transverse direction at 90° C. may also be used in form shrink applications such as those made using Multivac R 550, R250 and R 150 thermoforming machine, e.g., in combination with a heat shrinkable lidding web.

The forming processes using forming films are commonly performed by the food packager, e.g., a retail meat packager, using a horizontal thermoform fill seal machine. The machines usually use two continuous webs or rolls of film, though cut sheets may be used, especially for rigid or semi-rigid films. Typically, the lower web is heated and then formed into a cup shape. Frequently, a mold and/or cavity is used which has the desired shape, and a vacuum assist may be used. The shape of the formed film is set by cooling, which is then filled with food. The upper web becomes the lid and is sealed to the lower web under vacuum packaging conditions. Although the literature reports that 90% of machines are run in this manner, sometimes the upper web is also formed, and sometimes the upper web is formed while the bottom web is not. The draw depth of thermoformed packages typically ranges from 0.25 inch up to 8 inch. Many products have a draw depth of at least 0.50 inch and most between 0.50 inch to 2.5 inch. The draw depth may be set at any dimension depending on the product and amount of product to be packaged. All thermoformed articles as defined herein have a draw depth of at least 0.125 inch. The geometry may be circular (e.g., for bologna), rectangular, square, triangular (e.g., for cheese), ovals (e.g., for loop sausage), or irregular shapes such as for shingle packs. Vacuum skin packaging is preferable for irregular shaped foods, such as lobsters and steak cuts, where the food itself acts as the mold for the forming web.

Packaging Trays

While thermoformable webs may retain flexibility after being shaped, certain films may also have sufficient rigidity after being formed to serve as packing trays. Such rigid trays often have flexible webs peelably sealed to flanges extending from the top of the trays. For making deep trays, thermoforming techniques such as vacuum forming, pressure forming, plug assist or mechanical forming processes are useful. To obtain the degree of softening required to a multilayer sheet so it can be easily thermoformed into containers having uniform sidewall thicknesses, the webs are often preheated to a temperature between about 375° F. to about 425° F. Examples of such trays and peelable web lids are disclosed in co-pending U.S. patent application Ser. No. 11/416,966 to Lischefski et al. and U.S. Pat. No. 4,810,541 to Newman et al., which are hereby incorporated by reference herein.

Packing trays may also be made from composites of cardboards and extruded thermoformable laminate films, with film lids sealed to the flanges around the top of the tray. Examples of such trays are disclosed in U.S. Pat. No. 6,651,874 to Pedersen et al., which is hereby incorporated by reference herein. Expanded polystyrene foam with an oxygen barrier film laminate may also be useful for forming into packaging trays in accordance with embodiments of the invention, though transparent trays may be particularly advantageous by allowing customers to inspect the underside of the packaged meat in contact with the tray. Such packages may be useful for modified atmosphere packaging (MAP) where the air in the sealed package is replaced by or supplemented with a gas such as carbon monoxide.

Vacuum Skin Packaging

Vacuum skin packaging (VSP) is another process well known in the art that uses a thermoplastic packaging material to enclose a product. Various apparatus and processes are described in U.S. Pat. Nos. 3,835,618, 3,950,919, and Reissue 30,009, all issued to Perdue. The vacuum skin packaging process is in one sense a type of thermoforming process in which an article to be packaged serves as the mold for the thermoform. An article may be placed on a support member, a card, either rigid or semi-rigid, or other bottom, and the supported article is then passed to a chamber where a top film is drawn upward against a heated dome and then draped over the article. The movement of the plastic top film is controlled by vacuum and or air pressure, and in a vacuum skin packaging arrangement, the interior of the container is evacuated before final sealing of the top film to the support. Thermoformable material may be used as both the top web and bottom support in conjunction with an intermediate support for products held on either side of the support as shown for example in U.S. Pat. No. 3,966,045.

In vacuum skin packaging, a product to be packaged is placed on a product supporting member. The product serves as the mold for a thermoformable polymeric web. The thermoformable web is formed about the product by means of differential air pressure. However, the term "vacuum skin packaging" (hereinafter, "VSP") refers to not only the fact that the thermoformable web is formed around the product by vacuum or differential air pressure, but also to the fact that the product is packaged under vacuum, with the space containing the product being evacuated during the packaging. Examples of such vacuum skin packaging are disclosed in co-pending U.S. patent application Ser. No. 11/141,144 to Berbert, which is hereby incorporated by reference herein.

Vacuum skin packaging processes generally use a vacuum chamber with an open top. The product (on an impermeable backing board through which vacuum is not drawn), is placed on a platform within the vacuum chamber. The top of the chamber is covered by a web which is clamped tightly against the chamber to form an air-tight closure. The chamber is evacuated while the web is heated to its forming and softening temperature. The platform is then raised to drive the product into the softened film, and air pressure can be used about the film to force it tightly around the product.

In vacuum skin packaging, it is also known to release the vacuum and allow ambient air into the chamber, after the chamber has been evacuated and the product driven into the heat-softened film, or vice versa. In this manner, the thermoplastic web molds more or less over and against the product, since there is a vacuum inside the package, and ambient air pressure, or more than ambient air pressure, immediately outside of the package.

In addition, non-shrink films having a slight heat shrinkable characteristic may be useful for vacuum skin packaging. Webs with a heat shrink rate of up to 10% at 90° C. may be used to seal a product in a vacuum packaging operation. It may occur that non-shrink bags have an undesirable wrinkled appearance with excess film forming "ears", tabs and other protrusions, and internal forces, e.g., from whole bird poultry wings and legs or purge of internal juices or gases may cause loss of contact with food product surfaces which are undesirable. Once the web separates from the enclosed article surface, the myoglobin blooming agent is not in contact and oxygen may also come into contact with the article surface and either event may result in an undesirably non-uniform color or other product defects. After sealing, the package may pass through a heat tunnel to slightly shrink the web against the packaged product to minimize ears or flaps in the web and provide a neater, tighter packaged appearance.

Thermoformable multilayer films and sheets are useful for forming dimensionally stable structures for packaging food and other products. The structures or containers are made by softening a portion of the film through application of heat, forming the softened film to a desired shape, and cooling the film to set the shape. Commonly, hot dogs and sliced cold cuts, such as bologna, are packaged in containers made from thermoformable webs. Also, bacon is packaged in a thermoformed package having a shallow draw.

Thermoformable webs may be made by flat die, slot cast monoextrusion or coextrusion or single-bubble blown coextrusion. Webs made by these processes are practically non-oriented as opposed to manufacturing processes which induce high levels of orientation in webs such as the double-bubble or the tenter frame process. The tenter frame process may also be used to form thermoformable webs. Suitable formable webs characterized as being non-oriented may have a heat shrinkage value frequently less than about 10%, and preferably less than 5% at 90° C. in either or both the machine direction (MD) and the transverse direction (TD) as measured before thermoforming.

A typical thermoformable web may include an outer layer comprising a blend of a very low density polyolefin, ethylene vinyl acetate, and a compatibilizer; an intermediate layer comprising a mixture of nylon copolymer and an amorphous nylon; an inner layer comprising a polyolefin or ionomeric polymer; and at least one adhesive that bonds said outer, intermediate, and inner layers together. Examples of such webs are disclosed in U.S. Pat. No. 6,861,127, to Glawe et al., which is hereby incorporated by reference herein.

Another example of a thermoformable web may incorporate a first layer of polyester, the polyester being selected from the group consisting of a homopolymer or copolymer of ethylene terephthalate, ethylene naphthalate and blends thereof; a second layer of an adhesive; and a third layer comprising a nylon blend, the third layer preferably being a blend between about 100% (wt.) to about 71% (wt.) of a nylon selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-dodecanediamide)), nylon 6,6/6 (poly(hexamethylene adipamide-co-caprolactam)), nylon 11 (polyundecanolactam), nylon 12 (polylauryllactam) and alloys or mixtures thereof; and between about 0% (wt.) to about 29% (wt.) of an amorphous nylon. The first layer, the second layer and the third layer may be formed into a flexible web by a coextrusion process to form a web that has a heat shrinkage value less than about 5% in the machine direction at 90° C. and less than about 5% in the transverse direction at 90° C. as measured before thermoforming. The sheet or film may comprise additional core layers of nylon blends as described above, adhesives and oxygen barriers. A representative multilayer film of this type may include PET/Adhesive/Nylon Blend/EVOH/Nylon Blend/Adhesive/Ionomer. In certain embodiments, the sheet or film may have a percent elongation at break at room temperature greater than about 250 percent in the machine direction and greater than about 250 percent in the transverse direction. Optionally, the second layer and third layer have a combined thickness of 10 mil or less. Examples of such films are disclosed in U.S. Pat. No. 6,964,816 to Schell et al., which is hereby incorporated by reference herein.

Still other embodiments of thermoformable webs may include a seven layer structure including in sequence layers comprising nylon, adhesive, nylon, adhesive, nylon, adhesive, and a polymer sealant layer. Preferably, the polymer sealant layer includes a polymer selected from the group consisting of low density polyethylene, linear low density polyethylene, ethylene vinyl acetate copolymer, ethylene methacrylic acid copolymer, ethylene methacrylate copolymer, ethylene acrylic acid copolymer, an ionomer, and combinations thereof. The film may have a thickness between 5 mil and about 10 mil. Examples of such films are disclosed in U.S. Pat. Nos. 6,068,933 and 6,562,476 to Shepard et al., which are hereby incorporated by reference herein. If such films do include an EVOH core layer, it is preferable that the multilayer structure include in sequence layers comprising nylon, adhesive, nylon, EVOH, nylon, adhesive, and a heat sealable polymer. The nylon layers may be formed from two or more layers of nylon coextruded to form a single layer of nylon. The film may include a layer of ionomer between the heat sealable polymer and the adhesive layer. The film may include an outer layer comprising an anhydride modified polyolefin. Examples of such films are disclosed in U.S. Pat. No. 6,942,927 to Shepard et al., which is hereby incorporated by reference herein.

Forming films may be made by a variety of processes, including blown web processes, lamination processes, extrusion coating processes or combinations thereof. For example, an extrusion coated forming web may include a two-layer blown film comprising an outer layer blend of 70% by weight ULDPE, 25% by weight LLDPE and 5% by weight additives coextruded in a single bubble blown film process with a sealant layer of 70% by weight ionomer, and 30% by weight of an ionomer carrier containing 5% by weight sodium nitrite. The two-layer film is formed with a 2.0 mil outer layer and a 0.75 mil sealant layer. A PVDC-based adhesive is applied with a gravure roller to the outer layer of the blown film. Nylon 6 is extrusion coated over the PVDC adhesive coating in sufficient amounts to create a 2.1 mil thick nylon coating. The resultant forming film includes 1.5% by weight myoglobin blooming agent in the sealant layer. Instead of coating a PVDC layer on the blown film, an oxygen barrier polymer may be coextruded with the blown film and then extrusion coated with nylon. Frequently, similar nylon extrusion films may include a similar structure except the sealant layer may be predominantly EVA instead of EMAA.

Similar lamination processes may be used to make non-shrink, non-forming webs which may be useful as mating substrates for the forming webs or vacuum shrink packaging films, or may be useful for making non-shrink bags or packages for vacuum packaging. For example, a 3.0 mil blown film may include an outer layer/tie/EVOH/tie/core/sealant layer structure. The outer layer may include 70% by weight ULDPE, 25% by weight LLDPE and 5% by weight additives, the core layer may include 100% by weight EVA, and the sealant layer may include 67% by weight EVA %, 30% by weight LLDPE carrier with 5% by weight sodium nitrite and 3% by weight additives. This 3 mil blown film may undergo adhesive lamination to a 48 gauge oriented PET film that has been corona treated to thereby obtain a non-shrink, non-forming film with 1.5% by weight myoglobin blooming agent in the sealant layer. Alternatively, in a six-layer blown film, the core layer may include 94% by weight ionomer and 6% by weight additives, and the sealant layer may include 60% by weight ionomer and 40% by weight ionomer carrier with 5% by weight sodium nitrite. Other such laminated film structures include 50 gauge PVDC coated oriented PET film/adhesive/3 mil blown film, where the 3.0 mil two-layer blown film includes 70% by weight ULDPE:25% by weight LLDPE:5% by weight additives/100% by weight EVA, or the two-layer blown film includes 70% by weight ULDPE:25% by weight LLDPE:5% by weight additives/94% by weight ionomer:6% by weight additives and the myoglobin blooming agent is applied to the surface of the sealant layer in a later operation.

Films and sheets useful in the present invention may include one or more thermoformable films and sheets, packaging trays, vacuum skin packaging films and sheets and non-forming mating films and sheets for these films and/or sheets, such as described above, which have been modified to include a myoglobin blooming agent in or on the film layer surface in contact with the packaged food product.

Myoglobin Blooming Agent Levels

In the present invention, oxygen barrier, food packaging forming webs having a food contact surface comprising a myoglobin blooming agent are provided. A "food contact surface" refers to the surface portion of a packaging material that is designed to contact a packaged meat product surface. A "food contact layer" refers to the layer of the web which is bounded by the food contact surface. Preferably, the food packaging web includes a food contact surface or food contact layer comprising a myoglobin blooming agent in an amount effective to promote or maintain a desirable color after contact with a meat product. The myoglobin blooming agent (MBA) preferably will contact the meat surface in an amount sufficient to produce a desired red color which preferably does not penetrate to an undesirable depth of the food thickness under reduced oxygen conditions (this color may take awhile to develop, e.g., 1 to 5 days). Beneficially the MBA may be present on the film food contact surface (or on the myoglobin food surface) in an amount of from about 0.01 to 3 to 5 to 10 $\mu$moles/in$^2$ and in increments of 0.1 $\mu$mole thereof. Greater or lesser amounts of MBA may be used and the color intensity may thereby be varied depending upon the relative amount of myoglobin present.

Thus, the food contact surface of the film or sheet preferably contains a myoglobin blooming agent in a concentration high enough to produce and/or maintain a desired surface coloration of a fresh meat product, but low enough to prevent undesirable extension of the color into the body of the meat product. Preferably, the myoglobin blooming agent is present on a food contact surface in a concentration that is sufficient upon contact with a meat surface to convert at least 50% of the targeted myoglobin molecules to a desired ligand binding state. The available amount or concentration of myoglobin blooming agent is preferably selected to bind ligands producing desirable coloration of the meat to the myoglobin molecules in the outermost ¼-inch, or ⅙, ⅛, 1/10, 1/12, 1/16 or 1/20 -inch or less of the meat product, although deeper penetrations may be accomplished if desired. For example, a nitric oxide donating myoglobin blooming agent is desirably present in a concentration sufficient to convert at least 50% of the myoglobin molecules on the contacting meat surface to nitric oxide myoglobin. The myoglobin blooming agent may be coated on a monolayer film or sheet, or on the interior layer of a multilayer film or sheet, or it may be incorporated therein.

The myoglobin blooming agent is preferably evenly or uniformly distributed on the surface of the food contact surface. The minimum amount required to cause the desired coloration depends on the concentration of myoglobin present in the food product. For example, beef products containing 10 mg/g of myoglobin may require 10 times more myoglobin blooming agent than pork or poultry products containing 1 mg/g of myoglobin. Also, if the desired depth of penetration is 0.25 inch, then in order to affect all of the myoglobin molecules (molecular weight of myoglobin is about 17,000 g/mole) in 1 square inch of beef to a depth of 0.25 inch, there would have to be at least 2.4 µmoles of the myoglobin blooming agent available for transfer via the surface of 1 square inch of film (one square inch of beef to a depth of about 0.25 inch equals about 4.1 grams of meat (specific gravity of 1 g/cc)). Sodium nitrite as a preferred myoglobin blooming agent has a molecular weight of 69 g/mole. Thus 2.4 µmoles of $NaNO_2$ weighs 0.166 mg and the total amount of myoglobin in 4.1 grams of meat containing 10 mg/g is 41 mg. Beef meat typically contains myoglobin at a level of 3-20 mg/g. The preferred amount of myoglobin blooming agent that would be present on the film for beef is 0.72-4.8 µmoles/$in^2$. Similarly, pork contains myoglobin at a level of 1-5 mg/g. A packaging web for this application would provide 0.24-1.20 µmoles/$in^2$. Poultry having less than 1 mg/g of myoglobin would preferably use a web providing less than 0.24 µmoles/$in^2$, e.g., 0.12 µmoles/$in^2$. A film or sheet using sodium nitrite (MW=69 g/mole) as a myoglobin blooming agent would preferably provide 0.050-0.166 mg/$in^2$ for beef meat products; 0.017-0.050 mg/$in^2$ for pork meat products; and less than 0.017 mg/$in^2$ for poultry meat products. A film or sheet providing 0.17 mg/$in^2$ would be suitable for a variety of types of fresh meat.

A higher amount of sodium nitrite may be preferred for darker colored muscles that may contain higher levels of myoglobin. When the myoglobin blooming agent is incorporated into the polymer matrix that comprises the food contact layer of a monolayer or multilayer packaging film or sheet only a portion of it is able to effectively migrate from the film surface into the product's surface. Web inclusion levels of up to 20 times or higher of the amount required for effective color fixing are anticipated.

Thus, the amount of myoglobin blooming agent per unit area of the food contact surface can be selected to provide a desired food coloration of a packaged fresh meat product surface. For example, the food contact layer can include about 0.005 to about 0.900 mg/$in^2$ of a myoglobin blooming agent such as sodium nitrite, preferably about 0.010 to about 0.400 mg/$in^2$ and most preferably about 0.100 to about 0.300 mg/$in^2$. For beef products, a food contact layer may include, e.g., about 0.200 to about 0.250 mg/$in^2$, e.g., of a sodium nitrite myoglobin blooming agent, while lower concentrations, e.g., of about 0.100 to about 0.150 mg/$in^2$ may be used for pork products.

A uniform dispersion or coating having particle size of 35 micrometers (µm) or less, preferably 10 µm or less is desirable. Although larger particle sizes may also be used, the film prior to use is less aesthetically pleasing. If particle size is too large, the myoglobin containing product may exhibit an initial spotty appearance although results tend to even out and become more uniform over time and such desirable color uniformity (i.e., lack of spottiness or blotches) is often present upon color transformation from brown to red. Advantageously, the myoglobin blooming agent may be applied in a manner to wet out the surface of the food contact layer of the web using film forming agents, surfactants, binding agents and other compounds for the purpose. For example, the myoglobin blooming agent according to the present invention may be sprayed on a food contact surface of the film or sheet. Tubular films and casings also may be coated by other means (including the well known methods of dipping and slugging). Typical myoglobin blooming agents do not easily pass through the film wall and therefore it is preferable to slug the myoglobin blooming agent inside the tube and/or apply the myoglobin blooming agent to the inner surface of the tube (e.g., during a shirring operation) via a spray, because external application (e.g., by dipping) would require a complex and more costly operation of turning the tube inside out to provide contact between the myoglobin blooming agent and the meat contact surface. Application of other additives and coating compositions via solution spraying during or just prior to shirring is convenient, economical and facilitates placement of a regular measured distribution of a coating on the interior tube surface. For example, lubricants and other compositions have been applied by various means such as slugging, spraying, or contact coating the inner surface of a tubular polymeric casing via a shirring mandrel and such means are well known (See, e.g., U.S. Pat. No. 3,378,379 (Shiner); U.S. Pat. No. 3,451,827 (Bridgeford); U.S. Pat. No. 4,397,891 (Kaelberer et al.); U.S. Pat. No. 5,256,458 (Oxley et al); U.S. Pat. No. 5,573,800 (Wilhoit); and U.S. Pat. No. 6,143,344 (Jon et al.), which are all incorporated by reference in their entireties.) Packages made according to the present invention may be coated with the inventive myoglobin blooming agent by slugging to provide a uniformly thick coating.

Tubular forms or nontubular (e.g., sheets) forms of the forming web may be coated by dry or wet spraying or dusting or by roll coating or coating using a Mayer bar or doctor blade, or by printing means (e.g., using gravure or flexography printing) or by using electrostatic transfer. Also, application may occur at various points in the manufacturing process including for example, by blending, incorporation in a masterbatch or addition to the polymeric layer prior to extrusion, or by dusting, spraying or coating during or after extrusion or during bubble or tube formation or during winding, or bag making, e.g., in a dusting or powdering step.

In one embodiment of the invention, it is contemplated that a food contact layer may comprise between about 1,000 ppm (0.1%) and about 50,000 ppm (5.0%) of a myoglobin blooming agent such as sodium nitrite, more preferably about 5,000 ppm to about 25,000 ppm, and most preferably about 7,500 ppm to about 20,000 ppm. Typically, a food contact layer comprises about 1.5 wt. % to about 2.0 wt. % or less (15,000 ppm -20,000 ppm) of a nitrite salt for packaging a fresh ground beef product, or about 0.75 wt. % to about 1.5 wt. % of a nitrite salt for packaging a fresh pork meat product. Amounts in a range of 0.75 to 2.25 wt. % may be advantageously employed for a variety of meats.

According to the invention, single-layer packaging webs may be provided that comprise a myoglobin blooming agent. In another embodiment the web may also be a multilayer web. The inventive packaging webs can have any suitable composition or configuration. Preferably, the packaging web fulfills multiple functional requirements which may be present in one or more or a combination of layers. For example a single layer web may combine the functions of oxygen barrier, thermoformability, and myoglobin blooming agent contact with one or more additional functions such as puncture resistance, abuse resistance, printability, moisture barrier, heat sealability, transparency, high gloss, low toxicity, high temperature resistance, low temperature flexibility, etc. Alternatively, multiple layers may be employed to add functionality. The present invention is adapted for use in a wide variety of commercially available packaging webs such as those sold by: Curwood, Inc. under the trademarks CURLAM®, CURLON®, CURFORM®, ICE®, and FRESHCASE®; and by others, e.g., marketed under the Alcan, Cryovac, Vector, Pactiv and Viskase brands. A typical beneficial web according to embodiments of the present invention may have an interior surface food contact layer which also serves as a sealant layer, and a heat resistant and abuse resistant exterior surface layer with a core layer there between which comprises an oxygen barrier material. Another common suitable web has adhesive layers on either side of the core oxygen barrier layer to connect with the surface layers.

In another embodiment of the invention, a food package may comprise a myoglobin-containing food product such as fresh meat having a water content of at least 5 wt. % and less than 1.0 wt. % sodium chloride; and a container comprising an oxygen barrier thermoplastic film having a polymeric food contact layer and a tray; wherein the container encloses the food product in a reduced oxygen environment; and the food product is maintained in a modified atmosphere comprising a nitrogen or sulfur containing gaseous myoglobin blooming agent, or mixtures thereof. The MBAs described throughout this specification may also be used in this embodiment. It is further contemplated that either gaseous or non-gaseous MBAs may be used as well as combinations thereof in various embodiments of the invention.

Web Thickness

A forming web of the present invention may be a film, a sheet, or combination thereof. Preferably, a flexible forming film has a total thickness of less than about 10 mil, more preferably the film has a total thickness of from about 0.5 to 10 mil (12.5-254 microns (μ)). Semi-rigid forming sheets may have a total thickness between about 10 mil to about 20 mil. Rigid forming sheets may have a total thickness more than about 20 mil. Advantageously many embodiments may have thicknesses from about 3 to 10 mil, with certain typical embodiments being from about 4 to 8 mil. For example, entire single or multilayer films or any single layer of a multilayer film can have any suitable thicknesses, including 1, 2, 3, 4, 5, 6, 7, 8, 9, or 10 mil, or any increment of 0.1 or 0.01 mil therebetween. Thicker and thinner films are also provided. Although suitable webs for packaging foodstuffs as thick as 50 mil (1270 microns) or higher, or as thin as 1 mil (25.4 microns) or less may be made, it is expected that the most common webs will be between about 3-10 mil (76-254 microns). Especially preferred for use as films for food packaging are films where the multilayer film has thicknesses of between about 4 to 6 mil (102-152 microns). Such films may have good abuse resistance and machinability.

The inventive webs are not heat shrinkable as that term is generally understood in the industry. That is, the inventive webs and packages made therefrom have 10% or less free shrink in both the machine direction and the transverse direction at 90° C. or less as measured before thermoforming as more fully described below. Preferably certain embodiments of the invention may have less than 5% shrink at 90° C. in both the machine direction (MD) and the transverse direction (TD) as measured before thermoforming. More preferably, the packaging webs may have a free. shrink as measured before thermoforming at 90° C. of less than 2%, more preferably less than 1% in both the machine direction and the transverse direction.

By being formed into desired shapes that may match the shape of the food to be packaged, the web containing a myoglobin blooming agent is brought into intimate contact with the surface of a myoglobin containing food product thereby effecting the transfer of the agent to the food to promote and/or maintain the desired red food color over as much of the food surface as possible. Points of non-contact may cause meat or bone to remain an undesirable color such as purple under vacuum packaging conditions. Beneficially, the forming web provides tight, attractive packaging for consumers.

Food Contact/Heat Sealing Layers

It is essential that the oxygen barrier film of the present invention have a food contact layer. This food contact layer may also function as a heat sealing or heat sealable layer to facilitate formation of hermetically sealed packages, although tubular plastic casings may also be used and sealed, e.g., by clips as known in the art. Preferred webs of the present invention utilize a food contact layer which has heat sealing properties.

The terms "heat sealing layer" or "sealant layer" are used interchangeably to refer to a layer which is heat sealable, i.e., capable of fusion bonding by conventional indirect heating means which generate sufficient heat on at least one film contact surface for conduction to the contiguous film contact surface and formation of a bond interface therebetween without loss of the web integrity. The bond interface between contiguous inner layers preferably has sufficient physical strength to withstand the packaging process and subsequent handling including, e.g., tensions resulting from stretching or shrinking attendant with the presence of a food body sealed within a package utilizing a film having a heat sealable layer. Advantageously, the bond interface is preferably sufficiently thermally stable to prevent gas or liquid leakage therethrough when exposed to above or below ambient temperatures, e.g., during one or more of the following: packaging operations, storage, handling, transport, display, or processing of food. Heat seals may be designed to meet different conditions of expected use and various heat seal formulations are known in the art and may be employed with the present invention. In certain optional embodiments, heat seals may be subjected to pasteurization or cook-in temperatures and conditions, e.g., in a sealed bag, vsp or sealed tray form. For use in cook-in applications heat seals should withstand elevated temperatures up to about 160-180° F. (71-82° C.) or higher, e.g., 212° F. (100° C.) for extended periods of time, e.g., up to 4 to 12 hours in environments which may range from heated humidified air or steam to submersion in heated water. Preferably, the food contact or heat seal layer is heat sealable to itself, but may be sealable to other objects, films, sheets or layers, e.g., to a tray when used as a lidding film, or to an outer layer in a lap seal or in certain tray overwrap embodiments. Also in certain embodiments the myoglobin blooming agent containing food contact layer need not be heat sealable.

A sealing layer is preferably positioned at or near the interior surface of the packaging web, and can be an interior surface layer which allows a monolayer or multilayer web to be formed into a resulting package, e.g., when used as a clamshell container, sealed to a tray, e.g., when used as a lidding film, or sealed to a lidding film (or sheet), e.g., when used as a tray. The sealant layer may comprise a myoglobin blooming agent and a suitable heat-sealable polymer, such as an ethylene-α-olefin copolymer, nylon blends or ionomer. The exterior layer may also be a heat sealable layer and used in place of or in addition to the interior layer for this purpose.

The food contact layer may comprise a sealant layer and may comprise a heat sealable polymeric material such as a polyolefin or blend thereof, e.g., polyethylenes such as LDPE, HDPE, ethylene α-olefin copolymers, including, e.g., plastomers, VLDPE, LLDPE or polypropylene homopolymers, polypropylene copolymers, or homogeneous polyolefin resins, such as those made with constrained geometry catalysts or metallocene single-site catalysts, including, e.g., copolymers of ethylene or propylene with at least one $C_{4-8 \text{ or higher}}$ α-olefins (e.g., butene-1, hexene-1 or octene-1 or combinations thereof) with a majority of polymeric units derived from ethylene or propylene. Ethylene vinyl acetate (EVA) copolymers, EBAs, EMAs, EMAAs or EEAs are also suitable materials for forming the inner surface heat sealable layer. A food contact and/or sealant layer may also comprise an ionomer which is essentially a metal salt neutralized copolymer of ethylene and acrylic or methacrylic acid. Suitable sealant/food contact layer materials often include ionomers, polyolefins or blend thereof, such as those disclosed in U.S. Pat. Nos. 6,964,816; 6,861,127; 6,815,023; 6,773,820; 6,682,825; 6,316,067; and 5,759,648; 5,663,002; and U.S. Patent Application Publication Nos.: 2005/0129969 (Schell et al); and 2004/0166262 (Busche et al). Food contact or sealant layers may also comprise nylon, polyesters, such as polyester terephthalate (PET), polyacrylonitrile or copolymers or blend thereof. The food contact layer may be 100% of the thickness of the total structure. The food contact or sealant layers in multilayer structures may be of any thickness with thicknesses in multilayer structures of up to 1% to 5% to 15% to 50% or more of the total thickness contemplated. Preferred examples of such sealable resins comprising a food contact and/or sealant layer include ethylene α-olefin copolymers commercially available from: Dow Chemical Company under trade names of "AFFINITY", "ATTANE" or "ELITE" (including octene-1 as α-olefin); and ExxonMobil Co. under a trade name of "EXACT" (including hexene-1 as comonomer); ionomers commercially available from DuPont Company under the trade name Surlyn®.

Barrier Layers

Barrier layers can be made comprising a myoglobin blooming agent. The barrier layer preferably function as a gas barrier layer, although other types of barriers such as moisture barrier layers can also include the myoglobin blooming agent. The gas barrier layer is preferably an oxygen barrier layer, and is preferably a core layer positioned between the first and second layers. For example, the oxygen barrier layer can be in contact with a first surface layer and an adhesive layer or may be sandwiched between two tie layers and/or two surface layers.

To achieve all the benefits of the present invention it is essential that the myoglobin blooming agent web be used in a package in combination with a reduced oxygen atmosphere. The barrier layer can provide a suitable barrier to oxygen for the desired preservation of the article to be packaged under the anticipated storage conditions. In one aspect, an oxygen barrier is used in the meat package or packaging web that is maintained at a reduced oxygen atmosphere. The oxygen barrier is preferably selected to provide an oxygen permeability sufficiently diminished to permit a desirable color to be induced or maintained within the packaged meat. For example, a film or sheet may comprise an oxygen barrier having an oxygen permeability that is low enough to reduce the activity of metmyoglobin reducing enzymes that reduce myoglobin in the meat, and/or maintain a reduced oxygen atmosphere in contact with the meat to reduce oxygen binding to myoglobin on the surface of the packaged fresh meat.

The oxygen barrier layer can comprise any suitable material such as EVOH, PVOH, polyvinylidene chloride, polyamide, polyester, polyalkylene carbonate, polyacrylonitrile, nanocomposite, a metallized film such as aluminum vapor deposited on a polyolefin, etc., as known to those of skill in the art. The oxygen barrier layer of a film (or sheet) may preferably comprise polyvinyl alcohol copolymer or EVOH, although oxygen barrier layers comprising polyvinylidene chloride—vinyl chloride copolymer (PVDC or VDC-VC) or vinylidene chloride—methylacrylate copolymer (VDC-MA) as well as blends thereof, may also be preferable. One preferred EVOH barrier material is a 44 mol % EVOH resin E151B sold by Eval Company of America, under the trade name Eval® LC-E151B. Another example of an EVOH that may be acceptable can be purchased from Nippon Gohsei (or Soarus, LLC in the USA) under the trade name Soarnol® AT (44 mol % ethylene EVOH) or Soarnol® ET (38 mol % ethylene EVOH). Oxygen barrier films comprising EVOH for packaging food products containing a myoglobin blooming agent can be formed by methods disclosed in U.S. Pat. Nos. 6,964,816; 6,942,927; 6,861,127; 6,861,125; 6,651,874; 6,562,476; 6,291,041; 6,068,933, 5,916,613; 5,846,582; 4,810,541; 4,735,855 and 4,611,456, all of which are incorporated by reference in their entireties.

Suitable nylons or nylon blends may also be used to impart oxygen barrier properties. Combinations of barrier materials may also be used. For example, multiple barrier layers of nylon and EVOH are often used to impart suitable barrier properties in food and meat packaging as are blends of EVOH and nylon. These and other known materials can also be used to form an oxygen barrier layer. The barrier layer preferably also provides desirable optical properties, including transparency and low haze.

It is desirable that the thickness of the barrier layer be selected to provide the desired combination of the performance properties sought, e.g., with respect to oxygen permeability, delamination resistance, and optical properties. Suitable barrier layer thicknesses in multilayer films (or sheets) are less than 30%, frequently less than 20%, and more frequently less than 15%, e.g., from 3 to 13% of the total web thickness and preferably less than about 10% of the total thickness of the multilayer web. Greater thicknesses may be employed, however, oxygen barrier polymers tend to be relatively expensive and therefore it is expected that less costly resins will be used in other layers to impart desirable properties once a suitable thickness is used to achieve the desired gas barrier property for the film layer combination. For example, the thickness of a core oxygen barrier layer may advantageously be less than about 2 mil, frequently less than 1 mil, more frequently less than 0.60 mil, preferably less than 0.45 mil and greater than about 0.05 mil (1.27 microns), including 0.10, 0.20, 0.25, 0.30, 0.40, or 0.45 mil thick. Preferably, the barrier layer is between 0.3 mil and 0.9 mil thick, more preferably between 0.3 mil and 0.45 mil.

Preferably, thicker barrier layers are used when the packaging web will be used in a forming operation having a large draw depth, such as up to 8 inch, as the formed web is then stretched out thinner and the oxygen barrier properties decrease with the increasing draw depth. In addition, the corners of the formed pockets may exhibit the thinnest portion of the formed film, such that the thickness of the total web in the pockets are desirably more than 1 mil so as to maintain substantial oxygen barrier properties in the corners.

For perishable food packaging, the oxygen ($O_2$) permeability desirably should be minimized. Typical oxygen barrier webs will have an $O_2$ permeability of less than about 310 $cm^3/m^2$ for a 24 hour period at 1 atmosphere, 0% relative humidity and 23° C., and preferably less than 75 $cm^3/m^2/day$ more preferably less than 20 $cm^3/m^2/day$ and even more preferably less than 3 $cm^3/m^2/day$. Barrier resins such as PVDC or EVOH in the core layer may be adjusted by blending in compatible polymers to vary the gas permeability, e.g., $O_2$ of the films (or sheets).

Abuse-Resistant Outer Layer

Since it is seen by the user/consumer, in both the monolayer and multilayer embodiments of the invention the exterior surface of the web should enhance optical properties of the film or sheet and may preferably have high gloss. Also, it should withstand contact with sharp objects and provide abrasion resistance, and for these reasons it is often termed the abuse-resistant layer. This exterior abuse-resistant layer may or may not also be used as a heat sealable layer. As the exterior surface layer of the web, this layer most often is also the exterior layer of any package, bag, pouch, tray or other container made from the inventive web, and is therefore subject to handling and abuse, e.g., from equipment during packaging, and from rubbing against other packages and shipping containers and storage shelves during transport and storage. This contact causes abrasive forces, stresses and pressures which may abrade away the film causing defects to printing, diminished optical characteristics or even punctures or breaches in the integrity of the package. Therefore the exterior surface layer is typically made from materials chosen to be resistant to abrasive and puncture forces and other stresses and abuse which the packaging may encounter during use. The exterior surface layer should be easy to machine (i.e., be easy to feed through and be manipulated by machines, e.g., for conveying, packaging, printing or as part of the web or bag manufacturing process). Suitable stiffness, flexibility, flex crack resistance, modulus, tensile strength, coefficient of friction, printability, and optical properties are also frequently designed into exterior layers by suitable choice of materials. This layer may also be chosen to have characteristics suitable for creating desired heat seals which may be heat resistance to burn through, e.g., by impulse sealers or may be used as a heat sealing surface in certain package embodiments, e.g., using overlap seals.

The exterior layer thickness for multilayer webs is typically 0.5 to about 2.0 mil. However, in the case of laminated webs for use as rigid or semi-rigid trays, a 10-20 mil thick rigid monolayer sheet may be laminated to a 2 mil thick multilayer film having an oxygen barrier layer, which may not require a thick external layer as the rigid monolayer sheet may serve as the outer abuse layer. Thinner layers may be less effective for abuse resistance, however thicker layers, though more expensive, may advantageously be used to produce webs having unique highly desirable puncture resistance and/or abuse resistance properties. Heavy gauge films, typically 5 to 7 mil or more, are needed in demanding applications, which are usually satisfied by very expensive and complex laminated film structures and/or secondary packaging materials such as bone guards, pads, and overwrap.

In one barrier layer embodiment of this invention, an exterior thermoplastic layer of the enclosing multilayer web is on the opposite side of a core layer from the interior layer, and in direct contact with the environment. In a suitable three layer embodiment this exterior layer is directly adhered to the core layer which is preferably an oxygen barrier layer.

Intermediate Layers

An intermediate layer is any layer between the exterior layer and the interior layer and may include oxygen barrier layers, tie layers or layers having functional attributes useful for the film structure or its intended uses. Intermediate layers may be used to improve, impart or otherwise modify a multitude of characteristics: e.g., printability for trap printed structures, processability, machinability, tensile properties, drape, flexibility, stiffness, modulus, designed delamination, easy opening features, tear properties, strength, elongation, optical, moisture barrier, oxygen or other gas barrier, radiation selection or barrier, e.g., to ultraviolet wavelengths, etc.

Tie Layers

In addition to the exterior layer, the interior layer, and intermediate layer such as a barrier layer, a multilayer packaging web can further comprise one or more adhesive layers, also known in the art as "tie layers," which can be selected to promote the adherence of adjacent layers to one another in a multilayer web and prevent undesirable delamination. A multifunctional layer is preferably formulated to aid in the adherence of one layer to another layer without the need of using separate adhesives by virtue of the compatibility of the materials in that layer to the first and second layers. In some embodiments, adhesive layers comprise materials found in both the first and second layers. The adhesive layer may suitably be less than 10% and preferably between 2% and 10% of the overall thickness of the multilayer film. Adhesive resins are often more expensive than other polymers so the tie layer thickness is usually kept to a minimum consistent with the desired effect. In one embodiment, a multilayer web comprises a three layer structure with an adhesive layer positioned between and in contact with the first layer and the second layer. In another embodiment, a multilayer web comprises a multilayer structure comprising a first adhesive layer positioned between and in direct contact with the exterior layer and a core oxygen barrier layer; and preferably and optionally has a second tie layer between and in direct contact with the same core oxygen barrier layer and the interior layer to produce a five layer web.

Multilayer films and sheets can comprise any suitable number of tie or adhesive layers of any suitable composition. Various adhesive layers are formulated and positioned to provide a desired level of adhesion between specific layers of the film according to the composition of the layers contacted by the tie layers.

For example, adhesive layers in contact with a layer comprising a polyester, such as PET, preferably comprise a suitable blend of polyolefins with other adhesive polymers. One preferred component of an adhesive layer in contact with a PET polyester layer is EMAC SP 1330 (which reportedly has: a density of 0.948 g/cm$^3$; melt index of 2.0 g/10 min.; a melting point of 93° C.; is at softening point of 49° C.; and a methylacrylate (MA) content of 22%).

The interior, exterior, intermediate or tie layers may be formed of any suitable thermoplastic materials, for example, polyamides, polystyrenes, styrenic copolymers, e.g., styrene-butadiene copolymer, polyolefins, and in particular members of the polyethylene family such as LLDPE, VLDPE, HDPE, LDPE, ethylene vinyl ester copolymer or ethylene alkyl acrylate copolymer, polypropylenes, ethylene-propylene copolymers, ionomers, polybutylenes, alpha-olefin polymers, polyesters, polyurethanes, polyacrylamides, anhydride-modified polymers, acrylate-modified polymers, polylactic acid polymers, or various blends of two or more of these materials.

In another embodiment, the exterior, interior and/or one or more intermediate layers can comprise or consist essentially of a nylon blend composition. Preferably, the nylon blend composition comprises at least an amorphous nylon such as nylon 6I/6T copolymer, in combination with at least one semi-crystalline nylon homopolymer or copolymer such as nylon 6/12; 6/6,9; 6/6,6; MXD6; 6; 11; or 12.

In another embodiment of the invention, one or more of the exterior, interior and/or one or more intermediate layers comprises at least one polyester polymer. Preferred polyester polymers comprise aromatic polyesters and, more preferably, are homopolymers or copolymers of polyethylene terephthalate (PET), polyethylene naphthalate and blends thereof. Suitable polyesters may have an intrinsic viscosity of about 0.60 to about 1.2, preferably between 0.60 to 0.80. The polyester may be an aliphatic polyester resin, but is preferably, an aromatic polyester resin. For example, polyester materials can be derived from dicarboxylic acid components, including terephthalic acid and isophthalic acid as preferred examples, and also dimers of unsaturated aliphatic acids. More specifically, examples of dicarboxylic acids constituting the polyester resin may include: terephthalic acid, isophthalic acid, phthalic acid, 5-t-butylisophthalic acid, naphthalenedicarboxylic acid, diphenyl ether dicarboxylic acid, cyclohexane-dicarboxylic acid, adipic acid, oxalic acid, malonic acid, succinic acid, azelaic acid, sebacic acid, and dimer acids comprising dimers of unsaturated fatty acids. These acids may be used singly or in combination of two or more species. Examples of a diol component as another component for synthesizing the polyester may include: polyalkylene glycols, such as ethylene glycol, propylene glycol, tetramethylene glycol, neopentyl glycol, hexamethylene glycol, diethylene glycol, polyethylene glycol and polytetramethylene oxide glycol; 1,4-cyclohexane-dimethanol, and 2-alkyl-1,3-propanediol. Examples of diols constituting the polyester resin may include: ethylene glycol, propylene glycol, tetramethylene glycol, neopentyl glycol, hexamethylene glycol, diethylene glycol, polyalkylene glycol, 1,4-cyclohexane-dimethanol, 1,4-butanediol, and 2-alkyl-1,3-propane diol. These diols may be used singly or in combination of two or more species.

Polyester compositions that comprise an aromatic polyester resin comprising an aromatic dicarboxylic acid component can be preferred in some aspects, including, e.g., polyesters between terephthalic acid (as a dicarboxylic acid) and diols having at most 10 carbon atoms, such as polyethylene terephthalate and polybutylene terephthalate. Particularly preferred examples thereof may include: copolyesters obtained by replacing a portion, preferably at most 30 mol %, more preferably at most 15 mol %, of the terephthalic acid with another dicarboxylic acid, such as isophthalic acid; copolyesters obtained by replacing a portion of the diol component such as ethylene glycol with another diol, such as 1,4-cyclohexane-dimethanol (e.g., "Voridian 9921", made by Voridian division of Eastman Chemical Co.); and polyester-polyether copolymers comprising the polyester as a predominant component (e.g., polyester-ether between a dicarboxylic acid component principally comprising terephthalic acid or/and its ester derivative and a diol component principally comprising tetramethylene glycol and tetramethylene oxide glycol, preferably containing the polytetramethylene oxide glycol residue in a proportion of 10-15 wt. %). It is also possible to use two or more different polyester resins in mixture. Examples of preferred polyesters are available under the trademarks Voridian 9663, Voridian 9921 and EASTAR® Copolyester 6763, all from Eastman Chemical Company, Kingsport, Tenn., U.S.A. U.S. Pat. No. 6,964,816 to Schell et al. and U.S. Pat. No. 6,861,125 to Carlson et al., and co-pending U.S. patent application Ser. No. 10/795,567 to Lischefski, which are incorporated herein by reference in their entireties, disclose multilayer structures comprising a polyester layer, and a polyamide layer.

Optional Additives to Layers

Various additives may be included in the polymers utilized in one or more of the exterior, interior and intermediate or tie layers of food packaging webs. For example, a layer may be coated with an antiblock powder. Also, conventional antioxidants, polymeric plasticizers, acid, moisture or gas (such as oxygen) scavengers, slip agents, colorants, dyes, pigments, organoleptic agents may be added to one or more web layers of the web or it may be free from such added ingredients. If the exterior layer is corona treated, preferably no slip agent will be used, but it will contain or be coated with an anti-block powder or agent such as silica or starch. Processing aides are typically used in amounts less than 10%, less than 7% and preferably less than 5% of the layer weight. A preferred processing aid for use in the outer layer of the film includes one or more of fluoroelastomers, stearamides, erucamides, and silicates.

Preferred webs may also provide a beneficial combination of one or more or all of the properties including low haze, high gloss, low shrinkage values at 90° C. or less, good machinability, good mechanical strength and good barrier properties including high barriers to oxygen and water.

Methods of Manufacture

The inventive monolayer or multilayer webs may be made by conventional processes which are modified to provide for inclusion of a myoglobin blooming agent. These processes to produce flexible webs may include cast or blown film processes. Descriptions of suitable web manufacturing and lamination processes are disclosed in, e.g., U.S. Pat. Nos. 6,964, 816 (Schell et al.); 6,942,927 (Shepard et al.); 6,861,127 (Glawe et al.); 6,861,125 (Carlson et al.); 6,562,476; 6,291, 041 (Howells et al.); 6,068,933 (Shepard et al.); 4,735,855 (Wofford et al.); 3,337,663 (Taga) and 3,090,998 (Heisterkamp), all of which are incorporated herein by reference in their entireties.

Various manufacturing methods may be used as will be apparent to those skilled in the art in view of the present teaching. For example, U.S. Pat. No. 4,448,792 (Schirmer) discloses a method comprising the steps of coextrusion, biaxial orientation and irradiation, and U.S. Pat. No. 3,741, 253 (Brax et al.) discloses a method of extrusion, irradiation, extrusion lamination/coating and biaxial orientation, and both patents are hereby incorporated by reference in their entireties. The processes may be modified to eliminate the biaxial orientation or to add a subsequent annealing step to form a non-shrink film.

In a preferred process for making films, the resins and any additives are introduced to an extruder (generally one extruder per layer) where the resins are melt plastified by heating and then are transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. However, variations are expected which may depend upon such factors as variation of polymer resin selection, use of other resins, e.g., by blending or in separate layers in the multilayer web, the manufacturing process used and particular equipment and other process parameters utilized. Actual process parameters including process temperatures are expected to be set by one skilled in the art without undue experimentation in view of the present disclosure.

As generally recognized in the art, resin properties may be further modified by blending two or more resins together and it is contemplated that various resins including, e.g., homopolymers and copolymers may comprise or be blended into individual layers of the multilayer web or added as additional layers, such resins include polyolefins such as ethylene-unsaturated ester copolymer resins, especially vinyl ester copolymers such as EVAs, or other ester polymers, very low density polyethylene (VLDPE), linear low density polyethylene (LLDPE), low density polyethylene (LDPE), high density polyethylene (HDPE), ionomers, polypropylenes. Other polymers that may be included as separate layers or in combination include polyamides such as nylon, PVDC, EVOH, and PET. These resins and others may be mixed by well known methods using commercially available tumblers, mixers or blenders.

Also, if desired, well known additives such as antioxidants, processing aids, slip agents, antiblocking and antifogging agents, pigments, spoilage indicator, etc., and mixtures thereof may be incorporated into the web. For example, the myoglobin blooming agent containing layer and/or other layers may further comprise an antioxidant, a slip agent, an antiblock agent, a colorant, a color enhancer, a flavorant, an odorant, an organoleptic agent, a coefficient of friction modifying agent, a lubricant, a surfactant, an encapsulating agent, an oxygen scavenger, a pH modifying agent, a film forming agent, an emulsifier, a polyphosphate, a humectant, a drying agent, an antimicrobial agent, a chelating agent, a binder, a starch, a stabilizer, a buffer, a phospholipid, an oil, a fat, a protein, a polysaccharide, a transfer agent, or a combination thereof. Examples of particular compositions that may be added include: α-tocopherol; alcohol; annatto; ascorbic acid; beet powder; BHA; BHT; bixin; caramel; carmine; carotenoid pigment; casein; cochineal; cyclodextrin; dextrin; erucamide; ethoxylated mondiglycerides; fluoroelastomer; food grade oil; glycerin; lecithin; liquid smoke; nisin; norbixin; pediocin; polysorbate; potassium chloride; rosemary extract; shellac; sodium chloride; sodium erythorbate; starch; trisodium polyphosphate; turmeric; water; water soluble cellulose ether; and zein.

Various polymer modifiers may be incorporated for the purpose of improving toughness, extensibility and/or other properties of the web. Other modifiers which may be added include modifiers which improve low temperature toughness or impact strength and modifiers which reduce modulus or stiffness. Exemplary modifiers include styrene-butadiene, styrene-isoprene, and ethylene-propylene copolymers.

Typically, films may be made heat shrinkable by stretch orientation. Stretch orientation may be accomplished by various known methods, e.g., machine direction (MD) orientation is preferably accomplished with the use of sets of nip rolls rotating at different speeds to stretch or draw the film, sheet or tube in the machine direction thereby causing machine direction elongation which is set by cooling. Other methods include tentering which is commonly employed to orient sheets, or the well-known trapped bubble or double bubble technique for orienting tubes as for example described in U.S. Pat. No. 3,456,044 (Pahlke) which is hereby incorporated by reference in its entirety. In the bubble technique, an extruded primary tube leaving a tubular extrusion die is cooled, collapsed and then preferably oriented by reheating and inflating to form an expanded secondary bubble, which is again cooled and collapsed. This collapsed stretched film may be wound on a reel as a tube or slit into sheets or webs and wound, or it may be further processed, e.g., by annealing or irradiation as described below.

The general annealing process by which biaxially stretched heat shrinkable films are heated under controlled tension to reduce or eliminate shrinkage values is well known in the art. If desired, films may be annealed to produce lower shrinkage values as desired for the particular temperature. Accordingly, using an annealing process, heat shrinkable films may be made into non-shrink films suitable for use in certain embodiments as described herein.

Optionally, films and sheets of the present invention may be subject to a variety of irradiative treatments. In the irradiation process, the film is subjected to an energetic radiation treatment, such as corona discharge, plasma, flame, ultraviolet, X-ray, gamma ray, beta ray, and high energy electron treatment. These irradiative treatments may be performed for a variety of reasons including, e.g., modifying surface characteristics to improve surface adhesion to a variety of substances such as meat or printing ink, or to improve internal layer adhesion to ameliorate intralayer adhesion and avoid undesirable delamination. An important known use of irradiation is to induce crosslinking between molecules of the irradiated material. The irradiation of polymeric webs to induce favorable properties such as crosslinking is well known in the art and is disclosed in U.S. Pat. No. 4,737,391 (Lustig et al.) and U.S. Pat. No. 4,064,296 (Bornstein et al.), which are hereby incorporated by reference in their entireties. Bornstein et al. disclose the use of ionizing radiation for crosslinking the polymer present in the film. In some preferred embodiments, it is preferred to crosslink the entire film to broaden the heat sealing range. This is preferably done by irradiation with an electron beam at dosage levels of at least about 2 megarads (MR) and preferably in the range of 3 to 8 MR, although higher dosages may be employed. Irradiation may be done on the primary tube, with or without additional layers being coated thereon. The latter, called post-irradiation, is described in U.S. Pat. No. 4,737,391 (Lustig et al.). An advantage of post-irradiation is that a relatively thin film is treated instead of the relatively thick primary tube, thereby reducing the power requirement for a given treatment level.

Alternatively, crosslinking may be achieved by addition of a chemical crosslinking agent or by use of irradiation in combination with a crosslinking modifier added to one or more of the layers, as for example described in U.S. Pat. No. 5,055,328 (Evert et al.).

Myoglobin Blooming Agent on Food Contact Surface

Fundamental to the present invention is inclusion of a myoglobin blooming agent with an oxygen barrier web. The packaging webs can have any suitable structure, but it is essential that the myoglobin blooming agent be on, or in, or able to migrate to, a food contact surface of the web.

Whether the myoglobin blooming agent is coated on or incorporated within an interior food contact layer, it may be applied by any suitable method, e.g., as described above, including dry or wet spraying, dusting, blending, coating, e.g., with transfer rollers, slugging, inclusion in a masterbatch, printing, etc. The myoglobin blooming agent is preferably evenly dispersed over the contact surface of the layer and/or throughout the entire layer to enable any length of web incorporating the layer to include approximately similar amounts of the compound within the sealing layer for a uniform transfer to meat via surface contact.

Where the myoglobin blooming agent is coated on the food contact layer surface, it may be conveniently applied at various times. For example, the agent may be applied to the meat surface, e.g., by dipping or spraying just before packaging, or during a package making operation with or without admixture with starch used as a means to modify package surface friction property or openability. It may be applied during winding operations attendant to slitting operations or during pouch making or tube making. It may be applied before or after irradiative treatments. It may be applied with or in place of starch utilizing electron beam irradiation and/or corona treatment as further described in U.S. Pat. No. 5,407,611 (Wilhoit et al.) which is hereby incorporated by reference. Agents such as nitrite or nitrate are soluble in water or alcohol, and solutions of myoglobin blooming agent may be coated on webs either alone or incorporated with other agents such as film forming and/or wetting agents or other materials such as zein, casein, dextrin, starch, or shellac, etc., used, e.g., with respect to transferring bixin as described in U.S. Pat. No. 6,143,344 (Jon et al.) which is hereby incorporated by reference. The agent may also be applied in an aqueous solution to a web whose food contact surface has been modified to be hydrophilic or adapted or otherwise modified to adsorb or absorb water or oil based liquids containing a myoglobin blooming agent. According to the present invention in one aspect, transferable modifier-containing webs may be utilized to transfer myoglobin blooming agents using, e.g., webs having a food contact layer formulation suitable for effecting transfer as described in U.S. Pat. No. 5,288,532 (Juhl et al.); U.S. Pat. No. 5,374,457 (Juhl et al.); U.S. Pat. No. 5,382,391 (Juhl et al.); and U.S. Pat. No. 6,667,082 (Bamore et al.) which are all hereby incorporated by reference.

Where the myoglobin blooming agent is incorporated within the interior layer, it may be added to a base polymer before or during extrusion of the web. The base polymer may be any suitable polymer, e.g., a polyolefin such as a polyethylene, and may be very low density polyethylene (VLDPE or ULDPE), linear low density polyethylene (LLDPE), low density polyethylene (LDPE), EVA, polypropylene, ionomer, nylon, PVDC, PET, etc. Melt blending is a suitable method of mixing the base polymer and the myoglobin blooming agent. The individual component materials may be combined in a high intensity mixing device such as an extruder. The base polymer is melted to form a viscous liquid or "melt." The myoglobin blooming agent may be combined with the polymer before, during, or after melting. The high intensity mixing device is used to attempt to uniformly disperse the myoglobin blooming agent within the base polymer. The quality and functionality of the dispersed agent can depend upon the choice of myoglobin blooming agent, the composition of the base polymer and the mixing device. It is desirable to achieve good mixing for uniform dispersion of the myoglobin blooming agent within the melt; the presence of poorly wetted particle agglomerations is undesirable. It may be desirable to include additives in the blend such as, e.g., antioxidants, antiblock or slip agents.

The myoglobin blooming agent may be either directly added to the base polymer or provided in a solution such as an aqueous or oil based solution that is added to the polymer either before or during the melt state of the polymer. For direct addition of a solid, granular or particulate agent grinding the solid agent to produce smaller particles is expected to provide a more uniform dispersion. It is expected that for a water soluble material, providing the myoglobin blooming agent as an aqueous solution may provide better dispersion of the compound within the polymer relative to addition of undissolved agent. An aqueous solution may be prepared from a water soluble myoglobin blooming agent such as sodium nitrite, preferably close to the saturation concentration of the aqueous solution and may, e.g., include between about 20% by weight and about 42% by weight of a compound which acts as a myoglobin blooming agent. This aqueous solution may be directly introduced into a polymer melt, e.g., in an extruder heated to a temperature above 300° F. to facilitate mixing to form a blend. If added as a solution provision should be made for venting water vapor from the extruder. The polymer blend containing a myoglobin blooming agent may be either extruded into pellets, or directly as a film or sheet.

The myoglobin blooming agent may be mixed with a carrier resin or base polymer to form a masterbatch. Pellets from the masterbatch may be convenient for subsequent use in fabricating articles. Pellets from the masterbatch may then be mixed with the base polymer or another polymer during a web forming process.

When used to create a masterbatch, a sufficient amount of the solution may be introduced into the polymer melt to obtain a blend having a high concentration of myoglobin blooming agent, e.g., between about 2% by weight and about 10% by weight myoglobin blooming compound, and preferably between about 4% by weight and about 6% by weight.

Monolayer Barrier Webs

In one embodiment of the invention, monolayer oxygen barrier packaging webs are provided which comprise a food contact layer including a myoglobin blooming agent. The agent may either be coated onto the surface of the monolayer web or it may be incorporated therein, e.g., during the extrusion process. A nylon blend of an amorphous nylon such as nylon 6I/6T with one or more semicrystalline nylons such as copolymers nylon 6/12; 6/6,6; 6/6,9 and/or homopolymers nylon 6; 11; 12; MXD6 and 6,6 may be made into a forming film as disclosed, e.g., in U.S. Pat. No. 6,964,816 (Schell et al.), which is hereby incorporated by reference in its entirety. Such film provides an oxygen barrier and may have a myoglobin blooming agent coated on or incorporated therein.

Multilayer Barrier Webs

Multilayer oxygen barrier webs having a myoglobin blooming agent that contacts a packaged meat product surface can desirably promote, preserve or enhance a desirable myoglobin-mitigated red color.

In one aspect of the embodiment, a myoglobin blooming agent is included in the food contact layer, which is preferably a sealant layer. Multilayer webs advantageously may utilize one or more additional layers to provide beneficial web properties. Multilayer webs may have increased flexibility of application over monolayer webs in that specific layers may be provided to incorporate specific features. Sometimes materials which may be unsuitable alone may be advantageously employed in a multilayer construction. For example, EVOH has oxygen barrier properties which are very sensitive to moisture and detrimentally impacted thereby, but when protected from contact with moisture by adjacent moisture barrier layers EVOH may provide a film or sheet having an excellent oxygen barrier. Oxygen barrier layers may be positioned between an abrasion or abuse resistant layer and a food contact layer containing myoglobin blooming agent to protect the oxygen barrier and permit thinner oxygen barrier layers to be used. Where EVOH barrier materials are used, it is contemplated that a polyamide-containing layer may optionally be in contact with the EVOH material. Non-limiting examples of various preferred multilayer web configurations include the following:

Abuse Resistant (Exterior)/$O_2$ Barrier/Food Contact & Sealant (Interior);
Abuse Resistant (Exterior)/Core/$O_2$ Barrier/Core/Sealant (Interior);
Abuse Resistant (Exterior)/Tie/Core/$O_2$ Barrier/Core/Sealant (Interior);
Abuse Resistant (Exterior)/Tie/Core/$O_2$ Barrier/Core/Tie/Sealant (Interior);
Abuse Resistant (Exterior)/Core/Tie/$O_2$ Barrier/Tie/Core/Sealant (Interior);
Abuse Resistant (Exterior)/Tie /$O_2$ Barrier/Tie /Sealant (Interior);
Abuse Resistant (Exterior)/Nylon Core/$O_2$ Barrier/Core/Sealant (Interior);
Abuse Resistant (Exterior)/Tie/Core/$O_2$ Barrier/Nylon Core/Sealant (Interior); and
Abuse Resistant (Exterior)/Tie/Core/$O_2$ Barrier/Nylon Core/Tie/Sealant (Interior)

Some embodiments provide a 3, 4, 5, 6, 7, 8, 9, or more layer coextruded web with desirable levels of abuse resistance, thermoformability and oxygen barrier in a multilayer web structure.

Referring now to the drawings, FIG. 1 discloses an example of a three-layer web structure embodiment of the present invention generally designated at reference numeral 10. This embodiment is directed to a multilayer composite comprising an outer layer 12 that is an exterior layer 102 comprising a material such as a polyolefin, PET or a nylon composition, and an outer layer 14 that is a sealant layer 122, each joined to opposite sides of a core tie oxygen barrier layer 112 comprising, e.g., EVOH. The sealant layer 122 comprises a myoglobin blooming agent such as sodium nitrite or sodium nitrate or blend thereof. The multilayer web 10 is designed to be used in the packaging of food products and can be used, e.g., to overwrap a tray or in a vacuum skin package.

Figure 2:
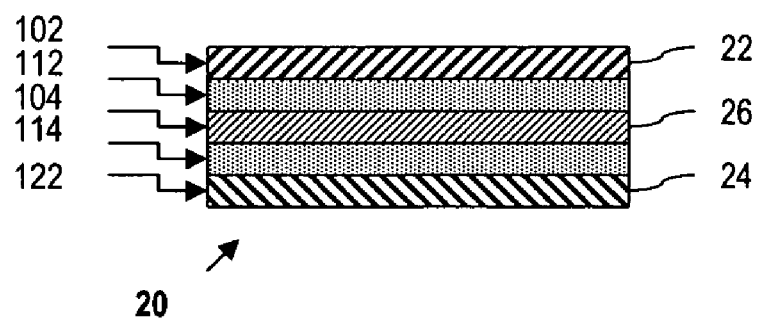
FIG. 2 shows a cross sectional schematic of a second exemplary multilayer film.

Referring now to FIG. 2, a cross section of an example of a five layer oxygen barrier web is depicted with web 20 having an exterior surface layer 22 that is an abuse resistant layer 102 joined by a first tie layer 112 to a core and barrier polyamide layer 26 comprising one or more nylon polymers 104, the other side of core layer 26 is joined by a second tie layer 114 to an interior surface layer 24 which is a sealant layer 122 comprising a myoglobin blooming agent.

Placement of one or more core nylon layers in contact with an EVOH oxygen barrier layer can provide multilayer webs with improved processability. In certain embodiments nylon may be blended with EVOH or may be included as adjacent layers, e.g., when EVOH oxygen barrier materials have an ethylene content of about 44 mol % or less, at least one and preferably two polyamide core layers may be included in contact with the EVOH layer to facilitate processing.

Figure 3:
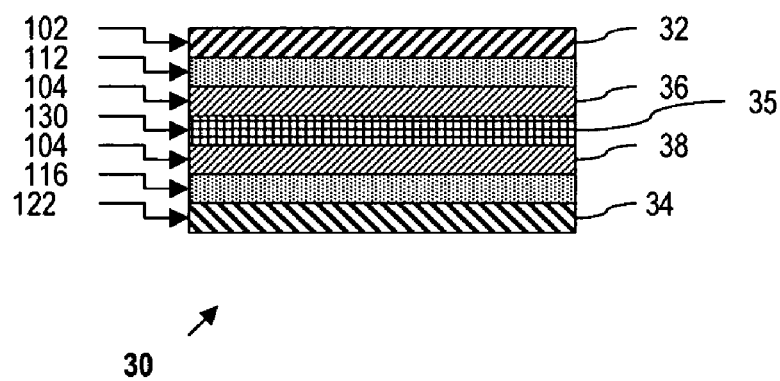
FIG. 3 shows a cross sectional schematic of a third exemplary multilayer film.

Referring now to FIG. 3, a cross-section of an example of a seven layer web 30 is depicted. Web 30 may comprise an exterior layer 32 that is an abuse resistant layer 102 having high gloss and good printability which is in direct contact with a first tie layer 112 and connected thereby to a first core polyamide layer 36 comprising one or more nylon polymers 104. Nylon layer 36 is in direct contact with an oxygen barrier layer 35 comprising EVOH 130. Similarly, the other side of the oxygen barrier layer 35 is joined to a second core polyamide layer 38 comprising one or more nylon polymers 104, the other side of which is joined to a second tie layer 116. The interior layer 34 is a food contact layer 122 which may also be heat sealable and which comprises a polyethylene, such as a ULDPE, and a myoglobin blooming agent. The food contact sealant layer is joined to the second tie layer 116. Preferably, all seven layers are coextruded, but they also may be formed by lamination, extrusion coating, or a combination thereof.

First tie layer 112 promotes or provides adhesion between an abuse resistant layer 102 that is an exterior layer 32, and a core polyamide layer 36. Similarly, tie layer 116 promotes or provides adhesion between a second polyamide layer 38 and a food contact layer 122 that is an interior layer 34. Tie layers 112 and 116 may be identical or different from each other, and may include a wide range of anhydride/grafted polyolefins including those based on ethylene vinyl acetate copolymer, polypropylene, low density polyethylene, linear low density polyethylene, and very low density polyethylene. Preferably, the compositions of tie layers are based on linear low density polyethylene, or plastomers such as metallocene catalyzed polyethylene. Exemplary tie layer resins are manufactured by Equistar Chemical Company under the trade name Plexar®.

Some embodiments provide multilayer, easy opening, oxygen barrier casings or food package lidding substrates formed from multilayer webs that preferably are at least partially coextruded and more preferably fully coextruded. Optionally, though not shown, the web of FIG. 3 may be thermally or adhesively laminated to a polypropylene semi-rigid or rigid monolayer web to be used to form a semi-rigid or rigid tray. The multilayer web provides appropriate oxygen barrier and heat sealable characteristic to the monolayer web.

Figure 4:
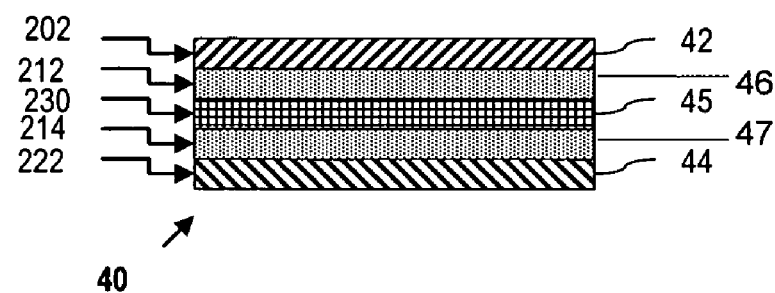
FIG. 4 shows a cross sectional schematic of a fourth exemplary multilayer film.

Referring now to FIG. 4, a cross-sectional view is depicted of an example of a five layer laminated rigid or semi-rigid web 40 for use in an oxygen barrier package comprising an exterior surface layer 42 that is preferably a polyester layer 202 that is press laminated to an adhesive primed barrier layer 46, which is preferably a PVDC layer 212. The PVDC layer 212 is rotogravure coated onto a three-layer blown web. The coextruded blown web includes an outer layer 45 preferably comprising a polyolefin 230 such as a blend of ULDPE and LLDPE, a core layer 47, preferably comprising a blend of EVA and PB, and a sealant surface layer 44, preferably comprising a blend of EVA, LLDPE and a myoglobin blooming agent. The interior myoglobin blooming agent containing surface layer 44 is a heat sealable layer 222.

In yet another embodiment of the invention, the PVDC coated three-layer blown web of the embodiment of FIG. 4 is replaced with a six-layer structure having an EVOH oxygen barrier layer, sequenced as follows: outer layer/tie/EVOH/tie/core/sealant layer, as described with the laminated films illustrated above.

Examples of food packaging web products that can be combined with a myoglobin blooming agent in accordance with the teachings include U.S. Pat. Nos. 6,514,583; 4,801,486; Re35,285; 4,755,403; 6,299,984; 6,221,470; 6,858,275; 4,755,419; 5,834,077; 6,610,392; 6,287,613; 6,074,715; 6,511,568; 6,753,054; 4,610,914; 4,457,960; 6,749,910; 6,815,023; 5,593,747; 5,382,470; and 6,565,985, as well as published U.S. Patent Application No. US 2005/0129969, which are incorporated herein by reference. Preferably, the myoglobin blooming agent is included in the food contact layer of the packaging web, which is preferably a heat sealable layer.

In one aspect of the invention, forming webs may be provided that comprise a myoglobin blooming agent in combination with a homogeneous alpha-olefin copolymer in a food contact layer. For Example, the homogeneous alpha-olefin copolymer can be a ULDPE such as Exxon Mobil EXCEED 1012, or when lower heat sealing temperatures are desired, a homogenous ethylene/$C_{6-10}$ copolymer disclosed in U.S. Pat. No. 6,514,583 (Ahlgren et al.).

In another aspect of the invention, other known multilayer thermoplastic flexible packaging webs can be combined with a myoglobin blooming agent. For example, a myoglobin blooming agent can be combined with the packaging films described in U.S. Pat. No. Re. 35,285 or U.S. Pat. No. 4,801,486 (Quacquarella et al.) which are incorporated herein by reference. The multilayer thermoplastic packaging webs can comprise a myoglobin blooming agent in one or more of the surface layers: (a) a first surface layer which is a heat sealing surface, comprising: a copolymer of ethylene and an alpha-olefin having 4 to 8 carbon atoms per molecule, and comprising 90% to 75% ethylene and 10% to 25% alpha-olefin having 4 to 8 carbon molecules and a density of less than 915 kg/m$^3$; and/or (b) a second surface layer, comprising a polymer selected from the group consisting of amide polymers, ethylene vinyl acetate copolymers, the copolymer of the first surface layer, and ionomer.

In another aspect of the invention, non-shrink patches adapted for use on the inside of a heat-shrinkable bag, e.g., as disclosed in U.S. Pat. No. 5,302,402 to Dudenhoeffer et al., can be combined with a myoglobin blooming agent.

A monolayer or multilayer patch can comprise a myoglobin blooming agent in at least one layer of a protective non-heat shrinkable patch in combination with a biaxially-oriented heat shrinkable or non-shrink bag used in vacuum packaging of bone-in cuts of meats. The patch may be adhered to the bag using adhesives, corona treatment or by other means well known in the art. A patch may be on the inside, outside or both sides of the bag, but a patch comprising a myoglobin blooming agent should be positioned for contact with a myoglobin containing food product such as meat (which also includes meat bone). A non-shrink patch film is adapted to conform to a shrinking bag. Most preferably, the interior surface food contact layer of the patch may further comprise the myoglobin blooming agent, such as a nitrite, nitrate or Fremy's salt, in combination with a suitable food contact polymer. For example, the inner layer can comprise an ethylene-vinyl acetate copolymer, e.g., having 20% to 35% by weight vinyl acetate content, or a polyethylene copolymer and, e.g., including about 0.1-5% of the myoglobin blooming agent in a food contact surface.

Methods of Packaging

In another aspect of the invention, methods of packaging a myoglobin-containing food product are provided. Suitable meat products are preferably fresh meat, but may also be enhanced or processed meats, such as the meat products described above.

The meat product is desirably a fresh meat product provided within a period of time postmortem to provide a desired level of freshness and safety. Preferably, a food product comprising myoglobin is provided for packaging less than 20 days post-mortem, more preferably less than 14, 12, 10, 6, 5, 4, 3, 2, or 1 day. Typically, the food product is a fresh meat provided between about 2 days and 14 days post-mortem, and more preferably between about 2 days and about 12 days.

Fresh meat is typically packaged in a moist state. Typically, meat comprises moisture (water), protein and fat. Fresh meat can include about 60% to about 80% moisture content, with lean meats typically having higher moisture content. Fresh meat products such as ground beef, chicken and pork often have a moisture content of about 68% to about 75%, depending on the fat content of the meat (meats with higher fat contents tend to have lower moisture content and vice versa). Cured meats often have higher moisture content due to injection with water-based preserving compounds. Sausage products may have a lower moisture content. For example, pork sausage may have a moisture content of about 40% or higher. Preferably, the packaged meat product can have a moisture content of at least about 5%, 10%, 15%, 20%, 30%, 40%, 50%, 60%, 70%, 80% or more.

Preferably, fresh meat has a sodium chloride content of less than 1% by weight, and more preferably, less than 0.5% by weight.

The meat product may be packaged in a suitable food package fabricated from packaging webs, such as the packages, films, sheets, or combinations thereof as described herein. Preferably, the meat product is contacted by the myoglobin blooming agent containing food contact surface of the packaging. The myoglobin blooming agent (MBA) preferably will contact the meat surface in an amount sufficient to produce a desired red color which preferably does not penetrate to an undesirable depth of the food thickness under reduced oxygen conditions (this color may take awhile to develop, e.g., 1 to 5 days). Beneficially the MBA may be present on the film food contact surface (or on the myoglobin food surface) in an amount of from about 0.05 to 3 to 5 to 10 μmoles/in$^2$ and in increments of 0.1 μmole thereof. Greater or lesser amounts of MBA may be used and the color intensity may thereby be varied depending upon the relative presence or absence of myoglobin. The food contact layer preferably has between about 0.001 mg/in$^2$ and about 0.900 mg/in$^2$ of a myoglobin blooming agent such as NaNO$_2$. Also the packaging should maintain the food product in a reduced oxygen package environment having a reduced gaseous oxygen partial pressure. The reduced oxygen package may comprise an oxygen barrier layer having an oxygen transmission rate of less than about 310, 200, 100, 75, 50, 40, 30, 20, 10, 5 or 3 cm$^3$/m$^2$/24 hours measured at 0% relative humidity and 23° C. Preferably, the oxygen barrier layer has an oxygen transmission rate of less than about 310 cm$^3$/m$^2$/24 hours measured at 0% relative humidity and 23° C., more preferably less than about 75 cm$^3$/m$^2$/24 hours, and most preferably less than about 20 cm$^3$/m$^2$/24 hours.

In many packaging applications, such as vacuum packaging, non-heat shrinkable thermoformable or non-thermoformable food packaging webs are desirable. A typical food packaging pouch can include three sides heat sealed by the pouch manufacturer leaving one open side to allow product insertion. Flexible food package containers such as bags or pouches may be made by transversely sealing tubular stock of monolayer or multilayer web and cutting off the tube portion containing the sealed end; by making multiple spaced apart transverse seals on tubular stock and cutting open the side of the tube; by superimposing flat sheets of film and sealing on three sides; or by folding a flat sheet and sealing on two sides. A processor may then insert, e.g., fresh, frozen, hard chilled, thawed, raw, enhanced, cured or processed meat, ham, poultry, primal or subprimal meat cuts, ground beef, or other myoglobin containing products, making a final seal to hermetically enclose the product in the bag. This final seal preferably follows gas evacuation (e.g., by vacuum removal). The final seal after insertion of a food product may be a clip, but is usually a heat seal similar to the initial seals produced by the bag manufacturer although the actual heat sealing equipment may vary. Hot bar and impulse sealers are commonly used to make heat seals.

Embodiments of the web may also be used in packages employing. trays, e.g., as a lidding film, tray overwrap or the tray itself. Equipment such as tray sealers that are made by Ossid Corporation of Rocky Mount, N.C., USA or ULMA Packaging, Inc. of Woodstock, Ga., USA may be used to package meat such as beef, poultry or other meats. Tray packaging may optionally involve replacement of the gaseous environment within the package by one or more gases to provide some advantage such as to assist product preservation, but to enjoy preferred benefits of the present invention at least a portion of the oxygen barrier film should be in contact with a food surface under reduced oxygen conditions to fix color in that contact area in a manner where a consumer or potential purchaser may view the color fixed meat surface through a transparent portion of the film. Likewise, other embodiments of the web may be used to form the trays or formed pockets in which the food products are placed so the underside of the food product also obtains the benefits of being in contact with a myoglobin blooming agent. In such embodiments, it may be desired that the formed trays and pockets are transparent to allow a customer to observe the appearance of the underside of the food product in the package.

Suitably, at least 10%, preferably at least 20% and more preferably, at least 30% or 50% or more of the surface of the oxygen barrier web is transparent to allow visual perception of food color therethrough after packaging. Meats having a bright red color are believed to be more visible, and have greater definition to distinguish the meat's physical topography, texture, and color variation, e.g., such as that found in marbling. It is further believed, without wishing to be bound by the belief, that the whites of meat components such as fats, skin and white muscle fibers are enhanced by having proximate myoglobin bound by myoglobin blooming agents, which fix a bright red color as opposed to purplish, bluish or brownish colors. Thus, the whites appear whiter in poultry and other meats including beef and pork. This in turn causes consumers to have a perception of greater clarity of the meat surface which increases consumer confidence in their purchase over meats having less visible surface characteristics. It is further believed that the MBA may cause fats to maintain a desirable white color even in the absence of myoglobin.

In an embodiment of the invention, a method of manufacturing a vacuum package of fresh meat may be provided which comprises: providing a first multilayer web comprising a thermoformable polymeric layer and a food contact layer with or without a myoglobin blooming agent, wherein the first web is non-oriented and has a heat shrinkage value of less than 5% in the machine direction at 90° C. and less than about 5% in the transverse direction at 90° C. as measured before thermoforming; forming the first web into a shape adapted to receive the uncured meat product; placing the uncured meat product in contact with the food contact layer of the first web; providing a second multilayer web comprising a thermoformable polymeric layer and a food contact layer with or without a myoglobin blooming agent, wherein the second web is non-oriented and has a heat shrinkage value of less than 5% in the machine direction at 90° C. and less than about 5% in the transverse direction at 90° C. as measured before thermoforming; evacuating air from between the webs and sealing the webs together to encapsulate the uncured meat product. It will be understood that either the first or second multilayer web or both webs each have a food contact layer comprising a myoglobin blooming agent. Preferably, the both webs include an oxygen barrier layer. Optionally, the method of fabricating a vacuum package may further comprise at least one of the following steps: forming the second web into a shape adapted to encapsulate the meat product before evacuating air from between the first web and the meat product; forming the second web into a self-supporting substrate before evacuating air from between the first web and the meat product; or draping the second web around the meat product before sealing the first and second webs together to encapsulate the uncured meat product.

In another embodiment, a method includes: a) supplying a container comprising a web having a layer comprising a myoglobin blooming agent and wherein the film is substantially impermeable to oxygen; b) placing a retail cut of fresh meat within the container; c) removing the atmosphere within the container; d) causing a transparent portion of the web to make direct contact with at least a portion of the meat surface; e) hermetically sealing the container to enclose the fresh meat and prevent contact of oxygen from outside the container therewith; thereby providing a compact package having a sufficiently reduced internal oxygen level to promote a meat surface favoring deoxymyoglobin or metmyoglobin and the corresponding purple and brown colorations associated therewith over formation of oxymyoglobin; and g) storing the package under refrigeration conditions for a sufficient time to permit the reducing activity of the enclosed meat to favor nitroxymyoglobin formation on the meat surface to an extent whereby a corresponding red color associated therewith is formed to produce a visibly red meat surface.

Variations of the above embodiment may utilize the wide selection of MBAs, polymers, films, sheets, attributes and parameters disclosed herein as will be recognized by one skilled in the art in view of the present teaching.

Food Packaging

In another embodiment, food packages are provided that comprise myoglobin-containing food products such as fresh meat. The food packages preferably include a non-heat shrinkable thermoformable or non-thermoformable oxygen barrier packaging web comprising a myoglobin blooming agent as described above, but may also include films or sheets in combination with a food product which has been surface coated with a myoglobin blooming agent prior to packaging. In some embodiments, the food package comprises a heat sealant layer positioned at or near the interior surface of the package, for example, as an interior layer. The sealant layers of the food packages are as described above. The food packages further comprise an oxygen barrier layer as part of the web forming the food package. The oxygen barrier layer can comprise any suitable material and in a multilayer embodiment is preferably positioned between the abuse resistant exterior layer and an interior food contact layer. An oxygen barrier layer may be an ethylene vinyl alcohol copolymer (EVOH) or PVDC. The gas barrier layers of the food package are described above with reference to the multilayer packaging webs. One or more tie layers may also be included. The tie layers of the food package are described above with reference to the multilayer packaging webs.

Preferably, the food package contains a case-ready meat product comprising a fresh meat product that includes myogobin. Case-ready meat products can be generally defined as fresh meat that is prepackaged and optionally prelabeled at a centralized location and delivered to the retail market prepared for final sale. Increasingly, meat products such as ground beef, turkey and chicken products delivered to U.S. domestic supermarkets for retail sale are delivered in case-ready packaging. For many supermarkets, especially so-called "mega-grocery stores," case-ready meat products provide not only cost savings in terms of minimizing or eliminating on-site butchering and packaging, but also increased sanitation and decreased incidence of product spoilage.

Product packaging that preserves the desirable color of meat, especially fresh meat, can promote the merchantability and appeal of the meat product for consumers. To meet the increasing demand for case-ready meat products, the case-ready meat products preferably provide specified weight and/or volume packaging of common meat products, such as chicken breast and ground beef. The case-ready meat package can include a thermoplastic flexible web to maintain freshness, such as a film or sheet as described herein. The meat product may be provided fresh, frozen, hard chilled, thawed, enhanced, processed or cooked, and the films advantageously provide protection at various temperatures. Selection of films and sheets for packaging food products can include consideration of such criteria as barrier properties, cost, durability, puncture resistance, flex-crack resistance, food packaging law compliance, e.g., United States Food & Drug Administration (FDA) approval, machinability, optical properties such as gloss and haze, printability, sealability, stiffness, and strength. Packaging that preserves desirable meat coloration can promote the merchantability of meat products.

In another aspect, the packaged food product includes a fresh meat contacting a thin plastic web comprising a myoglobin blooming agent on a food contact surface, stretched around a tray, e.g., a foam tray, that supports the product. The web is preferably a multilayer web that is sufficiently non-permeable to oxygen so that the color of the meat can be preserved in a desirable color (e.g., red) for more than about three days, preferably for 5, 7, 10, 15, 25, 30 or more days. Preferably, the meat product is packaged in vacuum containers such as formed pockets, trays or clam shells, which are vacuum sealed and prevent oxygen contact with the meat until the package is opened. The vacuum container includes a food contact surface including the myoglobin blooming agent.

In prior art case ready applications, the meat product is sometimes packaged in a modified atmosphere package ("MAP"), wherein the meat is maintained in a sealed pocket containing a headspace with an atmosphere that is different than ambient air. For example, a MAP can maintain red meat in carbon dioxide, with very low oxygen content, e.g., in a multipack where the master package is subsequently opened and the contained individual packages in oxygen permeable films are exposed to the atmosphere thereby causing the meat to bloom red. Also, the preferred color of fresh meat can be promoted and maintained using a MAP with enriched oxygen content. Similarly a MAP with small concentrations of carbon monoxide (CO) can be used to cause and maintain a preferred red color of fresh meat. Methods of treating fresh meat-with carbon monoxide prior to packaging have also been developed for case ready packaging applications. The bright red CO-myoglobin complex is referred to as carboxymyoglobin. The presence of carbon monoxide can also disfavorably impact sales of CO-containing meat products among consumers.

It is contemplated that the present invention may be used in combination with MAP. For example, in a tray package where the web contacts a significant portion, but not all, of the food product's viewable surface, a CO containing atmosphere can be used to cause a desirable color on the food surface areas that do not make direct contact with the packaging web. This embodiment may beneficially be used, e.g., in certain types of tray overwrap and tray packaging where the overwrap or lidding web may typically be in contact with the top surface of the food but not in all places along the side or in tray or non-tray packages of irregularly shaped items having gaps between adjacent meat surfaces e.g., such as may be found in bone in products such as whole birds or shaped products such as crown ribs for roasting.

In some embodiments, the food package can be a cook-in package, and optionally the food package need not comprise a heat sealable layer. "Cook-in" is the term used to indicate a web, casing or bag in which a foodstuff is pasteurized or cooked. This web or bag is used to hold together, protect and/or form the shape of the foodstuff by a food processor (manufacturer) during the cooking or pasteurization process after which the web may be removed (sometimes termed "stripped"), or may be left on as a protective barrier during shipping, and optionally left on during retail sale. In this embodiment, the cook-in package includes a food contact surface including the myoglobin blooming agent.

Food packages formed from multilayer webs of the invention having two to fourteen or more layers are contemplated herein, where each layer is selected from the group consisting of: layers comprising an abuse or heat resistant polymeric composition, tie layers, oxygen barrier layers, moisture barrier layers, bulk layers and sealant layers. Preferably, the exterior surface layer comprises an abuse resistant and/or sealant layer. Also preferably, the interior surface layer is a sealant layer. Multilayer webs may be made by any of the commonly known processes and techniques including for example coextrusion, coating, including extrusion or coextrusion, extrusion lamination, dry bond adhesive lamination, solventless lamination, coating lamination, lamination or combinations thereof in tubular or sheet form.

Figure 5:
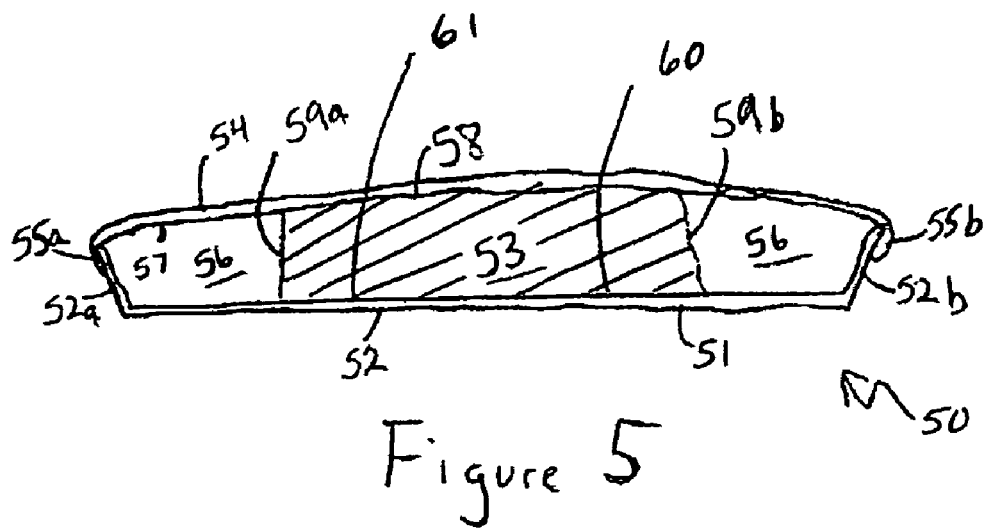
FIG. 5 shows a cross sectional schematic of a meat-containing tray with a barrier film overwrap.

Referring now to FIG. 5, a cross sectional schematic of a meat containing tray 50 is depicted. Tray 51 has a bottom 52 with integral side walls 52a and 52b supporting a retail cut of meat 53 such as pork. Web 54 seals the top of the tray 51 and provides a hermetic seal 55a and 55b all along the continuous flanges of the sidewall 52a, 52b. The web 54 is either vacuum sealed or sealed in a modified atmosphere with the myoglobin blooming agent containing food contact surface 57 in intimate contact with meat surface 58. Meat side surfaces 59a, 59b are not in contact with the food contact layer 57 but instead are exposed to an atmosphere 56 modified with a gas such as carbon monoxide. The tray has an inside surface 60 which may also be coated with a myoglobin blooming agent to fix color on the meat bottom surface 61.

Figure 6:
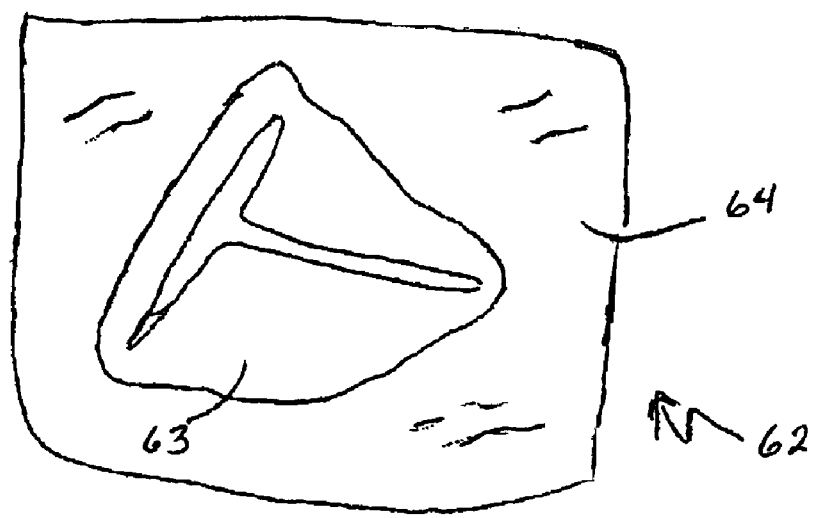
FIG. 6 shows a top view of a vacuum skin packaging film enclosed meat cut.

Referring now to FIG. 6, a top view of a package 62 depicts a myoglobin containing food 63 such as a bone-in cut of meat on a substrate and covered under a vacuum skin packaging web 64 having a myoglobin blooming agent coated food contact surface in contact with the meat. The web is transparent to allow perception of the color and meat surface characteristics.

Figure 7:
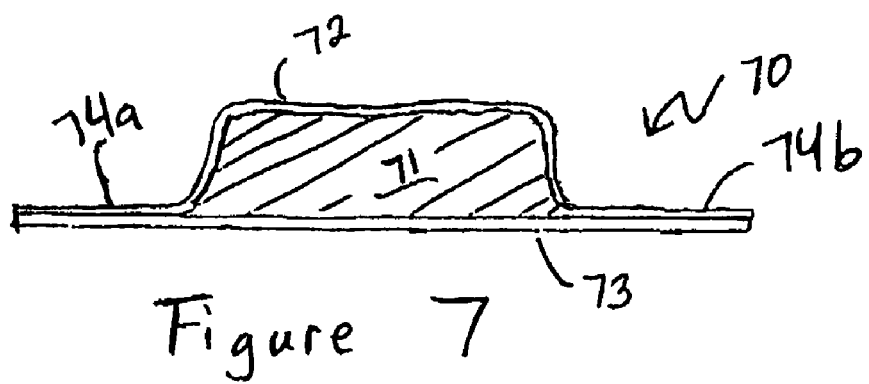
FIG. 7 shows a cross sectional schematic of a meat in a pre-formed container.

Referring now to FIG. 7, a cross sectional schematic of a meat containing formed container 70 is depicted having a myoglobin containing cut of fresh meat 71 disposed in a thermoformed pocket 72 which is heat sealed to a non-oriented web 73 around the meat cut at heat seal 74a which is continuous and joins heat seal 74b to form a hermetic vacuum package having a reduced oxygen atmosphere with intimate contact between the myoglobin blooming agent containing surfaces of web 72 and 73.

EXAMPLES

Experimental results and reported properties are based on the following test methods or substantially similar test methods unless noted otherwise.

Oxygen Gas Transmission Rate ($O_2$ GTR): ASTM D-3985-81

Water Vapor Transmission Rate (WVTR): ASTM F 1249-90

Gauge: ASTM D-2103

Melt Index: ASTM D-1238, Condition E (190° C.) (except for propene-based (>50% $C_3$ content) polymers tested at Condition TL (230° C.))

Melting point: ASTM D-3418, DSC with 5° C./min heating rate

Gloss: ASTM D-2457, 200, 450 and 600 angles

Slow Impact Strength: ASTM F-1306-90

Shrinkage values are defined to be values obtained by measuring unrestrained shrink of a 10.0 cm square sample immersed in water at 90° C. (or the indicated temperature if different) for five seconds. Four test specimens are cut from a given sample of the web to be tested. The specimens are cut into squares of 10.0 cm length in the machine direction (MD) by 10.0 cm length in the transverse direction (TD). Each specimen is completely immersed for 5 seconds in a 90° C. (or the indicated temperature if different) water bath. The specimen is then removed from the bath and the distance between the ends of the shrunken specimen is measured for both the machine direction (MD) and transverse direction (TD). The difference in the measured distance for the shrunken specimen and the original 10.0 cm side is multiplied by ten to obtain the percent of shrinkage for the specimen in each direction. The shrinkage of four specimens is averaged for the MD shrinkage value of the given web sample, and the shrinkage for the four specimens is averaged for the TD shrinkage value. As used herein the term "heat shrinkable web" means a web having an unrestrained shrinkage value of greater than 10% in at least one direction at 90° C. The term "total free shrink as measured before thermoforming" refers to the sum of the shrink percentages in the MD and TD directions.

Shrinkage values and free shrink are measured by the methods described above or tests similar thereto, unless otherwise specified. Other useful tests are provided by the following references, which are incorporated herein in their entirety: U.S. Pat. Nos. 6,869,686; 6,777,046 and 5,759,648.

Multilayer webs of 3, 4, 5, 6, 7, 8, 9 or more layers are contemplated. The inventive multilayer webs may include additional layers or polymers to add or modify various properties of the desired film such as heat sealability, interlayer adhesion, food surface adhesion, wrinkle resistance, puncture resistance, printability, toughness, gas or water barrier properties, abrasion resistance and optical properties such as gloss, haze, freedom from lines, streaks or gels. These layers may be formed by any suitable method including coextrusion, extrusion coating and lamination. All percentages are by weight unless indicated otherwise.

The polymers used in examples are identified as follows unless otherwise noted.

LDPE is a low density polyethylene, such as DOW 608A LDPE resin, with a reported 0.923 g/cm$^3$ density and a 2.0 dg/min melt index (MI).

mLLDPE is a metallocene catalyzed linear low density polyethylene resins such as ExxonMobil EXCEED™ 1018 polyethylene resin.

LLDPE is a linear low density polyethylene copolymer, such as ExxonMobil ESCORENE™ LL1001.32 resin.

ULDPE is an ultra low density polyethylene resin, such as Dow ATTANE 4201G resin.

EAA comprises a copolymer of ethylene and acrylic acid, such as commercially available from Dow Chemical Co. under the trade name Primacor™ 1321 resin.

EAO1 comprises a copolymer predominantly of ethylene with butene-1 monomer. It has a reported density of about 0.888 g/cm$^3$, a melt index of 2.2 dg/min., a melting point of 70° C. and is available under the trademark Exact™ 4053 from ExxonMobil Chemical Company of Houston, Tex., U.S.A.

EMA1 comprises an ethylene methyl acrylate copolymer which is a strong adhesive polymer. It has a reported density of about 0.948 g/cm$^3$, a melt index of 2.0 dg/min. and a melting point of 93° C. and a softening point of 49° C. and is available under the trademark EMAC+SP 1330 from the Voridian division of Eastman Chemical Company, of Kingsport, Tenn., U.S.A.

EMAA is an ethylene methacrylic acid copolymer commercially available from DuPont under the tradename Nucrel® 0903HC, which includes 9% by weight methacrylic acid.

EVA1 is a copolymer of ethylene and vinyl acetate (EVA) available from ExxonMobil Chemical Company of Houston, Tex., sold under the trade name Escorene™ LD 701.ID. It reportedly has the following properties: 10.5 wt. % vinyl acetate content, 0.93 g/cm$^3$ density, 0.19 dg/min. melt index, and a melting point of about 97° C.

EVA2 is an ethylene/vinyl acetate copolymer, available from ExxonMobil Chemical Company of Houston, Tex. sold under the trade name Escorene™ Ultra LD 768.MJ. It reportedly has the following properties: 26.2 wt. % vinyl acetate content, 0.951 g/cm$^3$ density, 0.23 dg/min. melt index, and a melting point of about 75° C.

EVA3 is an ethylene/vinyl acetate copolymer with a 5% by weight vinyl acetate content, available from Equistar Chemical Co., Houston, Tex., sold under the trade designation PETROTHENE NA442-051.

EVOH is an ethylene vinyl alcohol polymer, such as Soarnol® ET or Soarnol® RT made by Noltex, LLC commercially available from Soarus LLC of Arlington Heights, Ill.

PB is a polybutylene/ethylene copolymer commercially available from Basell Polyolefins, Elkton, Md., under the tradename PB 8640 resin.

PP1 is a polypropylene copolymer, such as BP Ineos Acclear™ 8249 high clarity polypropylene resin.

PP2 a polypropylene copolymer, such as BP Ineos Acclear™ 6219 high clarity polypropylene resin.

PP3 is a white color polypropylene concentrate, such as Phoenix PB6-0590 resin.

Ionomer is a polymer such as DuPont Surlyn™ 1650 or 1601 resin.

Nylon 6 is a resin, such as BASF Ultramid™ B36 nylon resin.

Nylon 6I/6T is an amorphous nylon resin, such as DuPont Selar™ PA-3426.

Tie Resin is a maleic anhydride modified polyethylene, such as DuPont BYNEL CXA 41E710 resin.

Additives typically include antiblock agents, slip agents, processing aids, antistatic agents, colorants, etc. in order of decreasing amounts. A typical mix of additives in a surface layer includes 3.5% by weight of a suitable antiblocking agent supplied as a concentrate of 20% by weight diatomaceous earth in low density polyethylene by Ampacet as grade 10063, 2% by weight of a suitable slip agent supplied as a concentrate of 4% by weight erucamide and 2% by weight stearamide in low density polyethylene by Ampacet as grade 10061, and 0.3% by weight of a suitable processing aid supplied as a concentrate of 3% of a copolymer of hexafluoropropylene and vinylidene fluoride in linear low density polyethylene by Ampacet as grade 10562.

Examples 1 to 8 describe various methods that may be used to prepare a masterbatch containing an MBA for subsequent use in making various film embodiments according to the present invention, such as described in Examples 18-32. Additional information on these methods is disclosed in a U.S. patent application Ser. No. 11/408,221 to Nelson et al., entitled, "Process for Introducing an Additive into a Polymer Melt" filed Apr. 20, 2006, which application is hereby incorporated by reference in its entirety. Examples 9-17 describe various methods for preparing MBA for coating on the surface of a film.

Example 1

A 40% by weight solids sodium nitrite solution may be prepared by dissolving 8 kg of NaNO$_2$ (commercially available from Rapauno Products and distributed by Hydrite Chemical Company, Brookfield, Wis.) in 12 kg of water. The solution is made with tap water at room temperature by gently agitating the water/nitrite mixture.

A polyethylene such as Dow ATTANE® 4201-G VLDPE (commercially available from Dow Chemical Company, Midland, Mich.) is loaded into the hopper of a gravimetric dosing unit that is positioned to feed the polymer into the main feed port of a twin screw extruder. The feeder is configured to dose the polyethylene at a rate of about 40 kg/h. The mixing elements of the twin screw extruder are arranged in a fashion that allow for feeding and melting of the VLDPE, injection and mixing of the water/nitrite solution, removal of the water, pressurization of a die and formation of continuous strands of a homogeneous and uniform polyethylene/nitrite blend.

The twin screw extruder is heated to about 200-330° F. and the extruder screws rotated with polyethylene introduced into a primary feed port at a rate of about 40 kg/h with the nitrite/water mixture being injected into the molten polymer at a delivery rate of about 5.6 kg/h in a manner sufficient to deliver a nitrite concentration in polymer after water removal of about 5% by weight.

Mixing elements of the extruder may be arranged in a fashion to prevent the liquid water/nitrite solution from moving upstream to the primary feed port. For example, full bore orifice plugs may be used to prevent unwanted upstream migration.

Following injection, the water fraction of the nitrite/water solution may evaporate through a vent port. After mixing, the blend is extruded through a die, cooled in a water bath, pelletized and dried.

Example 2

The process of example 1 is followed, except that a polyethylene such as Dow 608A LDPE (commercially available from Dow Chemical Company, Midland, Mich.) resin is used in place of the Dow ATTANE VLDPE resin.

Example 3

The process of example 1 is followed, except that a polymer such as Voridian SC 74556-F LLDPE resin is used in place of the Dow ATTANE VLDPE resin.

Example 4

Sodium nitrite powder (Rapauno Products $NaNO_2$ obtained from Hydrite Chemical Company, Brookfield, Wis.) and Dow ATTANE® 4201-G VLDPE (obtained from Dow Chemical Company, Midland, Mich.) are combined to form a masterbatch with a corotating twin screw extruder. The extruder is heated to 330° F. and the sodium nitrite and VLDPE are simultaneously added to the primary feed port. Selections of the sodium nitrite and VLDPE addition rates are made such that the composition of the mixture is 95% VLDPE and 5% sodium nitrite by weight. The twin screw extruder is configured to disperse the sodium nitrite powder such that the individual powder particles are surrounded by polymer. The discharge of the extruder is fitted with a die of geometry appropriate for shaping the sodium nitrite-VLDPE mixture into continuous strands. The strands are cooled in a water bath. At the exit of the water bath, an air knife removes some of the moisture clinging to the surface of the stands. After leaving the influence of the air knife, the strands are cut into discrete pellets by a rotating knife-style pelletizer. Those pellets are dried in a convection oven at about 50° C., packed in aluminum foil containing bags and stored for use.

Example 5

Repauno Products $NaNO_2$ is passed through a rotary pulverizer (e.g., Wiley Mill obtained from Brabender GbH and Company, Duisburg, Germany). The rotary pulverizer reduces the average particle size of the sodium nitrite powder. The pulverized sodium nitrite is combined with Dow ATTANE® 4201-G VLDPE in the same proportions using the same technique described in Example 4 to form a masterbatch.

Example 6

A 40% solids sodium nitrite solution is prepared by dissolving 8 kg of Repauno Products $NaNO_2$ in 12 kg of water. The solution is made with tap water at room temperature by gently agitating the water/nitrite mixture.

The nitrite solution is spray dried (e.g., Mobile Minor spray dryer from Niro, Inc. Columbia, Md.) to form a homogeneous powder. The spray dried sodium nitrite is combined with Dow ATTANE® 4201-G VLDPE in the same proportions using the same technique described in Example 4 to form a masterbatch.

Example 7

A 40% solids sodium nitrite solution is prepared in a manner described in Example 6.

Dow ATTANE® 4201-G VLDPE is loaded into the hopper of a gravimetric dosing unit that is positioned to feed the polymer into the main feed port of a corotating twin screw extruder. The extruder is heated to 330° F. and the VLDPE is continuously metered into the extruder where it melts. The 40% solids nitrite/water solution is injected into the molten VLDPE with a gear pump at a rate such that the concentration of the solution is 11.6% by weight. The water portion of the solution vaporizes in the extruder and is removed via a vent port. The remainder of the composition is substantially a mixture of VLDPE and sodium nitrite with a sodium nitrite content of 5% by weight. The resultant mixture is shaped into strands with a die, cooled with water, blown dry with air, chopped into pellets, dried and packaged as described in Example 4.

Example 8

A 4% solids sodium nitrite solution is prepared by dissolving 0.25 kg of Repauno Products $NaNO_2$ in 6 kg of methanol (from Hydrite Chemical Company, Brookfield, Wis.). The sodium nitrite/methanol solution is combined with Dow ATTANE® 4201-G VLDPE in the same proportions using the same technique described in Example 7 to form a masterbatch. The resultant blend is 0.5% by weight of sodium nitrite.

Examples 9-17 describe various methods that may be used to produce a film contact surface having MBA thereon.

Example 9

Spray-dried sodium nitrite is prepared with the materials and method described in Example 6. The powder is applied in a uniform layer using an electrostatic sprayer (e.g., obtainable from Oxy-Dry Corporation, Itasca, Ill.) to the food contact surface of a forming film. The film is fabricated into a lidding film for a tray package containing a retail cut of meat.

Example 10

A 40% solids sodium nitrite solution is prepared in a manner described in Example 6.

A continuous film tubing is passed between two sets of nip rollers, one set located above the other. The nips are separated by sufficient space such that the tubing is able to inflate with injected air and exhibit a circular cross section without wrinkling. The inflated tubing is momentarily slit and the air cavity is "slugged" (i.e., replaced) by the 40% solids sodium nitrite solution. The slitting device is removed and the inner surface of the tubing is coated with the sodium nitrite solution.

Example 11

A 40% solids sodium nitrite solution is prepared in a manner described in Example 6.

The food contact surface of a film is coated with a 40% solids solution of sodium nitrite. The solution is applied to the food contact surface and is metered with a #8 wire wound rod (e.g., Mayer rod or equalizer). Following coating, the water is removed using a heated, forced air oven.

Example 12

A 40% solids sodium nitrite solution is prepared in a manner described in Example 6.

The food contact surface of a film is coated with a 40% solids solution of sodium nitrite. The technique is the same as described in Example 11 except that the metering method uses a smooth rod.

Example 13

A 40% solids sodium nitrite solution is prepared in a manner described in Example 6.

The food contact surface of a film is coated with a 40% solids solution of sodium nitrite. The technique is the same as described in Example 11 except that the metering method uses a gravure applicator.

Example 14

A 40% solids sodium nitrite solution is prepared in a manner described in Example 6.

The food contact surface of a film is coated with a 40% solids solution of sodium nitrite. The technique is the same as described in Example 11 except that the metering method uses a flexographic printing plate.

Example 15

A 40% solids sodium nitrite solution is prepared in a manner described in Example 6.

The food contact surface of a film is coated with a 40% solids solution of sodium nitrite. The technique is the same as described in Example 11 except that the metering method uses transfer rolls.

Example 16

A 40% solids sodium nitrite solution is prepared in a manner described in Example 6.

The food contact surface of a film is coated with a 40% solids solution of sodium nitrite. The technique is the same as described in Example 11 except that the metering method uses a spray applicator.

Example 17a

A 40% solids sodium nitrite solution is prepared in a manner described in Example 6.

A coating composition is prepared by combining 5 g of a polyethylene oxide polymer, 5 g of distilled water and 0.3 g of the 40% solids sodium nitrite solution. The food contact surface of a film is coated with the coating composition using the technique described in Example 11.

Example 17b

Sodium nitrite powder (Rapauno Products $NaNO_2$ obtained from Hydrite Chemical Company, Brookfield, Wis.) and Voridian 9921 PET (obtained from Eastman Chemical Company, Kingsport, Tenn.) are combined to form a masterbatch with a corotating twin screw extruder. The extruder is heated to 520° F. and the sodium nitrite and PET are simultaneously added to the primary feed port. Selections of the sodium nitrite and PET addition rates are made such that the composition of the mixture is 95% PET and 5% sodium nitrite by weight. The twin screw extruder is configured to disperse the sodium nitrite powder such that the individual powder particles are surrounded by polymer. The discharge of the extruder is fitted with a die of geometry appropriate for shaping the sodium nitrite-PET mixture into continuous strands. The strands are cooled in a water bath. At the exit of the water bath, an air knife removes some of the moisture clinging to the surface of the stands. After leaving the influence of the air knife, the strands are cut into discrete pellets by a rotating knife-style pelletizer to form a masterbatch. Those pellets are dried in a convection oven at about 70° C., packed in aluminum foil-containing bags and stored for use.

Example 17c

Voridian 9921 PET is dried with dehumidified air (dew point temperature=−40° C.; process air temperature=160° C.) to a residual moisture content of about 30 ppm. The dried PET is tumble blended with the masterbatch pellets produced in Example 17b to yield a net sodium nitrite content of 1.0% by weight. Film is prepared from the PET/masterbatch pellet blend using a laboratory-scale extrusion line equipped with a slot die operated at about 270° C. The extruded film is about 7.5 inch wide and 5 mil thick. The oxygen transmission rate of the film containing the sodium nitrite powder is about 40 $cm^3/m^2$/24 hours measured at 0% relative humidity and 23° C.

Example 17d

Example 17c is repeated except that the thickness of the article produced from the PET/masterbatch pellet blend is increased to about 12 mil, yielding a semi-rigid sheet. The oxygen transmission rate of the semi-rigid sheet containing the sodium nitrite powder is about 17 $cm^3/m^2$/24 hours measured at 0% relative humidity and 23° C.

Example 17e

Example 17c is repeated except that the thickness of the article produced from the PET/masterbatch pellet blend is increased to about 25 mil, yielding a rigid sheet. The oxygen transmission rate of the rigid sheet containing the sodium nitrite powder is about 8 $cm^3/m^2$/24 hours measured at 0% relative humidity and 23° C.

Example 17f

The 5 mil film from Example 17c is clamped over the forming cavity of a laboratory thermoformer radiant heated to a temperature of 95° C. The cavity is circular with a diameter of 6 inch and a depth of 1.5 inch. After a heating period of about 5 seconds, vacuum is drawn on the cavity and the film conforms to the shape of the cavity, yielding a thermoformed article.

Example 17g

Example 17f is repeated except that the 12 mil semi-rigid sheet is thermoformed into the circular shape.

Example 17h

Example 17f is repeated except that the 25 mil rigid sheet is thermoformed into the circular shape. The heating period is increased to about 10 seconds.

In the following Examples 18-32, the film structures are produced using a single-bubble coextrusion apparatus and method. The single-bubble blown film apparatus includes a multi-manifold circular die head for bubble blown film through which the film composition is forced and formed into a cylindrical bubble. The bubble is either expanded and quenched or immediately quenched e.g., via cooled water bath, solid surface and/or air, and then ultimately collapsed and formed into a film. Typically, the temperatures for extruder barrels for the outer and sealant layers operate between about 260-340° F., for the core layers 1 and 2 between about 310-340° F., for the tie layers between about 400-430° F., and for the EVOH oxygen barrier layer between about 380-4100 F. The die temperature zones typically operate between about 380-4100 F. The films are optionally irradiated, e.g., up to 15 Mrad or higher, preferably between 2 and 12 Mrads.

Vacuum Skin Packaging Films

Examples 18-23

See Table 1

Multilayer vacuum skin food packaging films are prepared from masterbatch pellets that may be made according to any of Examples 1-7. The loading level of the 5% by weight of sodium nitrite masterbatch pellets is varied to produce films with different loadings of sodium nitrite in the sealant layer. The sodium nitrite myoglobin blooming agent is included in the sealant layer of each film, which also forms the interior, food-contact layer of each multilayer film. Seven-layer films with a sealant layer comprising a myoglobin blooming agent in the sealant food-contact layer are prepared with a total thickness of between about 4 to 6 mil. Table 1 summarizes the configuration and composition of certain preferred forming multilayer films. The column designated "wt % MBA" provides the percentage of myoglobin blooming agent in the sealant layer. The basis weight and the percent thickness (layer distribution) of each layer with respect to the multilayer film are also shown in Table 1. In each example, the oxygen barrier layer denoted in Table 1 as EVOH comprises 38 mole % ethylene. While EVOH oxygen barrier layers were used in the exemplary films of Table 1, PVDC, PVOH, polyamides, nanocomposite, aluminum, PET, polyacrylonitrile or combinations thereof may be used as oxygen barrier components in the oxygen barrier layers, such as known to those skilled in the art.

In addition to use in vacuum skin packaging, these films may also be used as mating webs in combination with forming films, or may be used for single web pouches, bags or non-forming flow-wrap applications.

Films of composition and structure similar to examples 22 and 23 and having a thickness of 6.15 mil and 5.90 mil, respectively, are tested for oxygen barrier properties. Flat samples of the film exhibit oxygen transmission rates of 0.7 and 0.8 cc/m$^2$/day, respectively, at 23° C. and 0% relative humidity. The films are formed into a thermoformed pocket using a cylindrical 2-inch draw. The flat bottoms of the formed pockets have thicknesses of 2.6 mil and 2.0 mil, respectively. The flat bottoms of the pockets exhibit oxygen transmission rates of 1.8 and 2.1 cc/m$^2$/day, respectively, at 23° C. and 0% relative humidity.

Example 24

Table 1

In another example, a five layer film comprises, in order, a first layer of ultra low density polyethylene (Dow ATTANE 4201) incorporating 2% by weight myoglobin blooming agent, a second layer of polyamide (nylon 6), a third layer of ethylene/vinyl alcohol copolymer (SOARNOL ET), and a fourth layer of polyamide (nylon 6). The layers are arranged in the order listed with the first layer serving as a sealant layer and being in contact with food. An adhesive layer, such as, e.g., anhydride-grafted linear low density polyethylene or low density polyethylene, is preferably included between the first and second layers to facilitate the bonding together of those two layers. As used herein, the term "adhesive layer" refers to an interior film layer which has the primary function of bonding two adjacent layers together. The fourth layer (of polyamide) may serve as an abuse-resistant layer. Preferably, one or more additional abuse-resistant layers are added to the fourth layer. For example, a fifth layer of polyamide may be joined to the fourth layer, preferably with an adhesive such as anhydride-grafted polyolefin in ethylene/vinyl acetate copolymer. As an alternative, a fifth layer of polypropylene may be joined to the fourth layer, preferably with an adhesive such as anhydride-grafted polypropylene. As a further alternative, a fifth layer of low density polyethylene and a sixth layer of polyethylene terephthalate may be added, preferably with an adhesive layer between the fourth and fifth layers (e.g., anhydride-grafted LLDPE) and an adhesive layer between the fifth and sixth layers (e.g., a polyurethane-based adhesive).

Example 25

Table 1

In another example, a multilayer film comprises, in order, an outside layer which serves to provide desired optical and abuse properties, preferably has a thickness of about 0.5 mil, and is composed of ethylene/vinyl acetate copolymer (EVA), and/or a composition, e.g., blend, comprising EVA and HDPE, a core layer which serves as a barrier layer, has a thickness of from about 0.2 to 0.4 mil, and is composed of a copolymer of vinylidene chloride and methyl acrylate, a core layer which serves as a bulk layer, has a thickness of about 1.0 mil, and is composed of EVA, and an outer layer which serves as a sealant layer, has a thickness of about 0.5 mil, and is composed of a mixture of EVA and ULDPE and incorporates 1.75% by weight of myoglobin blooming agent.

Example 26

Table 1

In another example, a multilayer film comprises, in order, an outside layer which serves to provide desired optical and abuse properties, has a thickness of about 0.6 mil, and is composed of a nylon blend, such as a blend of nylon 6,6 and nylon 6, a tie layer, a nylon core layer of nylon 6 which, preferably has a thickness of from about 0.12 mil, an EVOH oxygen barrier layer with a thickness about 0.28 mil, another nylon 6 core layer, a tie layer, and an outer layer which serves as a sealant layer. The outer sealant layer comprises a polyethylene incorporating 2% by weight of myoglobin blooming agent, such as provided by a masterbatch blend in accordance with Example 5.

Example 27

In another example, a multilayer film similar to Example 26 is prepared, except that the sealant layer is substituted with different material. The sealant layer co-extruded with the film comprises a blend of 98% by weight of ionomer and 2% by weight of additives. The film is slit and wound on a roll. When the film is unwound for use as lidding stock, a sodium nitrite is applied in accordance with Example 15.

TABLE 1

Multilayer VSP Food Packaging Films Containing Myoglobin Blooming Agent (MBA)

| Ex. No. | No. Layers (total thickness) Spec | wt % MBA | Outer Layer [Basis (% Thickness)] | Core Layer 1 [Basis (% Thickness)] | Tie Layer 1 [Basis (% Thickness)] | Oxygen Barrier Layer [Basis (% Thickness)] | Tie Layer 2 [Basis (% Thickness)] | Core Layer 2 [Basis (% Thickness)] | Sealant Layer [Basis (% Thickness)] |
|---|---|---|---|---|---|---|---|---|---|
| 18 | 7 (4 mil) | 1.00 | 95% LDPE 5% additives [14.5 (24.4)] | Ionomer [13.1 (22.3)] | 75% mLLDPE 25% Tie Resin [4.1 (7.0)] | EVOH [7.0 (11.9)] | 75% mLLDPE 25% Tie Resin [4.1 (7.0)] | 80% Ionomer 20% PB [13.1 (22.3)] | 20% MB2(5%) 52% mLLDPE 18% LDPE 10% additives [3.0 (5.1)] |
| 19 | 7 (4 mil) | 2.00 | 95% LDPE 5% additives [7.6 (12.7)] | Ionomer [13.1 (22.3)] | 75% mLLDPE 25% Tie Resin [4.1 (7.0)] | EVOH [7.0 (11.9)] | 75% mLLDPE 25% Tie Resin [4.1 (7.0)] | Ionomer [13.1 (22.3)] | 40% MB3(5%) 55% LDPE 5% additives [9.9 (16.8)] |
| 20 | 7 (4 mil) | 1.25 | 69% ULDPE 25% LLDPE 6% additives [10.9 (18.2)] | Ionomer [13.1 (21.9)] | 75% ULDPE 25% Tie Resin [4.0 (6.7)] | EVOH [8.7 (14.6)] | 75% ULDPE 25% Tie Resin [4.0 (6.7)] | Ionomer [13.1 (21.9)] | 25% MB1(5%) 49% ULDPE 25% LLDPE 1% additives [6.0 (10.0)] |
| 21 | 7 (4 mil) | 1.75 | 69% ULDPE 25% LLDPE 6% additives [10.9 (18.2)] | Ionomer [13.1 (21.9)] | 75% ULDPE 25% Tie Resin [4.0 (6.7)] | EVOH [8.7 (14.6)] | 75% ULDPE 25% Tie Resin [4.0 (6.7)] | Ionomer [13.1 (21.9)] | 35% MB1(5%) 39% ULDPE 25% LLDPE 1% additives [6.0 (10.0)] |
| 22 | 7 (6 mil) | 1.75 | 69% ULDPE 25% LLDPE 6% additives [21.5 (24.0)] | Ionomer [19.6 (21.9)] | 75% ULDPE 25% Tie Resin [6.0 (6.7)] | EVOH [13.0 (14.6)] | 75% ULDPE 25% Tie Resin [6.0 (6.7)] | Ionomer [19.6 (21.9)] | 35% MB1(5%) 39% ULDPE 25% LLDPE 1% additives [3.8 (4.2)] |
| 23 | 7 (6 mil) | 1.25 | 69% ULDPE 25% LLDPE 6% additives [20.0 (22.3)] | Ionomer [19.6 (21.9)] | 75% ULDPE 25% Tie Resin [6.0 (6.7)] | EVOH [13.0 (14.6)] | 75% ULDPE 25% Tie Resin [6.0 (6.7)] | Ionomer [19.6 (21.9)] | 25% MB1(5%) 49% ULDPE 25% LLDPE 1% additives [5.3 (5.9)] |
| 24 | 5 (3 mil) See U.S. Pat. No. 5,846,582 | 2.00 | Nylon 6 [(0.8 mil)] | NA | NA | EVOH [(0.3 mil)] | Nylon 6 [(0.8 mil)] | Tie Resin [(0.5 mil)] | 40% MB1(5%) 56% ULDPE 4% additives [(0.6 mil)] |
| 25 | 4 (2.3 mil) See U.S. Pat. No. 5,916,613 | 1.75 | EVA1 [(0.5 mil)] | NA | NA | PVDC [(0.3 mil)] | NA | EVA1 [(1.0 mil)] | 35% MB1(5%) 39%% ULDPE 25% EVA1 4% additives [(0.5 mil)] |
| 26 | 7 (4 mil) | 2.00 | 73% Nylon 6,6 14% Nylon 6 9% slip 4% antiblock [9.3 (20)] | 75% Tie resin 25% ULDPE [6.6 (14.3)] | Nylon 6 [1.85 (4.0)] | EVOH [4.35 (9.4)] | Nylon 6 [1.85 (4.0)] | 75% Tie resin 25% ULDPE [6.6 (14.3)] | 40% MB5(5%) 58% ULDPE 2% additives [15.8 (34)] |

% MBA = percentage of myoglobin blooming agent in food contact layer
Basis = weight basis;
% Thickness = percent of multilayer film
MB1, MB, MB3, etc. is a masterbatch as defined in Example 1, 2, 3 etc.
N/A = layer is not present in structure Forming Films Examples 28-32

Table 2

In examples 28-32, one extruder is used for each layer. Each extruder is connected to an annular coextrusion die from which heat plastified resins are coextruded forming a tube or single-bubble having five to seven layers. A seven annulus die may be used to make a five-layer film by using identical resins in adjacent annuli to coextrude a double layer of identical material that results in a single layer within the film.

The resin or resin mixture is fed from a hopper into an attached single screw extruder where the mixture is heat plastified and extruded through a seven-layer coextrusion die into a tube or single-bubble. Typically, the temperatures for extruder barrels for the outer and core layers 1 and 2 operate between about 440-500° F., for the tie layers between about 330-380° F., for an EVOH oxygen barrier layer between about 380-410° F., and for the sealant layer between about 350-410° F. The die temperature zones typically operate between about 430-490° F. The bubble is maintained at a width of less than 53 inch. The extruded multilayer bubble is quenched against a cooled solid surface. The cooled bubble is flattened by passage through a pair of nip rollers and the resultant film of Example 28-32 has an average gauge between 3 mil to 8 mil.

In example 31, the oxygen barrier layer provides the benefit of increased corner thickness by allowing the multilayer thermoformable film to evenly distribute, but not thin out, in the corners during thermoforming. The nylon based oxygen barrier layer of this thermoformable film allows less than 15.5 cc/m$^2$/day of oxygen to pass through the packaging film when exposed to one atmosphere of differential pressure (equivalent to 1 cc/100 in$^2$/day). Packaging films that pass less than about 15.5 cc/m²/day of oxygen under these conditions are generally accepted to provide the requisite barrier for use in different embodiments of this invention.

In another example, Example 32, a multilayer film similar to Example 30 is prepared, except that the sealant layer is substituted with different material. The sealant layer coextruded with the film comprises a blend of 98% by weight of ionomer and 2% by weight of additives. The film is slit and wound on a roll. The film is unwound for use as forming stock. After being formed into a pocket, a sodium nitrite is spray applied in accordance with Example 16. The pocket is vacuum packaged with a meat product and lidding film hermetically sealed to the thermoform.

Two films of composition and structure similar to example 28 with a thickness of 8.4 mil each are tested for oxygen barrier properties. Flat samples of the film exhibit oxygen transmission rates of 0.8 and 1.0 cc/m²/day, respectively, at 23° C. and 0% relative humidity. The films are formed into a thermoformed pocket using a cylindrical 2-inch draw. The flat bottoms of the formed pockets have thicknesses of 5.0 and 3.5 mil, respectively. The flat bottoms of the pockets exhibit oxygen transmission rates of 1.6 and 2.9 cc/m²/day, respectively, at 23° C. and 0% relative humidity.

of LLDPE and 4% by weight of additives. The sealant layer includes a blend of 25% by weight of MB1, 46% by weight of EVA, 25% by weight of PB and 4% by weight of additives, which provides 1.25% by weight myoglobin blooming agent in the sealant layer. The percent thickness of each layer in the "B" layer from the outer layer to the sealant layer is 26.1, 13.9. 7, 17, 16, 15 and 5 percent, respectively. The "A" and "B" layers are thermally laminated.

Example 34 is similar to the sheet of Example 33, except that the "A" monolayer includes 76% PP1, 20% PP2 and 4% PP3.

Example 35 is similar to the sheet of Example 33, except that the sealant layer of the "B" layer includes a blend of 35% MB1, 36% EVA1, 25% PB and 4% additives, which provides 1.75% by weight myoglobin blooming agent in the sealant layer.

Example 36 is similar to the sheet of Example 34, except that the sealant layer of the "B" layer includes a blend of 35% by weight MB1, 36% by weight EVA1, 25% by weight PB and 4% by weight additives, which provides 1.75% by weight myoglobin blooming agent in the sealant layer.

Example 37 includes an "A" monolayer of biaxially oriented polyester film, such as MYLAR 75 P25T available from

TABLE 2

Multilayer Forming Films Containing Myoglobin Blooming Agent (MBA)

| Ex. No. | No. Layers (total thickness) Spec | wt % MBA | Outer Layer [Basis (% Thickness)] | Tie Layer 1 [Basis (% Thickness)] | Core Layer 1 [Basis (% Thickness)] | Oxygen Barrier Layer [Basis (% Thickness)] | Core Layer 2 [Basis (% Thickness)] | Tie Layer 2 [Basis (% Thickness))] | Sealant Layer [Basis (% Thickness)] |
|---|---|---|---|---|---|---|---|---|---|
| 28 | 7 (3.5 mil) | 1.50 | 80% Nylon 6 15% Nylon 6I/6T 5% additives [5.9 (11)] | 75% Tie Resin 25% ULDPE [10.8 (20.0)] | 85% Nylon 6 15% Nylon 6I/6T [4.6 (8.5)] | EVOH [5.1 (9.4)] | 85% Nylon 6 15% Nylon 6I/6T [4.6 (8.5)] | 75% Tie Resin 25% ULDPE [10.8 (20.0)] | 30% MB1(5%) 69.7% ULDPE 0.3% additives [12.2 (22.6)] |
| 29 | 7 (5 mil) Schell U.S. Pat. No. 6,964,816 | 2.5 | PET [15 (18)] | Tie Resin [9.2 (11)] | 85% Nylon 6 15% Nylon 6I/6T [8.4 (10)] | EVOH [15 (18)] | 85% Nylon 6 15% Nylon 6I/6T [8.4 (10)] | Tie Resin [10 (12)] | 50% MB1(5%) 50% ULDPE [17.6 (21)] |
| 30 | 7 (5 mil) | 2.00 | PP2 [15.9 (20.6)] | 90% ULDPE 10% Tie resin [8.5 (11.0)] | 85% Nylon 6 15% Nylon 6I/6T [9.7 (12.6)] | EVOH [7.2 (9.4)] | 85% Nylon 6 15% Nylon 6I/6T [9.7 (12.6)] | 90% ULDPE 10% Tie resin [8.5 (11.0)] | 40% MB5(5%) 58% ULDPE 2% additives [17.6 (22.8)] |
| 31 | 5 (7 mil) Glawe U.S. Pat. No. 6,861,127 | 1.00 | 44% ULDPE 36% EVA1 15% EAO1 [(30.2)] | Tie Resin [(8.5)] | NA | 80% Nylon 6,66 20% Nylon 6I/6T [(27.8)] | NA | Tie Resin [(8.5)] | 20% MB1(5%) 80% ULDPE [(25.0)] |

Rigid/Semi-Rigid Forming Films/Trays

Examples 33-42

The "A" layer is a slot cast monolayer sheet of about 20 mil thickness. The "B" layer is a blown coextruded non-oriented film about 2 mil thickness, known as EZPEEL® film. The A layer sheet and the B layer film are thermally laminated to produce a sheet with 22 mil thickness. The laminated sheet is thermoformed into a tray shape. Alternatively, the two layers may be joined by adhesive lamination using an adhesive, such as "ADCOTE" 522 supplied by Rohm and Haas.

Example 33 includes an "A" monolayer of 80% by weight of PP1 and 20% by weight of PP2. The "B" layer includes multiple co-extruded layers, such as an outer layer/ULDPE/Tie/EVOH/Tie/ULDPE/sealant layer. The outer layer includes a blend of 61% by weight of EVA2, 35% by weight DuPont Teijin Films. Optionally, this layer may be printed with suitable inks, such as available from Siegwerk under the trade name AXL. The "B" layer includes multiple coextruded layers, such as an outer layer/tie/nylon blend/EVOH/nylon blend/tie/sealant layer. The nylon blend layers include 85% by weight nylon 6 and 15% by weight nylon 6I/6T. The tie layers include a blend of 20% by weight of TYMOR 1N05 from Rohm and Haas and 80% by weight of an ethylene alpha-olefin copolymer, such as ULDPE. The outer layer and sealant layer may include polyolefins, such as polypropylene, low density polyethylene, high density polyethylene, ethylene alpha-olefin copolymers, ethylene ester copolymers like ethylene vinyl acetate copolymers or ethylene methyl acrylate copolymers, ethylene acid copolymers like ethylene acrylic acid copolymers or ethylene methacrylic acid copolymers, ionomers and the like. Preferably, the outer layer and sealant layer include ULDPE and about 8% by weight additives. The sealant layer also includes 30% by weight MB1, which provides a sealant layer with 1.5% by weight of myoglobin blooming agent. The percent thickness of each layer in the "B" layer from the outer layer to the sealant layer is 18, 11. 10, 18, 10, 12 and 21 percent, respectively. The "A" and "B" layers are dry bond adhesive laminated.

Example 38 includes an "A" monolayer of 13.7 mil thick PETG sheet to obtain a rigid forming sheet for trays and the like. The PETG sheet undergoes adhesive lamination to a "B" web of PVDC coated EZ PEEL® sealant film. The three-layer sealant film is 2 mil thick and is prepared by a single-bubble blown film coextrusion to make a 1.75 mil outer layer, 0.15 mil core layer and a 0.1 mil sealant layer. The outer layer is a blend of 70% by weight of ULDPE, 25% by weight of LLDPE and 5% by weight of additives. The core layer is a blend of 79% by weight of EMAA, 17% by weight of PB, and 4% by weight of additives. The sealant layer includes a blend of 88% by weight of Ionomer and 12% by weight of additives. The outer layer is corona treated and a PVDC emulsion is applied with a gravure roller to the treated surface of the sealant film to form the "B" web. Sufficient PVDC is coated to obtain an oxygen permeability of less than about 15 cc/m$^2$/day. The "A" web and the "B" web are adhesively laminated with a water-based polyurethane adhesive to obtain a 15.7 mil rigid forming sheet with a PVDC core barrier layer. Before the sheet is thermoformed into a desired shape, a myoglobin blooming agent is applied as in Example 13.

Example 39 is similar to Example 38 except that the thickness of the "A" monolayer is 7.7 mil thick PETG film, such that a semi-rigid forming film is obtained. Also, the sealant layer incorporates a myoglobin blooming agent. The PETG sheet undergoes adhesive lamination to a "B" web of PVDC coated EZPEEL® sealant film. The three-layer sealant film is 2 mil thick and is prepared by a single-bubble blown film coextrusion to make a 1.8 mil outer layer, 0.1 mil core layer and a 0.1 mil sealant layer. The outer layer is a blend of 70% by weight ULDPE, 25% by weight LLDPE and 5% by weight additives. The core layer is a blend of 85% by weight EVA3 and 15% by weight PB. The sealant layer includes a blend of 70% by weight EVA3 and 30% by weight MB3. The outer layer is corona treated and a PVDC emulsion is applied with a gravure roller to the treated surface of the sealant film to form the "B" web. Sufficient PVDC is coated to obtain an oxygen permeability of less than about 15 cc/m$^2$/day. The "A" web and the "B" web are adhesively laminated with a water-based polyurethane adhesive to obtain a 9.7 mil rigid forming film with a PVDC core barrier layer and 1.5% by weight MBA in the sealant layer.

Example 40 is similar to Example 38 except that the thickness of the "A" monolayer is 5.7 mil thick PETG film, such that a semi-rigid forming film is obtained. Also, the "B" web is a five layer blown film that includes a coextruded EVOH core barrier layer. The "B" layer includes 0.9 mil ULDPE-LLDPE/0.15 mil tie/0.3 mil EVOH/0.15 mil tie/0.50 mil EVA-MBA. The sealant layer includes 60% EVA3, 37% MB3 and 3% by weight additives. The "A" and "B" webs undergo adhesive lamination to form a semi-rigid forming film with 1.85% by weight sodium nitrite in the sealant layer.

Example 41 is an extrusion coated semi-rigid forming film. A seven-layer blown film similar to the film of Example 33 is prepared, except that the outer layer includes about 95% by weight of a PET resin with 5% by weight additives. For compatibility, in tie layer 1 next to the outer layer, the amount of ULDPE is reduced to 60% by weight and 30% by weight EMA is substituted. The outer layer of PET is corona treated and then a 7 mil layer of PET (Voridian 9921) is extrusion coated onto the PET outer layer of the blown film. Then, another 6 mil layer of PET is extrusion coated onto the coated PET surface. A 13 mil layer of PET is obtained on the 5 mil blown film to create an 18 mil semi-rigid forming film with a food contact layer comprising 2.0% by weight myoglobin blooming agent.

Example 42 is an extrusion coated semi-rigid forming film. A seven-layer coextruded blown film is prepared using a single bubble process. The 2 mil blown film includes in order a 0.45 mil outer/0.45 mil ULDPE/0.15 mil tie/0.30 mil EVOH/0.25 mil tie/0.30 mil EMAA-PB/0.10 mil sealant layer. The outer layer includes 61% by weight EVA2, 35% by weight LLDPE and 4% by weight additives. The EMAA-PB layer includes 80% by weight EMAA and 20% by weight PB. The sealant layer includes 88% by weight ionomer and 12% by weight additives. A PETG resin is extrusion coated onto the outer layer of the blown film to create a 6 mil PETG coating on a 2 mil oxygen barrier film. Prior to a thermoforming operation, the sealant layer is coated with sodium nitrite in accordance with Example 16 to create an 8 mil semi-rigid forming film with a food contact layer comprising myoglobin blooming agent.

Physical characteristics of several exemplary films are shown in Table 3. The properties are averages of five samples of each exemplary film. The properties include shrink levels, impact strength and gloss.

TABLE 3

| Ex. No. | Spec. Nominal Thickness mil (μ) | MD/TD Shrink (90° C.) avg. % | Slow Impact outer layer avg N | Slow Impact sealant layer avg N | Gloss outer layer at 20° | Gloss outer layer at 45° | Gloss outer layer at 60° |
|---|---|---|---|---|---|---|---|
| 20 | 4 (102) | 0/0 | 22.44 | 23.33 | 41.3 | 51.9 | 85.1 |
| 21 | 3.5 (89) | 0/0 | 21.85 | 23.81 | 43.8 | 56.4 | 88.1 |
| 28 | 4 (102) | 0/0 | 20.10 | 20.47 | 80.6 | 80.8 | 112.3 |
| 28* | 3.5 (89) | 0/0 | 18.33 | 21.30 | 79.2 | 82.3 | 116.5 |
| 28** | 3.5 (89) | 0/0 | 20.84 | 19.72 | 92.1 | 79.6 | 115.5 |
| 22 | 6.0 (153) | 0/0 | 29.91 | 28.70 | 36.7 | 53.3 | 85.1 |
| 23 | 6.0 (153) | 0/0 | 29.24 | 29.54 | 49.6 | 58.6 | 93.1 |

*Same as Ex. 28 except with 2% by weight MBA in sealant layer
**Same as Ex. 28 except with 2.5% by weight MBA in sealant layer
Note: averages taken from five samples Meat, such as fresh poultry or pork, inserted into packages made from the above webs followed by evacuation of the atmosphere within the packages and sealing under vacuum conditions to provide a hermetically sealed vacuum package, will result in a transfer of the MBA to the meat surface and within about 3 days or less promote, cause and/or fix a desired color bloom which may last many weeks when the oxygen barrier vacuum package is stored under refrigeration conditions. The same effect may be obtained in other myoglobin containing products. However, it is expected that for products having a high concentration of myoglobin, such as beef, a much higher amount of MBA may be need to achieve the desired effect depending on a variety of factors such as the postmortem age of the meat and the particular cut of the meat. Due to the competing action of other moieties for attachment to the heme site, insufficient MBA may not produce the desired color change and an undesirable purple or brown may be apparent in the absence of sufficient MBA. For poultry or pork, it is expected that amounts of MBA in the range of 0.01 to 2 (a preferred range, e.g., for typical cuts of pork is from at least 0.05 to 1.25) μmole/inch$^2$ of the myoglobin blooming agent on a food contact surface may be sufficient to produce the desired color, e.g., a reddish hue, while for beef higher concentrations above 2 μmole/inch$^2$ are desired.

The optimum amount of MBA may vary depending upon choice of various parameters including, e.g., meat type, amount of myoglobin present, age, breed, sex of meat, choice of MBA, temperature, presence of other ingredients, etc., and may be determined without undue experimentation.

It should be appreciated that films and packages made according to the present invention may be made and employed which are free from marinades, flavorants, food grade water soluble adhesives, starches, spices, sodium chloride, animal or vegetable oils and the like and other compounds described herein as optional ingredients which may be coated or otherwise present on an exterior or interior packaging film surface.

Alternatively, the films of Examples 18-32 may be cast or extruded without the MBA in the food contact layer, and then have the MBA sprayed on the food contact layer with a starch containing a myoglobin blooming agent, e.g., as a blend of sodium nitrite, sodium nitrate, starch, and antioxidant before fabricating into packages by heat sealing the film to itself, a tray, a mating web or other substrate. The films coated with the myoglobin blooming agent may be used to vacuum package fresh meat on a polymeric oxygen barrier tray or in form shrink applications. Packages of meat so made are expected to develop and maintain a desirable color for at least 5, 10, 15 and preferably 20 and more preferably 25 or more days after packaging. The penetration of a pink or red color into the meat is desirably controlled to remain within about ¼ inch or less from the meat surface by adjusting the amount of agent on the surface to an appropriate value believed to be between about 0.01 to 10 μmoles/in².

For example, casings are slugged with a concentrated aqueous solution of sodium nitrite and allowed to dry to produce a coating of myoglobin blooming agent on the interior casing surface in an amount of from about 0.01 to 10 μmoles/in². A sodium nitrite coated tube according to Example 27 may be used as a ground beef, ground pork or sausage casing. This transparent tube may be stuffed with a beef and/or pork emulsion, and may be subsequently cooked. The resultant sausage casing is expected to promote and maintain a desirable red color prior to cooking and provide oxygen barrier properties having an oxygen transmission rate of less than 310 cm³/m²/24 hours measured at 0% relative humidity and 23° C. The desired color is expected to be maintained for at least 5 days and preferably at least 15, 25, 30 or more days after stuffing and color fixing/blooming and before cooking.

Experimental Results

A dieless rollstock vacuum packaging machine is used to package eight bone-in and boneless retail cuts of beef, pork and chicken. They include: boneless beef strip loin steaks (postmortem age=12 days), bone-in beef strip loin steaks (postmortem age=6 days), beef, bottom round steaks (postmortem age=4 days), ground beef (postmortem age=6 days), center cut pork chops (postmortem age=1 day), pork loins (postmortem age=10 days), chicken breasts (postmortem age=2 days) and chicken drumsticks (postmortem age=2 days). The beef and pork cuts are fabricated from boxed subprimals on the day of packaging. Whole vacuum packaged pork loins are cut into six inch portions and packaged with their fat cover facing a pigmented nonforming film. Similarly, the ground beef is formed into a loaf shape from boxed ground beef chubs. The chicken breasts and drumsticks are repackaged from gas flushed master packs.

It is well known in prior art processed and fresh meat applications, that display lighting accelerates color fade of meat. For this reason, the product is protected from light until after its bloomed color develops. Thus, all samples are stored in the dark for approximately 60 hours prior to display. Display conditions are achieved using two closed meat display cases. The products are displayed with the clear forming film facing upward and toward the light source. Lighting is continuous and the display temperature is controlled at 40° F.

Each cut of meat is packaged with five different forming films having a structures similar to the film of Example 26, which is described above. There are two control films that contain no MBA. The first is a barrier structure having an OTR specification of less than 1.0 cc/100 in²/day. Its total thickness is 3.5 mil and its sealant layer is 0.8 mil. The second control film is a breathable structure having an OTR specification of approximately 250 cc/100 in²/day. There are three test films that are of the same specification as the barrier control except their polyethylene sealant layer contains sodium nitrite at levels of 15,000 ppm (1.5% by weight), 20,000 ppm (2.0% by weight) and 25,000 ppm (2.5% by weight), respectively. A white pigmented nonforming barrier film is sealed to each of the following films to complete the package.

All packaged meat products are evaluated initially, 24 hours after packaging, and 48 hours after packaging.

The color of the meat products packaged in barrier and breathable films without nitrite are most obviously inferior to those meat products packaged in the nitrite-containing test films. Initially, some products packaged in the control and breathable films exhibit an acceptable color, however, the color of all of these products becomes unacceptable within the first several days of lighted display.

The pork chops and beef steaks exhibit an acceptable color that lasts a couple of days. The display appearance of the bottom round steaks in the barrier and breathable films were unacceptable throughout the entire study.

The meat packaged in the nitrite loaded test films show good results. The steaks bloom to an acceptable color after 60 hours. The level of nitrite in the sealant layer does not affect the bloom time. Historically, bottom round steaks are one of the most difficult retail cuts for which to maintain a preferred red color because they fade quickly. The inner portion of the bottom round is the most critical area because it fades more quickly than the outer portion. This is the last area of the steak to bloom.

For meat packaged according to the present invention, the color does not fade after exposure to the display lighting and surprisingly, it may actually improve. This improvement is believed to occur under vacuum packaging conditions due to a favorable balance of competing reactions initiated by the MBA. This is also observed on the boneless strips and the ground beef. After the preferred color appears, it remains up to the 26 days of display time considered during the study.

The bone-in and boneless strip loins show similar results. The bloom time for the boneless strip steaks is longer than that of the bone-in strip steaks. However, the boneless steaks are packaged at 12 days post mortem while the bone-in steaks are packaged at six days postmortem. Furthermore, the bloom time of the strip steaks is shorter than that of the bottom round steaks. The brown color is greatly reduced after 24 hours. However, the intensity of the redness is not acceptable for display until 48 hours after packaging.

Similar results are obtained by packaged ground beef. Only 24 hours of bloom time is required for the development of an acceptable color. The intensity of the red color after exposure to the display lighting unexpectedly improves. The intensity of the red color in the 1.5% film is not as good as the 2% or 2.5% films. No difference is observed between the 2% and 2.5% films on all products tested.

Both pork and chicken require less than 24 hours of bloom time. The intensity of redness is much less in these species than beef. Thus, the color differences between the products packaged in nitrite containing film and conventional film is subtle. Chicken packaged with the barrier and breathable films exhibits a display color that is not different from the typical display color of retail chicken. However, in a side-by-side comparison, the products packaged with nitrite test films have a preferred pinker color and a whiter white.

The differences between the pork, chicken and beef are attributable to several factors. The lower concentration of myoglobin in pork and chicken is well known. Thus, a shorter bloom time is expected because the reductants naturally present in the muscle do not have to reduce as much of the metmyoglobin back to myoglobin to affect the color. Because the packaged pork and chicken are not as old as the packaged beef, the metmyoglobin reducing activity is theoretically greater. The bloom time for pork and chicken is 12-24 hours. No differences in bloom time or the intensity of the preferred color is observed between the three nitrite test films.

The films made according to the above methods are all believed to be suitable to package a myoglobin-containing food product and fix a desired color, e.g., red, within 72 hours after packaging under reduced oxygen, e.g., vacuum packaging, operation. The intimate contact between the food contact layer having the MBA and the meat surface effects a transfer to the meat producing the desired color, which is expected to last for many weeks.

Films, bags and packages may also employ combinations of characteristics as described in one or more embodiments and selected therefrom.

The above examples are illustrative only, and should not be interpreted as limiting since further modifications of the disclosed embodiments will be apparent to those skilled in the art in view of this teaching. All such modifications are deemed to be within the scope of the invention disclosed herein.

What is claimed is:

1. A method of maintaining a desirable appearance of a fresh uncured meat product comprising:
    providing a first web comprising a thermoformable polymeric layer and a food contact layer; wherein the first web has a heat shrinkage value of less than about 5% in the machine direction at 90° C. and less than about 5% in the transverse direction at 90° C. as measured before thermoforming;
    forming the first web into a shape adapted to receive the uncured meat product;
    placing the uncured meat product in contact with the outside layer;
    providing a second web comprising a thermoformable polymeric layer and a food contact layer; wherein the second web has a heat shrinkage value of less than about 5% in the machine direction at 90° C. and less than about 5% in the transverse direction at 90° C. as measured before thermoforming; wherein the food contact layer of either the first or second web comprises a myoglobin blooming agent; wherein the first and second webs are substantially impermeable to oxygen; wherein the myoglobin blooming agent is present on the food contact layer surface in a concentration sufficient to produce a desirable surface coloration of the meat product and prevent undesirable depth of penetration of color into the body of the meat product;
    wherein the concentration of myoglobin blooming agent is between 0.001 to 0.900 mg/in$^2$;
    evacuating air from between the first and second webs; and sealing the first and second webs together to encapsulate the uncured meat product.

2. The method of claim 1, wherein the food contact layer of both the first web and the second web comprise a myoglobin blooming agent.

3. The method of claim 1, further comprising forming the second web into a shape adapted to encapsulate the meat product before evacuating air from between the first web and the meat product.

4. The method of claim 1, further comprising forming the second web into a self-supporting substrate before evacuating air from between the first web and the meat product.

5. The method of claim 1, further comprising draping the second web around the meat product before sealing the first and second webs together to encapsulate the uncured meat product.

6. The method of claim 1, wherein the first web comprises a first layer comprising a nylon or blend thereof; a second layer comprising an adhesive; a third layer comprising an oxygen barrier layer; and an outside surface layer comprising a polyethylene or blend thereof.

7. The method of claim 1, wherein forming the first web comprises conforming to the shape of the uncured meat product.

8. The method of claim 1, wherein the first web and the second web comprise a single web, and the first web and second web form a hinged connection on one edge.

9. The method of claim 1, further comprising placing a third web over at least one of the two first and second webs, the third web including printing thereon.

10. The method of claim 1, further comprising placing a third web over at least one of the two first and second webs, the third web comprising a lidding film.

11. The method of claim 1, further comprising forming the second web into a self-supporting substrate before evacuating air from between the first web and the meat product such that the self-supporting substrate is a semi-rigid tray having a thickness on a bottom major area of between 10-20 mil.

12. The method of claim 1, further comprising forming the second web into a self-supporting substrate before evacuating air from between the first web and the meat product such that the self-supporting substrate is a rigid tray having a thickness on a bottom major area of more than 20 mil.

13. The method of claim 1, further comprising forming the second web into a self-supporting substrate before evacuating air from between the first web and the meat product such that the first web and the support second web each comprise an oxygen barrier and the second web is a rigid tray.

14. The method of claim 1, wherein the first web and the second web each comprise an oxygen barrier and the second web is a semi-rigid tray.

15. The method of claim 1, wherein the first web and the second web each comprise an oxygen barrier and the second web is a flexible film.

16. The method of claim 1, wherein the first web and the second web each comprise an oxygen barrier and the second web includes a paper layer.

17. The method of claim 1, wherein the first web and the second web each comprise an oxygen barrier and the second web includes a metal foil.

18. The method of claim 1, further comprising forming the second web into a self-supporting substrate before evacuating air from between the first web and the meat product such that the first web and the second web each comprise an oxygen barrier.

19. The method of claim 1, wherein the first web is a monolayer film, a multilayer film, a monolayer sheet, a multilayer sheet, or a combination thereof.

20. The method of claim 1, wherein the first web is a monolayer or multilayer film each having a thickness of less than 10 mil.

21. The method of claim 1, wherein the first web is a monolayer or multilayer sheet each having a thickness of at least 10 mil.

22. The method of claim 1, wherein the second web is a monolayer film, a multi layer film, a monolayer sheet, a multilayer sheet, or a combination thereof.

23. The method of claim 1, wherein the second web is a monolayer or multilayer film each having a thickness of less than 10 mil.

24. The method of claim 1, wherein the second web is a monolayer or multilayer sheet each having a thickness of at least 10 mil.

* * * * *

UNITED STATES PATENT AND TRADEMARK OFFICE
CERTIFICATE OF CORRECTION

| | | |
|---|---|---|
| PATENT NO. | : 8,029,893 B2 | Page 1 of 1 |
| APPLICATION NO. | : 11/451968 | |
| DATED | : October 4, 2011 | |
| INVENTOR(S) | : Dan G. Siegel et al. | |

It is certified that error appears in the above-identified patent and that said Letters Patent is hereby corrected as shown below:

On the Title Page

On the page 3, in column 2, under "Other Publications", line 36, delete "Science," and insert -- Science, 2003 --, therefor.

In the Specification

In column 8, line 53, delete "alpha olefins" and insert -- alpha-olefins --, therefor.

In column 9, line 25, delete "derivitization" and insert -- derivatization --, therefor.

In column 16, line 7, delete "and or" and insert -- and/or --, therefor.

In column 19, line 18, delete "and or" and insert -- and/or --, therefor.

In column 33, line 16, delete "mondiglycerides;" and insert -- monodiglycerides; --, therefor.

In column 44, line 35, delete "200, 450 and 600 angles" and insert -- 20°, 45° and 60° angles --, therefor.

In column 47, line 35, delete "stands." and insert -- strands. --, therefor.

In column 50, line 3, delete "stands." and insert -- strands. --, therefor.

In the Claims

In column 63, line 5, in claim 22, delete "multi layer" and insert -- multilayer --, therefor.

Signed and Sealed this
Thirtieth Day of June, 2015

Michelle K. Lee
*Director of the United States Patent and Trademark Office*